United States Patent
Vaniotis et al.

(10) Patent No.: US 12,493,871 B1
(45) Date of Patent: Dec. 9, 2025

(54) SYSTEMS, METHODS, AND PROGRAM PRODUCTS FOR NON-CUSTODIAL TRADING OF DIGITAL ASSETS ON A DIGITAL ASSET EXCHANGE

(71) Applicant: Gemini IP, LLC, New York, NY (US)

(72) Inventors: Thomas Vaniotis, New York, NY (US); Brian Keogh, Rye, NY (US); Noah Cornwell, Berkeley Heights, NJ (US); Neeraj Mishra, Mountain Lakes, NJ (US); Ira Auerbach, Arverne, NY (US); Jack Sutton, New Canaan, CT (US)

(73) Assignee: Gemini IP, LLC, New York, NY (US)

( * ) Notice: Subject to any disclaimer, the term of this patent is extended or adjusted under 35 U.S.C. 154(b) by 0 days.

(21) Appl. No.: 17/545,704

(22) Filed: Dec. 8, 2021

Related U.S. Application Data

(60) Provisional application No. 63/122,935, filed on Dec. 8, 2020.

(51) Int. Cl.
- *G06Q 20/36* (2012.01)
- *G06Q 40/02* (2023.01)
- *G06Q 40/04* (2012.01)

(52) U.S. Cl.
CPC ......... *G06Q 20/3672* (2013.01); *G06Q 40/02* (2013.01); *G06Q 40/04* (2013.01)

(58) Field of Classification Search
CPC ..... G06Q 20/3672; G06Q 40/02; G06Q 40/04
See application file for complete search history.

(56) References Cited

U.S. PATENT DOCUMENTS

| | | | |
|---|---|---|---|
| 10,373,158 B1 * | 8/2019 | James | G06Q 40/04 |
| 11,062,319 B1 * | 7/2021 | Hecht | G06Q 20/10 |
| 2018/0218176 A1 * | 8/2018 | Voorhees | G06Q 20/02 |
| 2020/0013046 A1 * | 1/2020 | Joao | G06Q 20/02 |
| 2020/0211109 A1 * | 7/2020 | Bean | G06Q 20/223 |
| 2020/0380476 A1 * | 12/2020 | Trudeau | G06Q 20/0658 |
| 2021/0065300 A1 * | 3/2021 | Leshner | H04L 9/0637 |
| 2021/0073913 A1 * | 3/2021 | Ingargiola | H04L 63/12 |

OTHER PUBLICATIONS

Y. Li, Y. Zhou, Y. Liu and R. N. Nortey, "Design of decentralized personal loaning platform based on blockchain," 2019 3rd International Conference on Electronic Information Technology and Computer Engineering (EITCE), Xiamen, China, 2019, pp. 1993-1997 (Year: 2019).*

* cited by examiner

*Primary Examiner* — Raven E Yono
*Assistant Examiner* — Bolko M Hamerski
(74) *Attorney, Agent, or Firm* — Lee & Hayes, P.C.

(57) ABSTRACT

The present invention generally relates to computer systems, methods and program products that allow a digital asset exchange to provide an option to customers to lend all or a portion of the digital assets associated with at least a first blockchain and held by the exchange on behalf of the customer in exchange for payments such as interest.

20 Claims, 20 Drawing Sheets

S4802: Receive, at an exchange computer system, user access credentials.

S4804: Authenticate, at the exchange computer system, the user.

S4806: Provide, by the exchange computer system to a customer user device, a fiat funding interface.

S4808: Receive, at the exchange computer system from the user device, user selections for a funding source and/or funding method.

S4810: Receive, at the exchange computer system from the user device, a funding amount value to transfer to an exchange account associated with the user.

S4812: Transmit, by the exchange computer system to a bank having a customer's fiat bank account, a fund transfer request.

S4814: Update, by the exchange computer system, an exchange fiat electronic ledger with funding transaction information.

S4816: Receive, at the exchange computer system, an electronic indication that the funding amount was transferred from the customer's fiat bank account to an exchange fiat account.

S4818: Monitor, by the exchange computer system, the exchange fiat account to determine the availability of funds in an exchange account associated with the user.

FIG. 7B

S5508: ...the first response including one or more of the following:

(1) Customer identification information associated with the first customer;

(2) a first digital asset account balance associated with the first customer;

(3) a second digital asset account balance associated with the first customer;

(4) a transfer option to transfer one or more digital assets into an interest-bearing account associated with the first customer; and/or (5) interest information associated with a second digital asset account associated with the first customer.

FIG. 11B

Exemplary First Request 5510

Customer Identification No. 12345

Account 1:   10 Digital Assets
             (Interest 1)
Account 2:   100 Digital Assets
             (Interest 2)

Transfer Option:
   To Account:
       [Account 1 or 2]
   From Account:
       [Account 1 or 2]

FIG. 11C

Decentralized Lending Smart Contract
5512

Decentralized Lending Smart Contract Public Address
5512A

Decentralized Lending Smart Contract Instructions
5512B

Create tokens module 5514

Transfer tokens module 5516

Destroy tokens module 5518

Redeem tokens module 5520

Deposit module 5522

Calculate interest module 5524

Return module 5526

Third party module 5528

Withdrawal module 5530

SYSTEMS, METHODS, AND PROGRAM PRODUCTS FOR NON-CUSTODIAL TRADING OF DIGITAL ASSETS ON A DIGITAL ASSET EXCHANGE

PRIORITY

This application claims priority to U.S. Provisional Patent Application No. 63/122,935, filed on Dec. 8, 2020, entitled "Systems, Methods, and Program Products for Non-Custodial Trading of Digital Assets on a Digital Asset Exchange," the entire contents of which are incorporated herein by reference.

BACKGROUND

In recent times, the exchange of digital assets, including those based on blockchain technology, on digital asset exchanges has become more commonplace. One technical problem that digital asset exchanges encounter is that current blockchain technology does not allow for loaning and paying interest on assets held by the digital asset exchange. Accordingly, it would be beneficial to provide for a method, system and program product that allows the digital asset exchange to provide an option to customers to lend all or a portion of the digital assets associated with at least a first blockchain and held by the exchange on behalf of the customer in exchange for payments such as interest.

SUMMARY

This disclosure provides for at least an implementation that allows for avoiding the use of custodial electronics wallets for ETPs holding digital assets, including digital math-based assets, such as Bitcoin, Namecoins, Litecoins, PPCoins, Tonal bitcoins, bitcoin cash, zcash, IxCoins, Devcoins, Freicoins, IOcoins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliqa; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; 0x; Aion; Algorand; AMP; Arca; Arweave; Audius; Avalanche; BCB; BCC; Bitcoin SV; Blockstacks; cBAT; cDAI; Cela; Celo; cETH; Chia; Coda; Cosmos; cWBTC; cZRK; Decred; Dfinity; EOS; Eth 2.0; Filecoin; Hedgetrade; ION; Kadena; Kyber Network; Mobilecion; Near; Nervos; Oasis; OmiseGO; PaxG; Polkadot; SKALE; Solana; Stellar; Tezos; Theta; XRP; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), security tokens, and/or non-fungible token (such as Cryptokitties), to name a few.

In embodiments, a method includes: (a) providing one or more databases, operatively connected to a digital asset exchange system associated with a digital asset exchange, which include: (1) a first electronic exchange ledger associated with a first digital asset including, for each customer of a plurality of customers of the digital asset exchange, exchange account information associated with each respective customer exchange account including a first digital asset account balance associated with a first amount of the first digital asset held in the respective customer exchange account that are available for transfer via the digital asset exchange; wherein the first digital asset is maintained on a distributed public transaction ledger in the form of a blockchain that is maintained by a blockchain network including a plurality of geographically distributed computer systems in a peer-to-peer network; (2) a second electronic interest ledger associated with the first digital asset including, for each customer of the plurality of customers of the digital asset exchange, interest bearing account information associated with a respective customer interest bearing account with a second digital asset account balance associated with a second amount of the first digital asset held in the respective customer interest bearing account and respective interest information; (3) a third electronic ledger associated with an intermediary, including, for each customer of the plurality of customers of the digital asset exchange, intermediary account information associated with a respective customer intermediary account with a third digital asset balance indicating a third amount of the first digital asset held in the respective customer intermediary account and respective return information; (b) receiving, at the digital asset exchange system, first customer access credentials from a first customer device associated with a first customer of the digital asset exchange; (c) authenticating, by the digital asset exchange system, the first customer based on at least the first customer access credentials; (d) generating, by the digital asset exchange system, a first response including: (1) customer identification information associated with the first customer; (2) a respective first digital asset account balance associated with the first customer; (3) a respective second digital asset account balance associated with the first customer; (4) a transfer option to transfer digital assets into the respective customer interest bearing account associated with the first user; (e) sending, by the digital asset exchange system to the first customer device, the first response; (f) receiving, by the digital asset exchange system, from the first customer device, a first request to transfer a fifth amount of the first digital asset from the respective customer exchange account associated with the first customer to the respective customer interest bearing account associated with the first customer, the first request comprising: (i) identification information associated with the first digital asset; (ii) the fifth amount of the first digital asset; (g) verifying, by the digital asset exchange system, the first request, wherein the step of verifying includes: (1) confirming, that the fifth amount of the first digital asset is less than or equal to the first digital asset account balance associated with the first customer; (h) transferring, by the digital asset exchange system, the fifth amount of the first digital asset from the respective customer exchange account associated with the first customer to the respective customer interest bearing account associated with the first customer; wherein transferring includes: (i) updating the first electronic exchange ledger to reflect the transfer of the fifth amount of the first digital asset out of the respective customer exchange account; (ii) updating the second electronic interest ledger to reflect: a. the transfer of the fifth amount of the first digital asset into the respective customer interest bearing account; and b. the respective interest information associated with the fifth amount of the first digital asset transferred into the respective customer interest bearing account; (i) transferring, by the digital asset exchange system, the fifth amount of the first digital asset from the respective customer interest bearing account to a respective customer intermediate account; wherein transferring includes: (i) updating, the second electronic interest ledger to reflect the transfer of the fifth amount of the first digital asset out of the respective customer interest bearing account; (ii) updating the third electronic reserve ledger to reflect the transfer of the fifth amount of the first digital asset into the respective customer intermediary account; generating, by the digital asset exchange system, a second transfer message to transfer at least a portion of the fifth amount of the first digital asset from the respective customer interest bearing account to a respective customer intermediate account, wherein the second message includes 1. the second digital address associated with the respective customer interest bearing account associated with the first customer; 2. a fourth digital address associated with the respective customer intermediary account associated with the first customer; 3. instructions to transfer at least a portion of the fifth amount of the first digital asset from the respective customer interest bearing account associated with the first customer to a respective customer intermediate account associated with the first customer; iv. publishing the second transfer message to the distributed public transaction ledger in the form of the blockchain wherein the instructions to transfer are executed by the plurality of geographically distributed computer systems in the peer-to-peer network; ii. publishing the second transfer message to the distributed public transaction ledger in the form of the blockchain wherein the instructions to transfer are executed by the plurality of geographically distributed computer systems in the peer-to-peer network; (j) determining, by the digital asset exchange system, a first interest payment for the first customer based at least on the respective interest information associated with the fifth amount of the first digital asset; (k) storing, by the digital asset exchange system, the first interest payment in the second electronic interest ledger; (1) determining, by the digital asset exchange system, when to disburse the first interest payment to the first customer based on a payment schedule; (m) transferring, by the digital asset exchange, the first interest payment from the first customer interest bearing account to the respective customer exchange account associated with the first user; transferring includes: i. updating the second electronic interest ledger to reflect the transfer of the first interest payment out of the respective customer exchange account; ii. updating the first electronic exchange ledger to reflect receipt of the first interest payment of the first digital asset into the respective customer digital asset exchange account.

In embodiments, the digital asset exchange account is an omnibus account including deposits of the first digital asset associated with the plurality of customers. In embodiments, the interest information includes a first amount of interest. In embodiments, the first amount of interest is denominated in the first digital asset. In embodiments, the first amount of interest is denominated in fiat. In embodiments, the first amount of interest is denominated in a second digital asset. In embodiments, the second digital asset is a stable value token.

In embodiments, the interest information includes a first interest rate. In embodiments, the first interest rate is applicable for a first period of time. In embodiments, the interest information includes a second interest rate. In embodiments, the second interest rate is applicable for a second period of time. In embodiments, at least a portion of the third amount of the first digital asset is loaned to third parties and the respective return information indicates a return to be provided to the respective customer for allowing loaning of the at least a portion of the third amount of the first digital asset.

In embodiments, at least a portion of the third amount of the first digital asset is traded on the digital asset exchange by a third party associated with the intermediary account and the respective return information indicates a return amount to be provided to the respective customer for allowing trading of the at least a portion of the third amount of the first digital asset. In embodiments, the respective return information includes a first return amount. In embodiments, the first return amount is denominated in the first digital asset.

In embodiments, the first return amount is denominated in a second digital asset. In embodiments, the first return amount is denominated in fiat. In embodiments, the return amount includes a return rate. In embodiments, the return rate includes a first return rate for a first period of time. In embodiments, the return rate includes a second return rate for a second period of time. In embodiments, the respective return information includes a return payment schedule indicating when disbursements of the return amount scheduled to be made to the respective customer. In embodiments, the return payment schedule indicates disbursements scheduled to be made periodically.

In embodiments, the return payment schedule indicates disbursements to be made aperiodically. In embodiments, a fourth electronic reserve ledger associated with the first digital asset, including, for each customer of the plurality of customers, reserve account information associated with a respective customer reserve account with a fourth digital asset balance indicating a fourth amount of the first digital asset held in the respective customer reserve account.

In embodiments, at least two of the first electronic exchange ledger, the second electronic interest ledger and the third electronic ledger are provided in a first database. In embodiments, the fourth electronic reserve ledger is also provided in the first database. In embodiments, at least two of the first electronic exchange ledger, the second electronic interest ledger and third electronic ledger are provided in at least two different databases. In embodiments, at least two of the first electronic exchange ledger, the second electronic interest ledger and third electronic ledger and the fourth electronic reserve ledger are provided in at least two different databases.

In embodiments, the authenticating step includes associating the first customer access credentials with at least one of a respective customer digital asset exchange account and a respective customer interest bearing account associated with the first customer. In embodiments, the authenticating step includes associating the first customer access credentials with at least one of a respective customer digital asset exchange account, a respective customer interest bearing account and a respective customer reserve account associated with the first customer. In embodiments, the generating step further includes respective interest information associated with the respective second digital account associated with the first customer.

In embodiments, the first request further includes first source information associated with the respective customer exchange account. In embodiments, the first request further includes first destination information associated with the respective customer interest bearing account. In embodiments, the first source information includes a first digital address associated with the underlying blockchain of the first digital asset and the respective customer exchange account associated with the first customer. In embodiments, the first digital address is associated with an omnibus account associated with a plurality of customer of the digital asset exchange.

In embodiments, the first digital address is associated with a segregated account associated with the first customer. In embodiments, the first destination address includes a second digital address associated with the underlying blockchain and the respective customer interest bearing account associated with the first customer.

In embodiments, the second digital address is associated with an omnibus account associated with a plurality of customers of the digital asset exchange. In embodiments, the second digital address is associated with a segregated account associated with the first customer. In embodiments, the verifying step further includes confirming, based on the user identification information, an identification of the first customer.

In embodiments, the transferring step includes: (i) calculating a reserve amount of the first digital asset based on at least one reserve requirement and the fifth amount of the first digital asset; (ii) updating the first electronic exchange ledger to reflect transfer of the fifth amount of the first digital asset out of the respective customer exchange account; (iii) updating the fourth electronic reserve ledger to reflect transfer of the reserve amount of the first digital asset to the respective customer reserve account; (iv) updating the second electronic interest ledger to reflect transfer of the fifth amount of the first digital asset less the reserve amount of the first digital assert into the respective customer interest bearing account;

In embodiments, the transferring step includes: (i) generating, a first transfer message including instructions to transfer the fifth amount of the first digital asset from the first digital address to the second digital address; (ii) publishing the first transfer message to the plurality of geographically distributed computer systems in the peer-to-peer network, wherein the instructions to transfer are executed by the plurality of geographically distributed computer systems in the peer-to-peer network.

In embodiments, the transferring step includes: (i) generating, a first transfer message including instructions to transfer the fifth amount of the first digital asset less the reserve amount of the first digital asset from the first digital address to the second digital address and the reserve amount of first digital asset from the first digital address to a third digital address associated with a respective customer reserve account associated with the first customer; (ii) publishing the first message to the to the plurality of geographically distributed computer systems in the peer-to-peer network wherein the instructions to transfer are executed by the to the plurality of geographically distributed computer systems in the peer-to-peer network.

In embodiments, the second destination address is associated with a smart contract.

In embodiments, the transferring includes: (i) generating, by the digital asset exchange system, a second transfer message to transfer at least a portion of the fifth amount of the first digital asset less the reserve amount of the first digital asset from the respective customer interest bearing account to a respective customer intermediate account, and wherein the second message includes: (1) the second digital address associated with the respective customer interest bearing account associated with the first customer; (2) a fourth digital address associated with the respective customer intermediary account associated with the first customer; (3) instructions to transfer at least a portion of the fifth amount of the first digital asset less the reserve amount of the first digital asset from the respective customer interest bearing account associated with the first customer to a respective customer intermediate account associated with the first customer; (ii) publishing the second transfer message to the distributed public transaction ledger in the form of the blockchain wherein the instructions to transfer are executed by the plurality of geographically distributed computer systems in the peer-to-peer network. In embodiments, determining is based on the interest amount.

In embodiments, determining is based on the interest rate and period of time that the fifth amount of the first digital asset is held in the respective customer interest bearing account. In embodiments, the first interest rate is used when the period of time that the fifth amount of the first digital asset respective second digital asset account balance has been held in the respective customer interest bearing account falls within the first period of time; and wherein the second interest rate is used when the period of time that the respective second digital asset account balance has been held in the respective customer interest bearing account falls within the second period of time.

In embodiments, the step of determining the interest payment includes determining a gross interest payment and subtracting a reserve withholding amount based on the fourth digital asset balance. In embodiments, the determining step further includes determining a second interest payment for the first customer based on respective interest information associated with a sixth amount of the first digital asset in the respective customer interest bearing account associated with the first customer that does not include the fifth amount of the first digital asset. In embodiments, the second interest payment is further based on a second interest amount. In embodiments, the second interest amount is the same as the first interest amount. In embodiments, the second interest amount is different from the first interest amount.

In embodiments, the second interest payment is further based on a second interest rate and a second period of time that the sixth amount of the first asset is held in the respective customer interest bearing account. In embodiments, the first interest payment is stored in the second electronic interest ledger and associated with the first customer.

In embodiments, the first interest payment is associated with the fifth amount of the first digital asset. In embodiments, the first interest amount is included in the interest information associated with the respective customer interest bearing account associated with the first customer.

In embodiments, the second interest payment is stored in the second electronic interest ledger and associated with the first customer. In embodiments, the second interest payment is associated with the sixth amount of the first digital asset.

In embodiments, the second interest amount is included in the interest information associated with the respective customer interest bearing account associated with the first customer. In embodiments, the first interest payment and the second interest payment are added together to provide a first total return and stored in the second electronic interest ledger. In embodiments, the method further includes prior to step (j) receiving, in the first interest bearing account, a first return from the intermediary account.

In embodiments, the determining step is based at least on the respective interest information associated with the fifth amount of the first digital asset and the first return, wherein the first interest payment is at least a portion of the first return. In embodiments, the payment schedule indicates that interest payments are to be made periodically. In embodiments, the payment schedule indicates that interest payments are to be made aperiodically. In embodiments, the payment schedule indicates that interest payments are made based on receipt by the respective customer interest bearing account, a return from the respective customer intermediary account. In embodiments, the payment schedule indicates that the interest payment is made upon a request received from the first customer.

In embodiments, the determining step includes determining when to disburse the second interest payment based on the payment schedule. In embodiments, the payment interest schedule indicates payment of the second interest payment with the first interest payment. In embodiments, the payment schedule indicates that the second interest payment is to be paid periodically. In embodiments, the payment schedule indicates that the second interest payment is to be paid aperiodically.

In embodiments, the payment schedule indicates that the second interest payment is to be paid based on receipt by the respective customer interest bearing account, a return from the respective customer intermediary account. In embodiments, the payment schedule indicates the second interest payment is to be paid upon a request received from the first customer.

In embodiments, transferring includes: (i) generating a third transfer message including instructions to transfer the first interest payment of the first digital asset from the second digital address to the first digital address; (ii) publishing the third transfer message to the distributed public transaction ledger in the form of the blockchain wherein the instructions to transfer are executed by the plurality of geographically distributed computer systems in the peer-to-peer network. In embodiments, the first interest amount is denominated in the second digital asset. In embodiments, the second digital asset is maintained on a second distributed ledger in the form of a second blockchain a blockchain network including a second plurality of geographically distributed computer systems in a second peer-to-peer network. In embodiments, the second distributed ledger is the same as the first digital ledger. In embodiments, the second distributed ledger is different than the first distributed ledger.

In embodiments, the method further includes a fifth electronic ledger associated with a second digital asset including, for each customer of a plurality of customers of the digital asset exchange, second exchange account information associated with each respective customer exchange account including a fifth digital asset account balance associated with a first amount of the second digital asset held in the respective customer exchange account that are available for transfer via the digital asset exchange.

In embodiments, the transferring step includes updating the second electronic interest ledger and the fifth electronic ledger to reflect transfer of the first interest amount of the second digital asset from the respective customer interest bearing account to the respective customer exchange account.

In embodiments, transferring includes: (i) generating a third transfer message including instructions to transfer the first interest payment of the second digital asset from the second digital address to the fourth digital address; and (ii) publishing the third transfer message to the second distributed ledger in the form of the second blockchain wherein the instructions are executed by the second plurality of geographically distributed computer systems in the second peer-to-peer network.

In embodiments, the first interest payment amount is denominated in a first digital asset and a second digital asset.

In embodiments, transferring includes: (i) updating the second electronic interest ledger and the first electronic exchange ledger to reflect transfer of a first portion of the first interest payment of the first digital asset from the respective customer interest bearing account to the first customer exchange account; (ii) updating the second electronic interest ledger and the fifth electronic ledger to reflect transfer of the second portion of the second digital asset from the to reflect transfer of the second portion of the second digital asset from the respective customer interest bearing account to the respective customer exchange account.

In embodiments, transferring includes: (i) generating a third transfer message including instructions to transfer the first portion of the first interest payment of the first digital asset from the first digital address to the second digital address and the second portion of the first interest payment of the second digital asset from the second digital address to the fourth digital address; (ii) publishing the third transfer message to the first distributed network where the instructions to transfer the first portion of the first interest payment of the first digital asset are executed by the plurality of geographically distributed computer systems in the first peer-to-peer network and the instructions to transfer the second portion of the first interest payment of the second digital asset are executed by the second plurality of geographically distributed computer systems in the second peer-to-peer network.

In embodiments, the method further includes a sixth electronic fiat ledger associated with a first fiat, including, for each customer of a plurality of customers of the digital asset exchange, first fiat account information associated with each respective customer exchange first fiat account including a first fiat account balance associated with a first amount of the first fiat held in the respective customer exchange first fiat account.

In embodiments, the transferring step includes updating the sixth electronic fiat ledger to include the first interest amount of the first fiat in the respective customer exchange first fiat account.

In embodiments, the method further includes providing at least a second intermediary electronic ledger, including, for each customer of the plurality of customers, a fifth digital asset account balance indicating a sixth amount of the first digital asset associated with a second respective customer interest bearing account associated with the second respective interest bearing account In embodiments, the first interest bearing account is associated with a first intermediary and the second interest bearing account is associated with a second intermediary.

In embodiments, the first request includes intermediary selection information identifying at least one of the first intermediary and the second intermediary.

In embodiments, the transferring step includes: (1) transferring the fifth amount of the digital asset from the respective exchange customer account to the first interest bearing account when the intermediary selection information identifies the first intermediary; and (2) transferring the fifth amount of the digital asset from the respective exchange customer account to the second interest bearing account when the intermediary selection information identifies the second intermediary.

In embodiments, the transferring step comprises: (1) comparing a first interest bearing account balance to a predetermined minimum balance; and (2) transferring the fifth amount of first digital asset to the first interest bearing account when the first interest bearing account balance is below the predetermined minimum balance; and (3) transferring the fifth amount of the first digital asset to at least one of the first interest bearing account and the second interest bearing account when the first interest bearing account balance is not below the predetermined minimum balance.

In embodiments, the transferring step includes: (1) comparing a first interest bearing account balance to a predetermined maximum balance; and (2) transferring the fifth amount of first digital asset to the second interest bearing account when the first interest bearing account balance is above the predetermined maximum balance; and (3) transferring the fifth amount of the first digital asset to at least one of the first interest bearing account and the second interest bearing account when the first interest bearing account balance is not above the predetermined maximum balance.

In embodiments, the method further includes updating, by the digital asset exchange system, the first electronic exchange ledger and at least one of the second electronic interest ledger and the fifth account ledger to account for the transfer of the fifth amount of the first digital asset from the respective exchange customer account to at least one of the first interest bearing account and the second interest bearing account.

In embodiments, the transferring step includes: (i) generating a fourth transfer message including instructions to transfer the fifth amount of the first digital asset from the first address to the second digital address when the fifth amount of digital assets are transferred to the first interest bearing account and to a sixth digital address associated with the second interest bearing account when the fifth amount of the first digital asset is to be transferred to the second interest bearing account; (ii) publishing the fourth transfer message to the first distributed network where the instructions are executed by the plurality of geographically distributed computer systems in the first peer-to-peer network.

In embodiments, a method includes: (a) providing one or more databases, operatively connected to a digital asset exchange system associated with a digital asset exchange, which include: (1) a first electronic exchange ledger associated with a first digital asset including, for each customer of a plurality of customers of the digital asset exchange, exchange account information associated with each respective customer exchange account including a first digital asset account balance associated with a first amount of the first digital asset held in the respective customer exchange account that are available for transfer via the digital asset exchange; wherein the first digital asset is maintained on a distributed public transaction ledger in the form of a blockchain that is maintained by a blockchain network including a plurality of geographically distributed computer systems in a peer-to-peer network; (2) a second electronic interest ledger associated with the first digital asset including, for each customer of the plurality of customers of the digital asset exchange, interest bearing account information associated with a respective customer interest bearing account with a second digital asset account balance associated with a second amount of the first digital asset held in the respective customer interest bearing account and respective interest information; (3) a third electronic ledger associated with an intermediary, including, for each customer of the plurality of customers of the digital asset exchange, intermediary account information associated with a respective customer intermediary account with a third digital asset balance indicating a third amount of the first digital asset held in the respective customer intermediary account and respective return information; (b) receiving, at the digital asset exchange system, first customer access credentials from a first customer device associated with a first customer of the digital asset exchange; (c) authenticating, by the digital asset exchange system, the first customer based on at least the first customer access credentials; (d) generating, by the digital asset exchange system, a first response including: (1) customer identification information associated with the first customer; (2) a respective first digital asset account balance associated with the first customer; (3) a respective second digital asset account balance associated with the first customer; (4) a transfer option to transfer digital assets into the respective customer interest bearing account associated with the first user; (e) sending, by the digital asset exchange system to the first customer device, the first response; (f) receiving, by the digital asset exchange system, from the first customer device, a first request to transfer a fifth amount of the first digital asset from the respective customer exchange account associated with the first customer to the respective customer interest bearing account associated with the first customer, the first request comprising: (i) identification information associated with the first digital asset; (ii) the fifth amount of the first digital asset; (g) verifying, by the digital asset exchange system, the first request, wherein the step of verifying includes: (1) confirming, that the fifth amount of the first digital asset is less than or equal to the first digital asset account balance associated with the first customer; (h) transferring, by the digital asset exchange system, the fifth amount of the first digital asset from the respective customer exchange account associated with the first customer to the respective customer interest bearing account associated with the first customer; wherein transferring includes: (i) updating the first electronic exchange ledger to reflect the transfer of the fifth amount of the first digital asset out of the respective customer exchange account; (ii) updating the second electronic interest ledger to reflect: a. the transfer of the fifth amount of the first digital asset into the respective customer interest bearing account; and b. the respective interest information associated with the fifth amount of the first digital asset transferred into the respective customer interest bearing account; (i) transferring, by the digital asset exchange system, the fifth amount of the first digital asset from the respective customer interest bearing account to a respective customer intermediate account; wherein transferring includes: (i) updating, the second electronic interest ledger to reflect the transfer of the fifth amount of the first digital asset out of the respective customer interest bearing account; (ii) updating the third electronic reserve ledger to reflect the transfer of the fifth amount of the first digital asset into the respective customer intermediary account; generating, by the digital asset exchange system, a second transfer message to transfer at least a portion of the fifth amount of the first digital asset from the respective customer interest bearing account to a respective customer intermediate account, wherein the second message includes 1. the second digital address associated with the respective customer interest bearing account associated with the first customer; 2. a fourth digital address associated with the respective customer intermediary account associated with the first customer; 3. instructions to transfer at least a portion of the fifth amount of the first digital asset from the respective customer interest bearing account associated with the first customer to a respective customer intermediate account associated with the first customer; iv. publishing the second transfer message to the distributed public transaction ledger in the form of the blockchain wherein the instructions to transfer are executed by the plurality of geographically distributed computer systems in the peer-to-peer network; ii. publishing the second transfer message to the distributed public transaction ledger in the form of the blockchain wherein the instructions to transfer are executed by the plurality of geographically distributed computer systems in the peer-to-peer network; (j) determining, by the digital asset exchange system, a first interest payment for the first customer based at least on the respective interest information associated with the fifth amount of the first digital asset; (k) storing, by the digital asset exchange system, the first interest payment in the second electronic interest ledger; (l) determining, by the digital asset exchange system, a time period to disburse the first interest payment to the first customer based on a payment schedule; (m) updating, by the digital asset exchange system, the first interest payment amount of the first digital asset based on a current period of time; (n) transferring, by the digital asset exchange system, the fifth amount of the first digital asset plus the first interest payment from the interest bearing account to the digital asset exchange account; wherein transferring includes: (1) updating the second electronic interest ledger to reflect removal of the fifth amount of the first digital asset and the first interest payment amount from the first interest bearing account; and (2) updating the first electronic exchange ledger to reflect receipt of the fifth amount of the first digital asset and the first interest payment amount in the respective customer digital asset exchange account associated with the first customer.

In embodiments, the digital asset exchange account is an omnibus account including deposits of the first digital asset associated with the plurality of customers. In embodiments, the interest information includes a first amount of interest. In embodiments, the first amount of interest is denominated in the first digital asset. In embodiments, the first amount of interest is denominated in fiat. In embodiments, the first amount of interest is denominated in a second digital asset. In embodiments, the second digital asset is a stable value token. In embodiments, the interest information includes a first interest rate. In embodiments, the first interest rate is applicable for a first period of time. In embodiments, the interest information includes a second interest rate.

In embodiments, the second interest rate is applicable for a second period of time. In embodiments, at least a portion of the third amount of the first digital asset is loaned to third parties and the respective return information indicates a return to be provided to the respective customer for allowing loaning of the at least a portion of the third amount of the first digital asset.

In embodiments, at least a portion of the third amount of the first digital asset is traded on the digital asset exchange by a third party associated with the intermediary account and the respective return information indicates a return amount to be provided to the respective customer for allowing trading of the at least a portion of the third amount of the first digital asset. In embodiments, the respective return information includes a first return amount. In embodiments, the first return amount is denominated in the first digital asset. In embodiments, the first return amount is denominated in a second digital asset. In embodiments, the first return amount is denominated in fiat. In embodiments, the return amount includes a return rate. In embodiments, the return rate includes a first return rate for a first period of time.

In embodiments, the return rate includes a second return rate for a second period of time. In embodiments, the respective return information includes a return payment schedule indicating when disbursements of the return amount scheduled to be made to the respective customer. In embodiments, the return payment schedule indicates disbursements scheduled to be made periodically. In embodiments, the return payment schedule indicates disbursements to be made aperiodically. In embodiments, a fourth electronic reserve ledger associated with the first digital asset, including, for each customer of the plurality of customers, reserve account information associated with a respective customer reserve account with a fourth digital asset balance indicating a fourth amount of the first digital asset held in the respective customer reserve account.

In embodiments, at least two of the first electronic exchange ledger, the second electronic interest ledger and the third electronic ledger are provided in a first database. In embodiments, the fourth electronic reserve ledger is also provided in the first database. In embodiments, at least two of the first electronic exchange ledger, the second electronic interest ledger and third electronic ledger are provided in at least two different databases.

In embodiments, at least two of the first electronic exchange ledger, the second electronic interest ledger and third electronic ledger and the fourth electronic reserve ledger are provided in at least two different databases. In embodiments, the authenticating step includes associating the first customer access credentials with at least one of a respective customer digital asset exchange account and a respective customer interest bearing account associated with the first customer. In embodiments, the authenticating step includes associating the first customer access credentials with at least one of a respective customer digital asset exchange account, a respective customer interest bearing account and a respective customer reserve account associated with the first customer.

In embodiments, the generating step further includes respective interest information associated with the respective second digital account associated with the first customer. In embodiments, the first request further includes first source information associated with the respective customer exchange account. In embodiments, the first request further includes first destination information associated with the respective customer interest bearing account. In embodiments, the first source information includes a first digital address associated with the underlying blockchain of the first digital asset and the respective customer exchange account associated with the first customer. In embodiments, the first digital address is associated with an omnibus account associated with a plurality of customer of the digital asset exchange.

In embodiments, the first digital address is associated with a segregated account associated with the first customer. In embodiments, the first destination address includes a second digital address associated with the underlying blockchain and the respective customer interest bearing account associated with the first customer. In embodiments, the second digital address is associated with an omnibus account associated with a plurality of customers of the digital asset exchange.

In embodiments, the second digital address is associated with a segregated account associated with the first customer.

In embodiments, the verifying step further includes confirming, based on the user identification information, an identification of the first customer.

In embodiments, the transferring step includes: (i) calculating a reserve amount of the first digital asset based on at least one reserve requirement and the fifth amount of the first digital asset; (ii) updating the first electronic exchange ledger to reflect transfer of the fifth amount of the first digital asset out of the respective customer exchange account; (iii) updating the fourth electronic reserve ledger to reflect transfer of the reserve amount of the first digital asset to the respective customer reserve account; (iv) updating the second electronic interest ledger to reflect transfer of the fifth amount of the first digital asset less the reserve amount of the first digital assert into the respective customer interest bearing account;

In embodiments, the transferring step includes: (i) generating, a first transfer message including instructions to transfer the fifth amount of the first digital asset from the first digital address to the second digital address; (ii) publishing the first transfer message to the plurality of geographically distributed computer systems in the peer-to-peer network, wherein the instructions to transfer are executed by the plurality of geographically distributed computer systems in the peer-to-peer network.

In embodiments, the transferring step includes: (i) generating, a first transfer message including instructions to transfer the fifth amount of the first digital asset less the reserve amount of the first digital asset from the first digital address to the second digital address and the reserve amount of first digital asset from the first digital address to a third digital address associated with a respective customer reserve account associated with the first customer; (ii) publishing the first message to the to the plurality of geographically distributed computer systems in the peer-to-peer network wherein the instructions to transfer are executed by the to the plurality of geographically distributed computer systems in the peer-to-peer network.

In embodiments, the second destination address is associated with a smart contract.

In embodiments, the transferring includes: (i) generating, by the digital asset exchange system, a second transfer message to transfer at least a portion of the fifth amount of the first digital asset less the reserve amount of the first digital asset from the respective customer interest bearing account to a respective customer intermediate account, and wherein the second message includes: (1) the second digital address associated with the respective customer interest bearing account associated with the first customer; (2) a fourth digital address associated with the respective customer intermediary account associated with the first customer; (3) instructions to transfer at least a portion of the fifth amount of the first digital asset less the reserve amount of the first digital asset from the respective customer interest bearing account associated with the first customer to a respective customer intermediate account associated with the first customer; (ii) publishing the second transfer message to the distributed public transaction ledger in the form of the blockchain wherein the instructions to transfer are executed by the plurality of geographically distributed computer systems in the peer-to-peer network.

In embodiments, determining is based on the interest amount. In embodiments, determining is based on the interest rate and period of time that the fifth amount of the first digital asset is held in the respective customer interest bearing account. In embodiments, the first interest rate is used when the period of time that the fifth amount of the first digital asset respective second digital asset account balance has been held in the respective customer interest bearing account falls within the first period of time; and wherein the second interest rate is used when the period of time that the respective second digital asset account balance has been held in the respective customer interest bearing account falls within the second period of time.

In embodiments, the step of determining the interest payment includes determining a gross interest payment and subtracting a reserve withholding amount based on the fourth digital asset balance. In embodiments, the determining step further includes determining a second interest payment for the first customer based on respective interest information associated with a sixth amount of the first digital asset in the respective customer interest bearing account associated with the first customer that does not include the fifth amount of the first digital asset.

In embodiments, the second interest payment is further based on a second interest amount. In embodiments, the second interest amount is the same as the first interest amount. In embodiments, the second interest amount is different from the first interest amount. In embodiments, the second interest payment is further based on a second interest rate and a second period of time that the sixth amount of the first asset is held in the respective customer interest bearing account. In embodiments, the first interest payment is stored in the second electronic interest ledger and associated with the first customer. In embodiments, the first interest payment is associated with the fifth amount of the first digital asset. In embodiments, the first interest amount is included in the interest information associated with the respective customer interest bearing account associated with the first customer.

In embodiments, the second interest payment is stored in the second electronic interest ledger and associated with the first customer. In embodiments, the second interest payment is associated with the sixth amount of the first digital asset. In embodiments, the second interest amount is included in the interest information associated with the respective customer interest bearing account associated with the first customer.

In embodiments, the first interest payment and the second interest payment are added together to provide a first total return and stored in the second electronic interest ledger. In embodiments, the method further includes prior to step (j) receiving, in the first interest bearing account, a first return from the intermediary account. In embodiments, the determining step is based at least on the respective interest information associated with the fifth amount of the first digital asset and the first return, wherein the first interest payment is at least a portion of the first return. In embodiments, the payment schedule indicates payment of the first interest based on a request for redemption received from the first user.

In embodiments, the first interest payment is made based on expiration of a predetermined period of time. In embodiments, the determining step includes receiving, from the first user device, a request to transfer the fifth amount of the first digital asset to the respective customer digital asset exchange account. In embodiments, determining includes determining that a predetermined period of time has expired. In embodiments, transferring includes: (3) generating a second transfer message to transfer the fifth amount of the first digital asset and the first interest payment amount from the second digital address to the second digital address; (4) publishing the second transfer message to the distributed network where the instructions are executed by the plurality of geographically distributed computer systems in the first peer-to-peer network.

In embodiments, transferring includes transferring the reserve amount to the respective customer digital asset account using the steps of: updating the second electronic interest ledger to reflect removal of the fifth amount and the first interest payment amount of the first digital asset from the respective customer interest bearing account and updating the fourth electronic reserve ledger to reflect removal of the reserve amount of the first digital asset from the respective customer reserve account and updating the first electronic exchange ledger to reflect transfer of the fifth amount, the first interest payment amount and the reserve amount of the first digital asset into the respective customer exchange account.

In embodiments, transferring includes: (i) generating a fourth transfer message including instructions to transfer the fifth amount and the first interest payment amount of the first digital asset from the second digital address to the first digital address and instructions to transfer the reserve amount of the first digital asset from the fourth digital address to the first digital address; (ii) publishing the fourth transfer message to the distributed network where the instructions are executed by the plurality of geographically distributed computer systems in the first peer-to-peer network.

In embodiments, the transferring step further includes transferring the second interest payment from the respective customer interest bearing account associated with the first customer to respective customer digital asset exchange account associated with the first customer.

In embodiments, transferring includes: (1) updating the second electronic interest ledger to reflect removal of the fifth amount of the first digital asset and the second interest payment amount from the first interest bearing account; (2) updating the first electronic interest ledger to reflect receipt of the fifth amount of the first digital asset and the second interest payment amount in the respective customer digital asset exchange account associated with the first customer.

In embodiments, transferring includes: (3) generating a third transfer message to transfer the fifth amount of the first digital asset and the second interest payment amount from the second digital address to the first digital address; (4) publishing the second transfer message to the distributed network where the instructions are executed by the plurality of geographically distributed computer systems in the first peer-to-peer network.

In embodiments, the second interest payment is denominated in the second digital asset. In embodiments, the second digital asset is maintained on a second distributed ledger in the form of a second blockchain a blockchain network including a second plurality of geographically distributed computer systems in a second peer-to-peer network. In embodiments, the second distributed ledger is the same as the first distributed ledger. In embodiments, the second distributed ledger is different than the first distributed ledger.

In embodiments, the method further includes a fifth electronic ledger associated with the second digital asset including, for each customer of a plurality of customers of the digital asset exchange, second exchange account information associated with each respective customer exchange account including a fifth digital asset account balance associated with a first amount of the second digital asset held in the respective customer exchange account that are available for transfer via the digital asset exchange.

In embodiments, the transferring step further includes: (1) updating the second electronic interest ledger to reflect removal of the second interest payment of the second digital asset; and 2) updating the fifth electronic ledger to reflect the addition of the second interest payment amount of the second digital asset;

In embodiments, the transferring step further includes: (i) generating a fifth transfer message including instructions to transfer the second interest payment amount of the second digital asset from the second digital address to the fifth digital address associated with the second blockchain; (ii) publishing the fifth transfer message to the second distributed ledger, wherein the instructions are executed by the second plurality of geographically distributed computer systems in the second peer-to-peer network.

In embodiments, the method further includes providing a sixth electronic fiat ledger associated with a first fiat, including, for each customer of a plurality of customers of the digital asset exchange, fiat account information associated with each respective customer exchange fiat account including a first fiat account balance associated with a first amount of fiat held in the respective customer exchange fiat account.

In embodiments, the transferring step includes updating the sixth electronic fiat ledger to include the second interest payment in the first fiat in the respective customer exchange fiat account.

In embodiments a method includes: (a) providing one or more databases, operatively connected to a digital asset exchange system associated with a digital asset exchange, which include: (1) a first electronic exchange ledger associated with a first digital asset including, for each customer of a plurality of customers of the digital asset exchange, exchange account information associated with each respective customer exchange account including a first digital asset account balance associated with a first amount of the first digital asset held in the respective customer exchange account that are available for transfer via the digital asset exchange; wherein the first digital asset is maintained on a distributed public transaction ledger in the form of a blockchain that is maintained by a blockchain network including a plurality of geographically distributed computer systems in a peer-to-peer network; (2) a second electronic interest ledger associated with the first digital asset including, for each customer of the plurality of customers of the digital asset exchange, interest bearing account information associated with a respective customer interest bearing account with a second digital asset account balance associated with a second amount of the first digital asset held in the respective customer interest bearing account and respective interest information; (3) a third electronic ledger associated with an intermediary, including, for each customer of the plurality of customers of the digital asset exchange, intermediary account information associated with a respective customer intermediary account with a third digital asset balance indicating a third amount of the first digital asset held in the respective customer intermediary account and respective return information; (b) receiving, at the digital asset exchange system, first customer access credentials from a first customer device associated with a first customer of the digital asset exchange; (c) authenticating, by the digital asset exchange system, the first customer based on at least the first customer access credentials; (d) generating, by the digital asset exchange system, a first response including: (1) customer identification information associated with the first customer; (2) a respective first digital asset account balance associated with the first customer; (3) a respective second digital asset account balance associated with the first customer; (4) a transfer option to transfer digital assets into the respective customer interest bearing account associated with the first user; (e) sending, by the digital asset exchange system to the first customer device, the first response; (f) receiving, by the digital asset exchange system, from the first customer device, a first request to transfer a fifth amount of the first digital asset from the respective customer exchange account associated with the first customer to the respective customer interest bearing account associated with the first customer, the first request comprising: (i) identification information associated with the first digital asset; (ii) the fifth amount of the first digital asset; (g) verifying, by the digital asset exchange system, the first request, wherein the step of verifying includes: (1) confirming, that the fifth amount of the first digital asset is less than or equal to the first digital asset account balance associated with the first customer; (h) transferring, by the digital asset exchange system, the fifth amount of the first digital asset from the respective customer exchange account associated with the first customer to the respective customer interest bearing account associated with the first customer; wherein transferring includes: (i) updating the first electronic exchange ledger to reflect the transfer of the fifth amount of the first digital asset out of the respective customer exchange account; (ii) updating the second electronic interest ledger to reflect: a. the transfer of the fifth amount of the first digital asset into the respective customer interest bearing account; and b. the respective interest information associated with the fifth amount of the first digital asset transferred into the respective customer interest bearing account; (i) transferring, by the digital asset exchange system, the fifth amount of the first digital asset from the respective customer interest bearing account to a respective customer intermediate account; wherein transferring incudes: a. updating, the second electronic interest ledger to reflect the transfer of the fifth amount of the first digital asset out of the respective customer interest bearing account; b. updating the third electronic ledger to reflect the transfer of the fifth amount of the first digital asset into the respective customer intermediary account; c. generating, by the digital asset exchange system, a second transfer message including instructions to transfer at least a portion of the fifth amount of the first digital asset from the second digital address to a fourth digital address associated with a first smart contract; d. publishing, by the digital asset exchange system, the second transfer message to the distributed public ledger wherein the instructions are executed by the to the plurality of geographically distributed computer systems in the peer-to-peer network; (j) confirming, by the digital asset exchange computer system, receipt of the at least a portion of the first amount of the first digital asset at the fourth digital address; (k) determining, by the digital asset exchange system, a first interest payment for the first customer based at least on the respective interest information associated with the fifth amount of the first digital asset; (1) storing, by the digital asset exchange system, the first interest payment in the second electronic interest ledger; (m) determining, by the digital asset exchange system, when to disburse the first interest payment to the first customer based on a payment schedule; (n) transferring, by the digital asset exchange, the first interest payment from the second digital address to the first digital address based on the payment schedule; transferring includes: a. updating the second electronic interest ledger to reflect the transfer of the first interest payment out of the respective customer exchange account; b. updating the first electronic exchange ledger to reflect receipt of the first interest payment of the first digital asset into the respective customer digital asset exchange account; c. generating a third transfer message including instructions to transfer the first interest payment of the first digital asset from the second digital address to the first digital address; d. publishing the third transfer message to the distributed public transaction ledger in the form of the blockchain wherein the instructions to transfer are executed by the plurality of geographically distributed computer systems in the peer-to-peer network.

In embodiments, the digital asset exchange account is an omnibus account including deposits of the first digital asset associated with the plurality of customers. In embodiments, the interest information includes a first amount of interest. In embodiments, the first amount of interest is denominated in the first digital asset. In embodiments, the first amount of interest is denominated in fiat. In embodiments, the first amount of interest is denominated in a second digital asset. In embodiments, the second digital asset is a stable value token. In embodiments, the interest information includes a first interest rate.

In embodiments, the first interest rate is applicable for a first period of time. In embodiments, the interest information includes a second interest rate. In embodiments, the second interest rate is applicable for a second period of time. In embodiments, at least a portion of the third amount of the first digital asset is loaned to third parties and the respective return information indicates a return to be provided to the respective customer for allowing loaning of the at least a portion of the third amount of the first digital asset.

In embodiments, at least a portion of the third amount of the first digital asset is traded on the digital asset exchange by a third party associated with the intermediary account and the respective return information indicates a return amount to be provided to the respective customer for allowing trading of the at least a portion of the third amount of the first digital asset.

In embodiments, the respective return information includes a first return amount. In embodiments, the first return amount is denominated in the first digital asset. In embodiments, the first return amount is denominated in a second digital asset. In embodiments, the first return amount is denominated in fiat.

In embodiments, the return amount includes a return rate. In embodiments, the return rate includes a first return rate for a first period of time. In embodiments, the return rate includes a second return rate for a second period of time. In embodiments, the respective return information includes a return payment schedule indicating when disbursements of the return amount scheduled to be made to the respective customer. In embodiments, the return payment schedule indicates disbursements scheduled to be made periodically. In embodiments, the return payment schedule indicates disbursements to be made aperiodically.

In embodiments, a fourth electronic reserve ledger associated with the first digital asset, including, for each customer of the plurality of customers, reserve account information associated with a respective customer reserve account with a fourth digital asset balance indicating a fourth amount of the first digital asset held in the respective customer reserve account.

In embodiments, at least two of the first electronic exchange ledger, the second electronic interest ledger and the third electronic ledger are provided in a first database. In embodiments, the fourth electronic reserve ledger is also provided in the first database. In embodiments, at least two of the first electronic exchange ledger, the second electronic interest ledger and third electronic ledger are provided in at least two different databases. In embodiments, at least two of the first electronic exchange ledger, the second electronic interest ledger and third electronic ledger and the fourth electronic reserve ledger are provided in at least two different databases. In embodiments, the authenticating step includes associating the first customer access credentials with at least one of a respective customer digital asset exchange account and a respective customer interest bearing account associated with the first customer.

In embodiments, the authenticating step includes associating the first customer access credentials with at least one of a respective customer digital asset exchange account, a respective customer interest bearing account and a respective customer reserve account associated with the first customer. In embodiments, the generating step further includes respective interest information associated with the respective second digital account associated with the first customer. In embodiments, the method further includes first source information associated with the respective customer exchange account.

In embodiments, the method further includes first destination information associated with the respective customer interest bearing account. In embodiments, the first source information includes a first digital address associated with the underlying blockchain of the first digital asset and the respective customer exchange account associated with the first customer. In embodiments, the first digital address is associated with an omnibus account associated with a plurality of customer of the digital asset exchange. In embodiments, the first digital address is associated with a segregated account associated with the first customer.

In embodiments, the first destination address includes a second digital address associated with the underlying blockchain and the respective customer interest bearing account associated with the first customer. In embodiments, the second digital address is associated with an omnibus account associated with a plurality of customers of the digital asset exchange. In embodiments, the second digital address is associated with a segregated account associated with the first customer. In embodiments, the verifying step further includes confirming, based on the user identification information, an identification of the first customer. In embodiments, the transferring step includes: (i) calculating a reserve amount of the first digital asset based on at least one reserve requirement and the fifth amount of the first digital asset; (ii) updating the first electronic exchange ledger to reflect transfer of the fifth amount of the first digital asset out of the respective customer exchange account; (iii) updating the fourth electronic reserve ledger to reflect transfer of the reserve amount of the first digital asset to the respective customer reserve account; (iv) updating the second electronic interest ledger to reflect transfer of the fifth amount of the first digital asset less the reserve amount of the first digital assert into the respective customer interest bearing account.

In embodiments, the transferring step includes: (i) generating, a first transfer message including instructions to transfer the fifth amount of the first digital asset from the first digital address to the second digital address; (ii) publishing the first transfer message to the plurality of geographically distributed computer systems in the peer-to-peer network, wherein the instructions to transfer are executed by the plurality of geographically distributed computer systems in the peer-to-peer network.

In embodiments, the transferring step includes: (i) generating, a first transfer message including instructions to transfer the fifth amount of the first digital asset less the reserve amount of the first digital asset from the first digital address to the second digital address and the reserve amount of first digital asset from the first digital address to a third digital address associated with a respective customer reserve account associated with the first customer; (ii) publishing the first message to the to the plurality of geographically distributed computer systems in the peer-to-peer network wherein the instructions to transfer are executed by the to the plurality of geographically distributed computer systems in the peer-to-peer network.

In embodiments, the confirming step includes confirming by the digital asset exchange computer system receipt of a receipt token at the second digital address from the fourth digital address based on reference to the blockchain. In embodiments, the confirming step includes monitoring the fourth digital address to confirm receipt of the at least a portion of the fifth amount of the digital asset. In embodiments, the at least a portion of the fifth amount of the first digital asset includes the fifth amount of the first digital asset less the reserve amount of the first digital asset. In embodiments, the confirming step includes confirming that the reserve amount of the first digital asset is present at the third digital address based on reference to the blockchain. In embodiments, determining is based on a first interest amount.

In embodiments, determining is based on a first interest rate and period of time that the fifth amount of the first digital asset is held in the respective customer interest bearing account. In embodiments, the first interest rate is used when the period of time that the fifth amount of the first digital asset respective second digital asset account balance has been held in the respective customer interest bearing account falls within the first period of time; and wherein the second interest rate is used when the period of time that the respective second digital asset account balance has been held in the respective customer interest bearing account falls within the second period of time. In embodiments, the step of determining the interest payment includes determining a gross interest payment and subtracting a reserve withholding amount based on the fourth digital asset balance.

In embodiments, the determining step further includes determining a second interest payment for the first customer based on respective interest information associated with a sixth amount of the first digital asset in the respective customer interest bearing account associated with the first customer that does not include the fifth amount of the first digital asset. In embodiments, the second interest payment is further based on a second interest amount. In embodiments, the second interest amount is the same as the first interest amount. In embodiments, the second interest amount is different from the first interest amount. In embodiments, the second interest payment is further based on a second interest rate and a second period of time that the sixth amount of the first asset is held in the respective customer interest bearing account. In embodiments, the first interest payment is stored in the second electronic interest ledger and associated with the first customer. In embodiments, the first interest payment is associated with the fifth amount of the first digital asset.

In embodiments, the first interest amount is included in the interest information associated with the respective customer interest bearing account associated with the first customer. In embodiments, the second interest payment is stored in the second electronic interest ledger and associated with the first customer.

In embodiments, the second interest payment is associated with the sixth amount of the first digital asset. In embodiments, the second interest amount is included in the interest information associated with the respective customer interest bearing account associated with the first customer. In embodiments, the first interest payment and the second interest payment are added together to provide a first total return and stored in the second electronic interest ledger. In embodiments, the method further includes prior to step (j) receiving, in the first interest bearing account, a first return from the intermediary account.

In embodiments, the determining step is based at least on the respective interest information associated with the fifth amount of the first digital asset and the first return, wherein the first interest payment is at least a portion of the first return. In embodiments, the payment schedule indicates that interest payments are to be made periodically. In embodiments, the payment schedule indicates that interest payments are to be made aperiodically. In embodiments, the payment schedule indicates that interest payments are made based on receipt of a return payment from the fourth digital address. In embodiments, determining includes monitoring the design digital address for receipt of the return payment from the fourth digital address. In embodiments, the payment schedule indicates that the interest payment is made upon a request received from the first customer. In embodiments, the determining step includes determining when to disburse the second interest payment based on the payment schedule.

In embodiments, the payment interest schedule indicates payment of the second interest payment with the first interest payment. In embodiments, the payment schedule indicates that the second interest payment is to be paid periodically. In embodiments, the payment schedule indicates that the second interest payment is to be paid aperiodically. In embodiments, the payment schedule indicates that the second interest payment is to be paid based on receipt by the respective customer interest bearing account, a return payment from the respective customer intermediary account. In embodiments, the determining step includes monitoring the second digital address to detect receipt of the return payment at the second digital address.

In embodiments, the payment schedule indicates the second interest payment is to be paid upon a request received from the first customer. In embodiments, the first interest amount is denominated in the second digital asset. In embodiments, the second digital asset is maintained on a second distributed ledger in the form of a second blockchain a blockchain network including a second plurality of geographically distributed computer systems in a second peer-to-peer network. In embodiments, the second distributed ledger is the same as the first distributed ledger. In embodiments, the second distributed interest ledger is different than the first distributed ledger. In embodiments, the method further includes a fifth electronic ledger associated with the second digital asset including, for each customer of a plurality of customers of the digital asset exchange, second exchange account information associated with each respective customer exchange account including a fifth digital asset account balance associated with a first amount of the second digital asset held in the respective customer exchange account that are available for transfer via the digital asset exchange.

In embodiments, the transferring step includes: (i) updating the second electronic interest ledger and the fifth electronic ledger to reflect transfer of the first interest amount of the second digital asset from the respective customer interest bearing account to the respective customer exchange account; (ii) generating a third transfer message including instructions to transfer the first interest payment of the second digital asset from the second digital address to the first digital address; and (iii) publishing the third transfer message to the second distributed ledger in the form of the second blockchain wherein the instructions are executed by the second plurality of geographically distributed computer systems in the second peer-to-peer network. In embodiments, the first interest payment amount is denominated in a first digital asset and a second digital asset.

In embodiments, transferring includes: (i) updating the second electronic ledger and the first electronic exchange ledger to reflect transfer of a first portion of the first interest payment of the first digital asset from the respective customer interest bearing account to the first customer exchange account; and (ii) updating the second electronic interest ledger and the fifth electronic ledger to reflect transfer of the second portion of the second digital asset from the to reflect transfer of the second portion of the second digital asset from the respective customer interest bearing account to the respective customer exchange account; (iii) generating a third transfer message including instructions to transfer the first portion of the first interest payment of the first digital asset from the second digital address to the first digital address and the second portion of the first interest payment of the second digital asset from the second digital address to the first digital address; (iv) publishing the third transfer message to the first distributed network and the second distributed network, where the instructions to transfer the first portion of the first interest payment of the first digital asset are executed by the plurality of geographically distributed computer systems in the first peer-to-peer network and the instructions to transfer the second portion of the first interest payment of the second digital asset are executed by the second plurality of geographically distributed computer systems in the second peer-to-peer network.

In embodiments, the first interest amount is denominated a first fiat. In embodiments, the method further includes a sixth electronic fiat ledger associated with a first fiat, including, for each customer of a plurality of customers of the digital asset exchange, first fiat account information associated with each respective customer exchange first fiat account including a first fiat account balance associated with a first amount of the first fiat held in the respective customer exchange first fiat account. In embodiments, the transferring step includes updating the sixth electronic fiat ledger to include the first interest amount of the first fiat in the respective customer exchange first fiat account. In embodiments, the method further includes providing at least a second intermediary electronic ledger, including, for each customer of the plurality of customers, a fifth digital asset account balance indicating a sixth amount of the first digital asset associated with a second respective customer interest bearing account associated with the second respective interest bearing account.

In embodiments, the first interest bearing account is associated with a first intermediary and the second interest bearing account is associated with a second intermediary. In embodiments, the first request includes intermediary selection information identifying at least one of the first intermediary and the second intermediary. In embodiments, the transferring step includes: (1) transferring the fifth amount of the digital asset from the respective exchange customer account to the first interest bearing account when the intermediary selection information identifies the first intermediary; and (2) transferring the fifth amount of the digital asset from the respective exchange customer account to the second interest bearing account when the intermediary selection information identifies the second intermediary.

In embodiments, the transferring step comprises: (1) comparing a first interest bearing account balance to a predetermined minimum balance; and (2) transferring the fifth amount of first digital asset to the first interest bearing account when the first interest bearing account balance is below the predetermined minimum balance; and (3) transferring the fifth amount of the first digital asset to at least one of the first interest bearing account and the second interest bearing account when the first interest bearing account balance is not below the predetermined minimum balance. In embodiments, the transferring step includes: (1) comparing a first interest bearing account balance to a predetermined maximum balance; and (2) transferring the fifth amount of first digital asset to the second interest bearing account when the first interest bearing account balance is above the predetermined maximum balance; and (3) transferring the fifth amount of the first digital asset to at least one of the first interest bearing account and the second interest bearing account when the first interest bearing account balance is not above the predetermined maximum balance.

In embodiments, transferring includes: (i) updating, by the digital asset exchange system, the first electronic exchange ledger and at least one of the second electronic interest ledger and the fifth account ledger to account for the transfer of the fifth amount of the first digital asset from the respective exchange customer account to at least one of the first interest bearing account and the second interest bearing account; (ii) generating a fourth transfer message including instructions to transfer the fifth amount of the first digital asset from the first address to the second digital address when the fifth amount of digital assets are transferred to the first interest bearing account and to a sixth digital address associated with the second interest bearing account when the fifth amount of the first digital asset is to be transferred to the second interest bearing account; (iii) publishing the fourth transfer message to the first distributed network where the instructions are executed by the plurality of geographically distributed computer systems in the first peer-to-peer network.

In embodiments a method includes: (a) providing one or more databases, operatively connected to a digital asset exchange system associated with a digital asset exchange, which include: (1) a first electronic exchange ledger associated with a first digital asset including, for each customer of a plurality of customers of the digital asset exchange, exchange account information associated with each respective customer exchange account including a first digital asset account balance associated with a first amount of the first digital asset held in the respective customer exchange account that are available for transfer via the digital asset exchange; wherein the first digital asset is maintained on a distributed public transaction ledger in the form of a blockchain that is maintained by a blockchain network including a plurality of geographically distributed computer systems in a peer-to-peer network; (2) a second electronic interest ledger associated with the first digital asset including, for each customer of the plurality of customers of the digital asset exchange, interest bearing account information associated with a respective customer interest bearing account with a second digital asset account balance associated with a second amount of the first digital asset held in the respective customer interest bearing account and respective interest information; (3) a third electronic ledger associated with an intermediary, including, for each customer of the plurality of customers of the digital asset exchange, intermediary account information associated with a respective customer intermediary account with a third digital asset balance indicating a third amount of the first digital asset held in the respective customer intermediary account and respective return information; (b) receiving, at the digital asset exchange system, first customer access credentials from a first customer device associated with a first customer of the digital asset exchange; (c) authenticating, by the digital asset exchange system, the first customer based on at least the first customer access credentials; (d) generating, by the digital asset exchange system, a first response including: (1) customer identification information associated with the first customer; (2) a respective first digital asset account balance associated with the first customer; (3) a respective second digital asset account balance associated with the first customer; (4) a transfer option to transfer digital assets into the respective customer interest bearing account associated with the first user; (e) sending, by the digital asset exchange system to the first customer device, the first response; (f) receiving, by the digital asset exchange system, from the first customer device, a first request to transfer a fifth amount of the first digital asset from the respective customer exchange account associated with the first customer to the respective customer interest bearing account associated with the first customer, the first request comprising: (i) identification information associated with the first digital asset; (ii) the fifth amount of the first digital asset; (g) verifying, by the digital asset exchange system, the first request, wherein the step of verifying includes: (1) confirming, that the fifth amount of the first digital asset is less than or equal to the first digital asset account balance associated with the first customer; (h) transferring, by the digital asset exchange system, the fifth amount of the first digital asset from the respective customer exchange account associated with the first customer to the respective customer interest bearing account associated with the first customer; wherein transferring includes: (i) updating the first electronic exchange ledger to reflect the transfer of the fifth amount of the first digital asset out of the respective customer exchange account; (ii) updating the second electronic interest ledger to reflect: a. the transfer of the fifth amount of the first digital asset into the respective customer interest bearing account; and b. the respective interest information associated with the fifth amount of the first digital asset transferred into the respective customer interest bearing account; (i) transferring, by the digital asset exchange system, the fifth amount of the first digital asset from the respective customer interest bearing account to a respective customer intermediate account; wherein transferring incudes: a. updating, the second electronic interest ledger to reflect the transfer of the fifth amount of the first digital asset out of the respective customer interest bearing account; b. updating the third electronic ledger to reflect the transfer of the fifth amount of the first digital asset into the respective customer intermediary account; c. generating, by the digital asset exchange system, a second transfer message including instructions to transfer at least a portion of the fifth amount of the first digital asset from the second digital address to a fourth digital address associated with a first smart contract; d. publishing, by the digital asset exchange system, the second transfer message to the distributed public ledger wherein the instructions are executed by the to the plurality of geographically distributed computer systems in the peer-to-peer network; (j) confirming, by the digital asset exchange computer system, receipt of the at least a portion of the first amount of the first digital asset at the fourth digital address; (k) determining, by the digital asset exchange system, a first interest payment for the first customer based at least on the respective interest information associated with the fifth amount of the first digital asset; (l) storing, by the digital asset exchange system, the first interest payment in the second electronic interest ledger; (m) determining, by the digital asset exchange system, a time period to disburse the first interest payment to the first customer based on a payment schedule; (n) updating, by the digital asset exchange system, the first interest payment amount of the first digital asset based on a current period of time; (n) transferring, by the digital asset exchange system, the fifth amount of the first digital asset plus the first interest payment from the interest bearing account to the digital asset exchange account; wherein transferring includes: i. updating the second account ledger to reflect removal of the fifth amount of the first digital asset and the first interest payment amount from the first interest bearing account; and ii. updating the first electronic exchange ledger to reflect receipt of the fifth amount of the first digital asset and the first interest payment amount in the respective customer digital asset exchange account associated with the first customer; iii. generating a second transfer message to transfer the fifth amount of the first digital asset and the first interest payment amount from the second digital address to the first digital address; iv. publishing the second transfer message to the distributed network where the instructions are executed by the plurality of geographically distributed computer systems in the first peer-to-peer network.

In embodiments, the digital asset exchange account is an omnibus account including deposits of the first digital asset associated with the plurality of customers. In embodiments, the interest information includes a first amount of interest. In embodiments, the first amount of interest is denominated in the first digital asset. In embodiments, the first amount of interest is denominated in fiat. In embodiments, the first amount of interest is denominated in a second digital asset. In embodiments, the second digital asset is a stable value token. In embodiments, the interest information includes a first interest rate. In embodiments, the first interest rate is applicable for a first period of time. In embodiments, the interest information includes a second interest rate. In embodiments, the second interest rate is applicable for a second period of time. In embodiments, at least a portion of the third amount of the first digital asset is loaned to third parties and the respective return information indicates a return to be provided to the respective customer for allowing loaning of the at least a portion of the third amount of the first digital asset.

In embodiments, at least a portion of the third amount of the first digital asset is traded on the digital asset exchange by a third party associated with the intermediary account and the respective return information indicates a return amount to be provided to the respective customer for allowing trading of the at least a portion of the third amount of the first digital asset. In embodiments, the respective return information includes a first return amount. In embodiments, the first return amount is denominated in the first digital asset. In embodiments, the first return amount is denominated in a second digital asset. In embodiments, the first return amount is denominated in fiat. In embodiments, the return amount includes a return rate. In embodiments, the return rate includes a first return rate for a first period of time. In embodiments, the return rate includes a second return rate for a second period of time. In embodiments, the respective return information includes a return payment schedule indicating when disbursements of the return amount scheduled to be made to the respective customer. In embodiments, the return payment schedule indicates disbursements scheduled to be made periodically. In embodiments, the return payment schedule indicates disbursements to be made aperiodically. In embodiments, a fourth electronic reserve ledger associated with the first digital asset, including, for each customer of the plurality of customers, reserve account information associated with a respective customer reserve account with a fourth digital asset balance indicating a fourth amount of the first digital asset held in the respective customer reserve account.

In embodiments, at least two of the first electronic exchange ledger, the second electronic interest ledger and the third electronic ledger are provided in a first database. In embodiments, the fourth electronic reserve ledger is also provided in the first database. In embodiments, at least two of the first electronic exchange ledger, the second electronic interest ledger and third electronic ledger are provided in at least two different databases. In embodiments, at least two of the first electronic exchange ledger, the second electronic interest ledger and third electronic ledger and the fourth electronic reserve ledger are provided in at least two different databases.

In embodiments, the authenticating step includes associating the first customer access credentials with at least one of a respective customer digital asset exchange account and a respective customer interest bearing account associated with the first customer. In embodiments, the authenticating step includes associating the first customer access credentials with at least one of a respective customer digital asset exchange account, a respective customer interest bearing account and a respective customer reserve account associated with the first customer. In embodiments, the generating step further includes respective interest information associated with the respective second digital account associated with the first customer.

In embodiments, the method further includes first source information associated with the respective customer exchange account. In embodiments, the method further includes first destination information associated with the respective customer interest bearing account. In embodiments, the first source information includes a first digital address associated with the underlying blockchain of the first digital asset and the respective customer exchange account associated with the first customer. In embodiments, the first digital address is associated with an omnibus account associated with a plurality of customer of the digital asset exchange.

In embodiments, the first digital address is associated with a segregated account associated with the first customer. In embodiments, the first destination address includes a second digital address associated with the underlying blockchain and the respective customer interest bearing account associated with the first customer. In embodiments, the second digital address is associated with an omnibus account associated with a plurality of customers of the digital asset exchange. In embodiments, the second digital address is associated with a segregated account associated with the first customer. In embodiments, the verifying step further includes confirming, based on the user identification information, an identification of the first customer.

In embodiments, the transferring step includes: (i) calculating a reserve amount of the first digital asset based on at least one reserve requirement and the fifth amount of the first digital asset; (ii) updating the first electronic exchange ledger to reflect transfer of the fifth amount of the first digital asset out of the respective customer exchange account; (iii) updating the fourth electronic reserve ledger to reflect transfer of the reserve amount of the first digital asset to the respective customer reserve account; (iv) updating the second electronic interest ledger to reflect transfer of the fifth amount of the first digital asset less the reserve amount of the first digital assert into the respective customer interest bearing account.

In embodiments, the transferring step includes: (i) generating, a first transfer message including instructions to transfer the fifth amount of the first digital asset from the first digital address to the second digital address; (ii) publishing the first transfer message to the plurality of geographically distributed computer systems in the peer-to-peer network, wherein the instructions to transfer are executed by the plurality of geographically distributed computer systems in the peer-to-peer network. In embodiments, the transferring step includes: (i) generating, a first transfer message including instructions to transfer the fifth amount of the first digital asset less the reserve amount of the first digital asset from the first digital address to the second digital address and the reserve amount of first digital asset from the first digital address to a third digital address associated with a respective customer reserve account associated with the first customer; (ii) publishing the first message to the to the plurality of geographically distributed computer systems in the peer-to-peer network wherein the instructions to transfer are executed by the to the plurality of geographically distributed computer systems in the peer-to-peer network.

In embodiments, the confirming step includes confirming by the digital asset exchange computer system receipt of a receipt token at the second digital address from the fourth digital address based on reference to the blockchain.

In embodiments, the confirming step includes monitoring the fourth digital address to confirm receipt of the at least a portion of the fifth amount of the digital asset. In embodiments, the at least a portion of the fifth amount of the first digital asset includes the fifth amount of the first digital asset less the reserve amount of the first digital asset. In embodiments, the confirming step includes confirming that the reserve amount of the first digital asset is present at the third digital address based on reference to the blockchain. In embodiments, determining is based on a first interest amount. In embodiments, determining is based on a first interest rate and period of time that the fifth amount of the first digital asset is held in the respective customer interest bearing account.

In embodiments, the first interest rate is used when the period of time that the fifth amount of the first digital asset respective second digital asset account balance has been held in the respective customer interest bearing account falls within the first period of time; and wherein the second interest rate is used when the period of time that the respective second digital asset account balance has been held in the respective customer interest bearing account falls within the second period of time.

In embodiments, the step of determining the interest payment includes determining a gross interest payment and subtracting a reserve withholding amount based on the fourth digital asset balance. In embodiments, the determining step further includes determining a second interest payment for the first customer based on respective interest information associated with a sixth amount of the first digital asset in the respective customer interest bearing account associated with the first customer that does not include the fifth amount of the first digital asset. In embodiments, the second interest payment is further based on a second interest amount. In embodiments, the second interest amount is the same as the first interest amount. In embodiments, the second interest amount is different from the first interest amount. In embodiments, the second interest payment is further based on a second interest rate and a second period of time that the sixth amount of the first asset is held in the respective customer interest bearing account.

In embodiments, the first interest payment is stored in the second electronic interest ledger and associated with the first customer. In embodiments, the first interest payment is associated with the fifth amount of the first digital asset. In embodiments, the first interest amount is included in the interest information associated with the respective customer interest bearing account associated with the first customer. In embodiments, the second interest payment is stored in the second electronic interest ledger and associated with the first customer.

In embodiments, the second interest payment is associated with the sixth amount of the first digital asset. In embodiments, the second interest amount is included in the interest information associated with the respective customer interest bearing account associated with the first customer. In embodiments, the first interest payment and the second interest payment are added together to provide a first total return and stored in the second electronic interest ledger.

In embodiments, the method further includes prior to step (j) receiving, in the first interest bearing account, a first return from the intermediary account. In embodiments, the determining step is based at least on the respective interest information associated with the fifth amount of the first digital asset and the first return, wherein the first interest payment is at least a portion of the first return.

In embodiments, the payment schedule indicates payment of the first interest based on a request for redemption received from the first user. In embodiments, the first interest payment is made based on expiration of a predetermined period of time. In embodiments, the determining step includes receiving, from the first user device, a request to transfer the fifth amount of the first digital asset to the respective customer digital asset exchange account.

In embodiments, determining includes determining that a predetermined period of time has expired. In embodiments, transferring includes: (i) updating the second electronic interest ledger to reflect removal of the fifth amount and the first interest payment amount of the first digital asset from the respective customer interest bearing account and updating the fourth electronic reserve ledger to reflect removal of the reserve amount of the first digital asset from the respective customer reserve account and updating the first electronic exchange ledger to reflect transfer of the fifth amount, the first interest payment amount and the reserve amount of the first digital asset into the respective customer exchange account; (ii) generating a fourth transfer message including instructions to transfer the fifth amount and the first interest payment amount of the first digital asset from the second digital address to the first digital address and instructions to transfer the reserve amount of the first digital asset from the fourth digital address to the first digital address; (iii) publishing the fourth transfer message to the distributed network where the instructions are executed by the plurality of geographically distributed computer systems in the first peer-to-peer network.

In embodiments, the transferring step further comprises transferring the second interest payment from the respective customer interest bearing account associated with the first customer to respective customer digital asset exchange account associated with the first customer. In embodiments, transferring includes: (1) updating the second electronic interest ledger to reflect removal of the fifth amount of the first digital asset and the second interest payment amount from the first interest bearing account; and (2) updating the first electronic interest ledger to reflect receipt of the fifth amount of the first digital asset and the second interest payment amount in the respective customer digital asset exchange account associated with the first customer; (3) generating a third transfer message to transfer the fifth amount of the first digital asset and the second interest payment amount from the second digital address to the first digital address; (4) publishing the second transfer message to the distributed network where the instructions are executed by the plurality of geographically distributed computer systems in the first peer-to-peer network.

In embodiments, the second interest payment is denominated in the second digital asset. In embodiments, the second digital asset is maintained on a second distributed ledger in the form of a second blockchain a blockchain network including a second plurality of geographically distributed computer systems in a second peer-to-peer network. In embodiments, the second distributed ledger is the same as the first distributed ledger. In embodiments, the second distributed ledger is different than the first distributed ledger. In embodiments, the method further includes a fifth electronic ledger associated with the second digital asset including, for each customer of a plurality of customers of the digital asset exchange, second exchange account information associated with each respective customer exchange account including a fifth digital asset account balance associated with a first amount of the second digital asset held in the respective customer exchange account that are available for transfer via the digital asset exchange.

In embodiments, the transferring step further includes: (1) updating the second electronic interest ledger to reflect removal of the second interest payment of the second digital asset; and (2) updating the fifth electronic ledger to reflect the addition of the second interest payment amount of the second digital asset; (3) generating a fifth transfer message including instructions to transfer the second interest payment amount of the second digital asset from the second digital address to the first digital address; (4) publishing the fifth transfer message to the second distributed ledger, wherein the instructions are executed by the second plurality of geographically distributed computer systems in the second peer-to-peer network.

In embodiments, the first interest amount is denominate in a first fiat. In embodiments, the method further comprises providing a sixth electronic fiat ledger associated with a first fiat, including, for each customer of a plurality of customers of the digital asset exchange, fiat account information associated with each respective customer exchange fiat account including a first fiat account balance associated with a first amount of fiat held in the respective customer exchange fiat account.

In embodiments, the transferring step includes updating the sixth electronic fiat ledger to include the second interest payment in the first fiat in the respective customer exchange fiat account.

BRIEF DESCRIPTION OF THE DRAWINGS

Exemplary embodiments of the present invention will be described with references to the accompanying figures, wherein:

FIGS. 7A-B are an exemplary schematic diagram and corresponding flow chart of a process for digital asset exchange customer account fiat funding via an exchange-initiated request in accordance with exemplary embodiments of the present invention;

FIG. 11B is an exemplary flow chart illustrating the information that may be included in the display of the graphical user interface of the first request;

FIG. 11C is an exemplary screenshot illustrating information included in a response to the first request;

FIG. 11D is an exemplary smart contract.

DETAILED DESCRIPTION

Digital Math-Based Assets and Bitcoin

Figure 1:
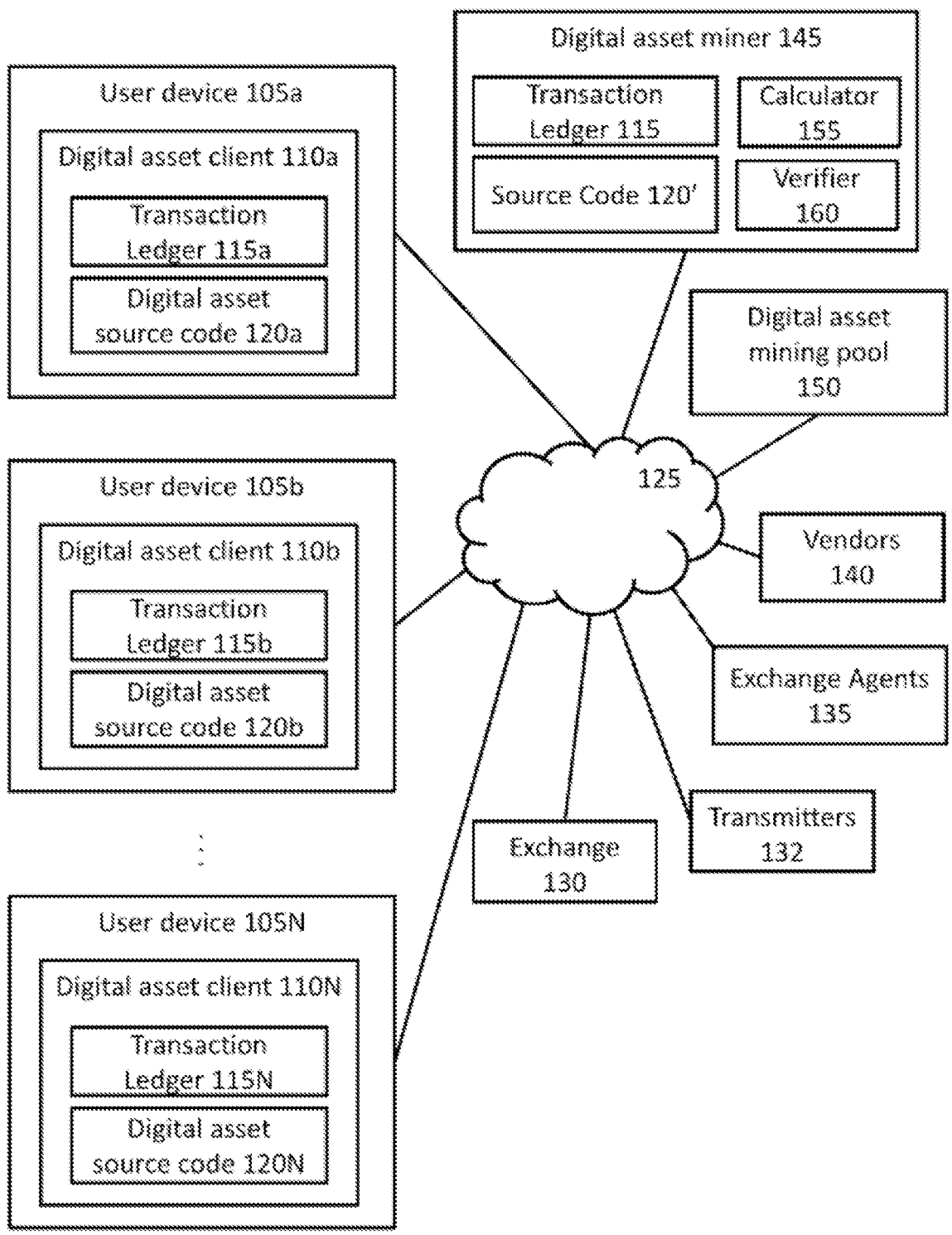
FIG. 1 is a schematic diagram of a digital asset network in accordance with exemplary embodiments of the present invention.

A digital math-based asset is a kind of digital asset based upon a computer generated mathematical and/or cryptographic protocol that may, among other things, be exchanged for value and/or be used to buy and sell goods or pay for services. A digital math-based asset may be a non-tangible asset that is not based upon a governmental rule, law, regulation, and/or backing. The Bitcoin system represents one form of digital math-based asset.

A bitcoin may be a unit of the Bitcoin digital math-based asset. Other examples of digital math-based assets include Bitcoin, Namecoins, Litecoins, PPCoins, Tonal bitcoins, bitcoin cash, zcash, IxCoins, Devcoins, Freicoins, IOcoins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliqa; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring;

Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), security tokens, and/or non-fungible token (such as Cryptokitties), to name a few. In embodiments, digital math-based assets, such as bitcoin, may be accepted in trade by merchants, other businesses, and/or individuals in many parts of the world.

Digital assets may also include "tokens," which like other digital assets can represent anything from loyalty points to vouchers and IOUs to actual objects in the physical world. Tokens can also be tools, such as in-game items, for interacting with other smart contracts. A token is a "smart contract" running on top of a blockchain network (such as the Ethereum Blockchain, the Bitcoin Blockchain, to name a few). As such, it is a set of code with an associated database. In embodiments, the database may be maintained by an issuer. The code describes the behavior of the token, and the database is basically a table with rows and columns tracking who owns how many tokens.

In embodiments, a smart contract may be a computer protocol intended to digitally facilitate, verify, or enforce the negotiation or performance of credible transactions without third parties. In embodiments, smart contracts may also allow for the creation of tokens.

In embodiments, a digital math-based asset may be based on an open source mathematical and/or cryptographic protocol, which may exist on a digital asset network, such as a Bitcoin network or an Ethereum network. The network may be centralized, e.g., run by one or more central servers, or decentralized, e.g., run through a peer-to-peer network. Digital math-based assets may be maintained, tracked, and/or administered by the network.

A digital math-based asset system may use a decentralized electronic ledger system, which may be maintained by a plurality of physically remote computer systems. Such a ledger may be a public transaction ledger, which may track asset ownership and/or transactions in a digital math-based asset system. The ledger may be a decentralized public transaction ledger, which can be distributed to users in the network, e.g., via a peer-to-peer sharing. Ledger updates may be broadcast to the users across the network. Each user may maintain an electronic copy of all or part of the ledger, as described herein. In embodiments, a digital asset system may employ a ledger that tracks transactions (e.g., transfers of assets from one address to another) without identifying the assets themselves.

In embodiments, a digital asset ledger, such as the Bitcoin blockchain or the Ethereum blockchain, can be used to achieve consensus and to solve double-spending problems where users attempt to spend the same digital assets in more than one transaction. In embodiments, before a transaction may be cleared, the transaction participants may need to wait for some period of time, e.g., a six-confirmation wait (typically one hour in the context of the Bitcoin network, 15 minutes in the context of the Litecoin network, to name a few), before feeling confident that the transaction is valid, e.g., not a double count. Each update to the decentralized electronic ledger (e.g., each addition of a block to the Bitcoin blockchain or the Ethereum blockchain) following execution of a transaction may provide a transaction confirmation. After a plurality of updates to the ledger, e.g., 6 updates, the transaction may be confirmed with certainty or high certainty.

In embodiments, a blockchain can be a public transaction ledger of the digital math-based asset network, such as the Bitcoin network or the Ethereum network. For example, one or more computer systems (e.g., miners) or pools of computer systems (e.g., mining pools) can solve algorithmic equations allowing them to add records of recent transactions (e.g., blocks), to a chain of transactions. In embodiments, miners or pools of miners may perform such services in exchange for some consideration such as an upfront fee (e.g., a set amount of digital math-based assets) and/or a payment of transaction fees (e.g., a fixed amount or set percentage of the transaction) from users whose transactions are recorded in the block being added. In embodiments, digital assets in the form of a digital asset token, such as Gas, may be used to pay such fees.

The digital asset network (e.g., Bitcoin network or Ethereum network) may timestamp transactions by including them in blocks that form an ongoing chain called a blockchain. In embodiments, the addition of a block may occur periodically, e.g., approximately every 15 seconds, every 2.5 minutes or every 10 minutes, to name a few. Such blocks cannot be changed without redoing the work that was required to create each block since the modified block. The longest blockchain may serve not only as proof of the sequence of events but also records that this sequence of events was verified by a majority of the digital asset network's computing power. The blockchain recognized by the nodes corresponding to the majority of computing power, or some other consensus mechanism will become the accepted blockchain for the network. In embodiments, confirmation of a transaction may be attained with a high degree of accuracy following the addition of a fixed number of blocks to the blockchain (e.g., six blocks) after a transaction was performed and first recorded on the blockchain. As long as a majority of computing power (or some other consensus mechanism) is controlled by nodes that are not cooperating to attack the network, they will generate the longest blockchain of records and outpace attackers.

There are a variety of consensus mechanisms (or protocols) that may be used to verify transactions recorded in a blockchain. A few non-limiting examples of these mechanisms are discussed below, however, other protocols may be used in accordance with exemplary embodiments of the present invention.

For example, the proof of control protocol is one example of a consensus mechanism and is used, for example, in the Bitcoin blockchain. A more detailed discussion of proof of control protocols can be found in co-pending U.S. patent application Ser. No. 15/920,042, filed Mar. 13, 2018 and entitled SYSTEMS, METHODS, AND PROGRAM PRODUCTS FOR VERIFYIN G DIGITAL ASSETS HELD IN A CUSTODIAL DIGITAL ASSET WALLET, the entire content of which is hereby incorporated herein by reference.

The proof of stake protocol is another optional protocol that may be implemented by blockchains. In this type of protocol, the validator's stake is represented by the amount of digital assets held. Validators accept, reject or otherwise validate a block to be added to the blockchain based on the amount of digital assets held by the Validator on the blockchain. If the Validators are successful in validating and adding the block, such a protocol, in embodiments, will award successful Validators are a fee in proportion to their stake.

The delegated proof of stake protocol is another protocol that is available and is, for example, used by the EOS blockchain. In this protocol, blocks are produced in a fixed number in rounds (e.g., 21 for EOS). At the start of every such round, block producers are chosen. A number less than all of the producers (e.g., 20 in EOS) are automatically chosen while a corresponding number are chosen proportional to the number of their votes relative to other producers. In embodiments, the remaining producers may be shuffled using a pseudorandom number derived from the block time, for example. In embodiments, other forms of randomized selection may be used. To ensure that regular block production is maintained, in embodiments, block time is kept to short (e.g., 3 seconds for EOS) and producers may be punished for not participating by being removed from consideration. In embodiments, a producer has to produce a minimal number of blocks, e.g., at least one block every 24 hours to be in consideration. All the nodes will, by default, not switch to a fork which does not include any blocks not finalized by a sufficient majority (e.g., 15 of the 21 producers) regardless of chain length. Thus, in EOS, each block must gain 15 of 21 votes for approval to be considered a part of the chain.

In embodiments, a delegated byzantine fault tolerance protocol may be used as a consensus mechanism. For example, NEO uses this type of protocol. In this protocol, one of the bookkeeping nodes is randomly chosen as a "speaker." The speaker then looks at all the demands of the "citizens," (e.g., all of the holders of the digital asset), and creates a "law" (e.g., a rule governing the protocol). The speaker then calculates a "happiness factor" of these laws to see if the number is enough to satisfy the citizen's needs or not. The speaker then passes the happiness factor down to the delegates (e.g., the other bookkeeping nodes). The delegates may then individually check the speaker's calculations. If the speaker's number matches the delegate's number, then the delegates give their approval, and if not, then they give their disapproval. In embodiments, a sufficient majority (e.g., 66% in NEO) of the delegates need to give their approval for the law to pass, i.e. for the block to be added. If a sufficient majority is not obtained (e.g., less than 66% approval), then a new speaker is chosen, and the process starts again.

Ripple uses an algorithm in which each server gathers all valid transactions that have not yet been applied and makes them public. Each server then amalgamates these transactions and votes on the veracity of each. Transactions that receive at least a minimum number of yes votes will move into another round of voting. A minimum of 80% approval is required before a transaction is applied.

These and other protocols may be used to generate a blockchain in accordance with exemplary embodiments of the present invention.

In embodiments, transaction messages can be broadcast on a best effort basis, and nodes can leave and rejoin the network at will. Upon reconnection, a node can download and verify new blocks from other nodes to complete its local copy of the blockchain.

In the exemplary Bitcoin system, a bitcoin is defined by a chain of digitally-signed transactions that began with its creation as a block reward through bitcoin mining. Each owner transfers bitcoin to the next by digitally signing them over to the next owner in a bitcoin transaction, which is published to and added onto a block on the blockchain. A payee can then verify each previous transaction, e.g., by analyzing the blockchain, to verify the chain of ownership.

Other examples of different types of blockchains noted above that are consistent with embodiments of present invention pose unique problems. Certain currencies present unique challenges in that transactions and/or wallets or digital asset addresses associated therewith may be shielded (e.g., not viewable by the public on the ledger). For example, Monero is based on the CryptoNight proof-of-work hash algorithm and possesses significant algorithmic differences relating to blockchain obfuscation. Monero provides a high level of privacy and is fungible such that every unit of the currency can be substituted by another unit. Monero is therefore different from public-ledger cryptocurrencies such as Bitcoin, where addresses with coins previously associated with undesired activity can be blacklisted and have their coins refused by others.

In embodiments, "proof of brain" may be a type of token reward algorithm used in social media blockchain systems that encourages people to create and curate content. In embodiments, proof of brain may enable token distribution by upvote and like-based algorithms, which may be integrated with websites to align incentives between application owners and community members to spur growth.

In particular, ring signatures mix spender's address with a group of others, making it more difficult to establish a link between each subsequent transaction. In addition, Monero provides "stealth addresses" generated for each transaction which make it difficult, if not impossible to discover the actual destination address of a transaction by anyone else other than the sender and the receiver. Further, the "ring confidential transactions" protocol may hide the transferred amount as well. Monero is designed to be resistant to application-specific integrated circuit mining, which is commonly used to mine other cryptocurrencies such as Bitcoin, however, it can be mined somewhat efficiently on consumer grade hardware such as x86, x86-64, ARM and GPUs, to name a few.

Another example of a modified blockchain consistent with exemplary embodiments of the present invention discussed above is Darkcoin. Darkcoin adds an extra layer of privacy by automatically combining any transaction its users make with those of two other users-a feature it calls Darksend-so that it will be more difficult to analyze the blockchain to determine where a particular user's money ended up.

Yet another example of a modified blockchain consistent with embodiments of the present invention discussed above is Zcash. The Zcash network supports different types of transactions including: "transparent" transactions and "shielded" transactions. Transparent transactions use a transparent address (e.g., "t-address"). In embodiments, transactions between two t-addresses behave like Bitcoin transactions and the balance and amounts transferred are publicly visible on the Zcash blockchain. Unlike the Bitcoin Blockchain, the Zcash network may also support shielded transactions using a shield address (e.g., "z-address"). In embodiments, the "z-address" provides privacy via zero-knowledge succinct noninteractive arguments of knowledge (e.g., "zk-SNARKS" or "zero-knowledge proofs"). The balance of a z-address is not publicly visible on the Zcash blockchain the amount transferred into and out of a z-address is private if between two z-addresses but may be public if between a z-address and a t-address.

In embodiments, a digital asset based on a blockchain, may in turn include special programming, often referred to as "smart contracts", which allow for the creation of "tokens", which in turn are digital assets based on digital assets. In embodiments, tokens may be ERC-20 tokens, and used in conjunction with ERC-20 token standard as a programming language. In embodiments, other protocols may be used including but not limited to ERC-223 and ERC-721, to name a few. In embodiments, smart contracts may be written on other smart contracts to provide for increased functionality. One non-limiting example of this type of structure is the open source Cryptokittens game in which digital kittens are provided as ERC-721 tokens with a series of smart contracts provided to define how the kittens will interact with each other and with users. Cryptokitty is a non-fungible token. A non-fungible token may be stored on a peer-to-peer distributed network in the form of a blockchain network (or other distributed networks). Examples of non-fungible tokens include one or more of the following: Cryptokitties, Cryptofighters, Decentraland, Etherbots, Ethermon, Rare peppes, Spells of Genesis, Crafty. Superarre, TerraO, Unico, to name a few. In embodiments, non-fungible tokens, (e.g., 5 Crytpokitties) may be transferable and accounted for as a digital asset token on an underlying blockchain network (e.g., Ethereum Network). In embodiments, a first non-fungible token (e.g. a First CryptoKitty) may have attributes (e.g. characteristics of a non-fungible token) that are different from a second non-fungible token (e.g. a Second CryptoKitty), even if both are the same type of non-fungible token (e.g., a CryptoKitty). For example, the First CryptoKitty may be a striped CryptoKitty, while the Second CryptoKitty may be a droopy-eyed CryptoKitty. In embodiments, the attributes of each non-fungible tokens may be customizable. In embodiments, programming modules may be added to and/or transferred with programming modules associated with specific tokens. By way of illustration, a first token, e.g., a Cryptokitten Tiger, may purchase a second token, e.g., a digital "hat," that will then become associated with the first token to be a Tiger with a hat, and remain with the first token when transferred. Thus, by way of illustration, in the context of example embodiments of the present invention, the first token could be, e.g., a security token, and the second token could be, e.g., an account holding tokens, or a right to request tokens from another account as discussed below. If the first token is transferred, the second token would transfer with the ownership of the first token.

For example, digital assets can include tokens, which like other digital assets that can represent anything from loyalty points to vouchers and IOUs to actual objects in the physical world. Tokens can also be tools, such as in-game items, for interacting with other smart contracts. A token is a smart contract running on top of a blockchain network (such as the Ethereum Blockchain, the Bitcoin Blockchain, to name a few). As such, it is a set of code with an associated database. In embodiments, the database may be maintained by an issuer. In embodiments, the database may be included as part of the blockchain. In embodiments, the ledger may be maintained in the first instance as a database in a sidechain by the issuer or agent of the issuer and subsequently published and stored as part of a blockchain. The code describes the behavior of the token, and the database is basically a table with rows and columns tracking who owns how many tokens.

If a user or another smart contract within the blockchain network (such as the Ethereum Network) sends a message to that token's contract in the form of a "transaction," the code updates its database.

So, for instance, using a token based on the Ethereum Network for illustration purposes, when a wallet app sends a message to a token's contract address to transfer funds from Alice to Bob, the following proceed occurs.

At the token issuer computer system, Security Tokens are created. In embodiments, each Security Token may have an "ERC-20 Contract Wallet Address" ("Contract Address") which is used to write a smart contract. In embodiments, the smart contract may include instructions to perform at least: (1) token creation, (2) token transfer, (3) token destruction; and (4) updating smart contract coding. In embodiments, the Contact Address may be associated with a designated cold storage wallet associated with the token issuer. In embodiments, the Contract Address may be associated with a designated hot storage wallet associated with the token issuer. In embodiments, the Contract Address may be associated with a designated cold storage wallet associated with the token issuer, but may also give at least some permission to perform operations by one or more hot wallets associated with the token issuer and/or a token administrator on behalf of the token issuer. Security Tokens may be created in batches (for example, 100,000 tokens worth $100,000 U.S. dollars) in the "Contract Wallet" or Contract Address and later moved to a hot wallet or associates digital asset address for transactions as necessary. In embodiments, a Security Token database is maintained in a blockchain, such as the Ethereum blockchain, for example. In embodiments, the ledger may be maintained in the first instance as a database in a sidechain by the issuer or agent and subsequently published and stored as part of a blockchain. In embodiments, Security Tokens may be generated on the fly, however, in this case, the Contract Wallet may be associated with a hot wallet, or a Supplementary Wallet authorized to perform such operations may be used, and may be a hot wallet with the Contract Wallet remaining a cold wallet. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein by reference. In embodiments, Contract Wallets may be maintained by the token issuer and which would hold the private key associated with the token on an associated device. In embodiments, Contract Wallets may be provided on a user computer device and hold the private key associated with the token. In such embodiments, a user computer device may include a software application to provide secure access to the token issuer such that the user can engage in transactions.

By way of illustration, an ERC-20 Contract can include the following representative type of functions as shown in Table 1-1 in its programming of a Smart Contract associated with a particular token, such as a security token:

TABLE 1-1

```
 1 // --------------------------------------------------------------------------------
 2 // ERC Token Standard #20 Interface
 3 // https://github.com/ethereum/EIPs/blob/master/EIPS/eip-20-token-standard.md
 4 // --------------------------------------------------------------------------------
 5 contract ERC20Interface {
 6 function total Supply( ) public constant returns (uint);
 7 function balanceOf(address tokenOwner) public constant returns (uint balance);
 8 function allowance(address tokenOwner, address spender) public constant returns (uint
remaining);
 9 function transfer(address to, uint tokens) public returns (bool success);
10 function approve(address spender, uint tokens) public returns (bool success);
11 function transferFrom(address from, address to, uint tokens) public returns (bool success);
12
13 event Transfer(address indexed from, address indexed to, uint tokens);
14 event Approval(address indexed tokenOwner, address indexed spender, uint tokens);
```

Some of the tokens may include further information describing the token contract such as shown in Table 2-1:

TABLE 2-1

| 1 | string public constant name = "Token Name"; |
| 2 | string public constant symbol = "SYM"; |
| 3 | uint8 public constant decimals = 18; // 18 is the most common number of decimal places |

Alice's wallet, or associated digital asset address, may send a request message to the database maintained by the blockchain including: (a) Alice's ethereum digital asset address, which is typically associated with a digital wallet (Source Address); (b) token identification information; (c) amount of token to be transferred; and (d) Bob's ethereum digital asset address (Destination Address). In embodiments, if a fee is charged for the transaction, fee payment information may also be required and provided. For example, on the Ethereum network, an amount of Gas tokens may be required from the sender to pay for processing of the transaction into a block on the blockchain. In embodiments, the message may include a proposed fee amount and/or fee proposal including a limit in e.g., Gas. The request message will also be digitally signed by Alice's private key.

When miners on the blockchain receive the transaction request directed to the contract wallet or associated digital asset address, with the request message, miners on the blockchain will confirm the transaction, including verifying that the message was properly signed by Alice. The miners may verify that Alice has sufficient amount of tokens to perform the requested transaction, for example, by comparing Alice's balance against Alice's token balance as indicated on the blockchain. The validity of Bob's digital asset address (the Destination Address) may also be confirmed by the miners. The miners may also compare the request with smart contract coding and instructions included in the Contract Address. The transaction fee discussed above is paid to the miners for confirming the transaction as noted above.

If the request is verified the transaction is published in the Security Token database of the blockchain reflecting a debit against Alice's token holdings and a corresponding credit to Bob's token holdings (less any applicable fees).

Response messages to the digital asset addresses of both Alice and Bob may be sent to reflect that the transaction was successfully processed. In embodiments, such messages may include information including: (i) the source digital asset address; (ii) the destination digital asset address; (iii) the amount of tokens transferred; and/or (iv) the new balances for each digital asset address or associated digital wallet. In embodiments, the message may include a proposed fee amount and/or fee proposal including a limit in e.g., Gas. In embodiments, Alice, Bob, and/or third parties may view the balances and transaction information based on the information stored in the blockchain, by, e.g., viewing token balances at websites like etherscan.io, to name a few.

In contrast to tokens, a blockchain based digital asset (such as ether) is hard coded into the blockchain (e.g., the Ethereum Blockchain) itself. It is sold and traded as a cryptocurrency, and it also powers the network (e.g., the Ethereum Network) by allowing users to pay for smart contract transaction fees. (In some networks, transactions fees may be paid for in digital assets, such as tokens (e.g., Gas) or blockchain based digital assets (e.g., bitcoin). In the Ethereum Network, all computations typically have a cost based on other digital assets, such as Gas.

In embodiments, when tokens are sent to or from a Contract Address, for example, a fee may be charged for that transaction (in this case, a request to the token's contract to update its database) in, e.g., some form of digital asset, such as ether, bitcoin, Gas, to name a few. In embodiments, the message may include a proposed fee amount and/or fee proposal including a limit in digital asset, e.g., ether, bitcoin or Gas. This payment is then collected by a miner who confirms the transaction in a block, which then gets added to the blockchain.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a Bitcoin network by example. Of course, other digital asset networks, such as the Ethereum network, can be used with embodiments of the present invention. A digital math-based asset network, such as a Bitcoin network, may be an online, end-user to end-user network hosting a public transaction ledger 115 and governed by source code 120 comprising cryptologic and/or algorithmic protocols. A digital asset network can comprise a plurality of end users, a . . . N, each of which may access the network using one or more corresponding user device 105a, 105b, . . . 105N. In embodiments, user devices 105 may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, each user device 105 can run a digital asset client 110, e.g., a Bitcoin client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction leger 115*a* (contained on a user device 105*a*) should correspond with the electronic transaction ledgers 115*b* . . . 115N (contained on user devices 105*b* . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the Bitcoin network (Bitcoin clients) include Bitcoin-Qt and Bitcoin Wallet, to name a few. In embodiments, some of the transactions on the public ledger may be encrypted or otherwise shielded so that only authorized users may access ledger information about such transactions or wallets.

In addition, a digital asset network, such as a Bitcoin network, may include one or more digital asset exchange 130, such as Bitcoin exchanges (e.g., BitFinex, BTC-e). Digital asset exchanges may enable or otherwise facilitate the transfer of digital assets, such as bitcoin, and/or conversions involving digital assets, such as between different digital assets and/or between a digital asset and non-digital assets, currencies, to name a few. The digital asset network may also include one or more digital asset exchange agents 135, e.g., a Bitcoin exchange agent. Exchange agents 135 may facilitate and/or accelerate the services provided by the exchanges. Exchanges 130, transmitters 132, and/or exchange agents 135 may interface with financial institutions (e.g., banks) and/or digital asset users. Transmitters 132 can include, e.g., money service businesses, which could be licensed in appropriate geographic locations to handle financial transactions. In embodiments, transmitters 132 may be part of and/or associated with a digital asset exchange 130. Like the user devices 105, digital asset exchanges 130, transmitters 132, and exchange agents 135 may be connected to the data network 125 through wired, wireless, or other connections. They may be connected directly and/or indirectly to each other and/or to one or more user device 105 or other entity participating in the digital asset system.

Digital assets may be sub-divided into smaller units or bundled into blocks or baskets. For example, for bitcoin, subunits, such as a Satoshi, as discussed herein, or larger units, such as blocks of bitcoin, may be used in exemplary embodiments. Each digital asset, e.g., bitcoin, may be subdivided, such as down to eight decimal places, forming 100 million smaller units. For at least bitcoin, such a smaller unit may be called a Satoshi. Other forms of division can be made consistent with embodiments of the present invention.

In embodiments, the creation and transfer of digital math-based assets can be based on an open source mathematical and/or cryptographic protocol, which may not be managed by any central authority. Digital assets can be transferred between one or more users or between digital asset accounts and/or storage devices (e.g., digital wallets) associated with a single user, through a network, such as the Internet, via a computer, smartphone, or other electronic device without an intermediate financial institution. In embodiments, a single digital asset transaction can include amounts from multiple origin accounts transferred to multiple destination accounts. Accordingly, a transaction may comprise one or more input amounts from one or more origin digital asset accounts and one or more output amounts to one or more destination accounts. Origin and destination may be merely labels for identifying the role a digital asset account plays in a given transaction; origin and destination accounts may be the same type of digital asset account.

In embodiments, a digital math-based asset system may produce digital asset transaction change. Transaction change refers to leftover digital asset amounts from transactions in digital asset systems, such as Bitcoin, where the transactions are comprised of one or more digital inputs and outputs. A digital asset account can store and/or track unspent transaction outputs, which it can use as digital inputs for future transactions. In embodiments, a wallet, third-party system, and/or digital asset network may store an electronic log of digital outputs to track the outputs associated with the assets contained in each account. In digital asset systems such as Bitcoin, digital inputs and outputs cannot be subdivided. For example, if a first digital asset account is initially empty and receives a transaction output of 20 BTC (a bitcoin unit) from a second digital asset account, the first account then stores that 20 BTC output for future use as a transaction input. To send 15 BTC, the first account must use the entire 20 BTC as an input, 15 BTC of which will be a spent output that is sent to the desired destination and 5 BTC of which will be an unspent output, which is transaction change that returns to the first account. An account with digital assets stored as multiple digital outputs can select any combination of those outputs for use as digital inputs in a spending transaction. In embodiments, a digital wallet may programmatically select outputs to use as inputs for a given transaction to minimize transaction change, such as by combining outputs that produce an amount closest to the required transaction amount and at least equal to the transaction amount.

In embodiments, the present invention can be used to be compatible with the Libra Network and the Move Programming language as described in the following disclosures, each of which is hereby incorporated by reference herein: (1) Move: A Language With Programmable Resources (available at: https://developers.libra.org/docs/move-paper); (2) The Libra White Paper (available at: libra.org/en-US/white-paper/); (3) The Libra Reserve (available at: https://libra.org/en-US/about-currency-reserve/); (4) The Libra Association (available at: libra.org/en-US/association-council-principles/); (5) State Machine Replication in the Libra Blockchain (available at: developers.libra.org/docs/state-machine-replication-paper); (6) Moving Toward Permissionless Consensus (available at: libra.org/en-US/permissionless-blockchain/); and (7) The Libra Blockchain (available at: developers.libra.org/docs/the-libra-blockchain-paper).

In embodiments, the present invention may be compatible with one or more fiat-backed digital assets, which may be: a fiat-backed digital asset token (e.g. a Gemini Dollar), a stable value digital asset token, and/or Libra, to name a few. In embodiments, the fiat-backed digital asset may be backed by one or more amounts of one or more types of the following assets: one or more types of fiat (e.g., U.S. Dollars, Euro, Yen, British Pound, Swiss Franc, Canadian Dollar, Australian Dollar, New Zealand Dollar, Kuaiti Dinar, Bahrain Dinar, Oman Rial, Jordan Dinar, Cayman Island Dollar, South African Rand, Mexican Pesos, Renmembi, to name a few); bank accounts in such fiat; one or more government securities denominated in such fiat (e.g., U.S. treasury certificates); municipal bonds or other government issued bonds, shares in exchange trade funds holding currencies or currency future contracts, one or more stocks; one or more bonds; one or more certificate of deposits ("CD"); to name a few. In embodiments, other forms of backed digital assets may also be used, where the assets may also include other digital assets, other physical assets (like real estate and/or inventors), securities, equities, bonds, commodities (e.g., gold, silver, diamonds, crops, oil, to name a few), or financial instruments (e.g., futures, puts, calls, credit default swaps, to name a few) one or more pieces of real estate, gold, diamonds and/or a combination thereof, to name a few. In embodiments, may be only one kind of asset (e.g., dollars held in a bank or government security or CD, to name a few) or a basket of assets (e.g., multiple fiats, e.g., dollars, euros, yet, to name a few). In embodiments, the value of the fiat-backed digital asset may fluctuate with the value of the assets backing the fiat-backed digital assets. The underlying value of the fiat-backed digital asset, in embodiments, may be updated in real-time, substantially real-time, periodically, and/or aperiodically, to name a few.

Referring again to FIG. 1, a digital asset network may include digital asset miners 145. Digital asset miners 145 may perform operations associated with generating or minting new digital assets, and/or operations associated with confirming transactions, to name a few. Digital asset miners 145 may collaborate in one or more digital asset mining pools 150, which may aggregate power (e.g., computer processing power) so as to increase output, increase control, increase likelihood of minting new digital assets, increase likelihood of adding blocks to a blockchain, to name a few.

In embodiments, the processing of digital asset transactions, e.g., bitcoin transactions, can be performed by one or more computers over a distributed network, such as digital asset miners 145, e.g., bitcoin miners, and/or digital asset mining pools 150, e.g., bitcoin mining pools. In embodiments, mining pools 150 may comprise one or more miners 145, which miners 145 may work together toward a common goal. Miners 145 may have source code 120', which may govern the activities of the miners 145. In embodiments, source code 120' may be the same source code as found on user devices 105. These computers and/or servers can communicate over a network, such as an internet-based network, and can confirm transactions by adding them to a ledger 115, which can be updated and archived periodically using peer-to-peer file sharing technology. For example, a new ledger block could be distributed on a periodic basis, such as approximately every 10 minutes. In embodiments, the ledger may be a blockchain. Each successive block may record transactions that have occurred on the digital asset network. In embodiments, all digital asset transactions may be recorded as individual blocks in the blockchain. Each block may contain the details of some or all of the most recent transactions that are not memorialized in prior blocks. Blocks may also contain a record of the award of digital assets, e.g., bitcoin, to the miner 145 or mining pool 150 who added the new block, e.g., by solving calculations first.

A miner 145 may have a calculator 155, which may solve equations and/or add blocks to the blockchain. The calculator 155 may be one or more computing devices, software, or special-purpose device, to name a few. In embodiments, in order to add blocks to the blockchain, a miner 145 may be required to map an input data set (e.g., the blockchain, plus a block of the most recent transactions on the digital asset network, e.g., transactions on the Bitcoin network, and an arbitrary number, such as a nonce) to a desired output data set of predetermined length, such as a hash value. In embodiments, mapping may be required to use one or more particular cryptographic algorithms, such as the SHA-256 cryptographic hash algorithm or script, to name a few. In embodiments, to solve or calculate a block, a miner 145 may be required to repeat this computation with a different nonce until the miner 145 generates a SHA-256 hash of a block's header that has a value less than or equal to a current target set by the digital asset network. In embodiments, each unique block may only be solved and added to the blockchain by one miner 145. In such an embodiment, all individual miners 145 and mining pools 150 on the digital asset network may be engaged in a competitive process and may seek to increase their computing power to improve their likelihood of solving for new blocks. In embodiments, successful digital asset miners 145 or mining pools 150 may receive an incentive, such as, e.g., a fixed number of digital assets (e.g., bitcoin) and/or a transaction fee for performing the calculation first and correctly and/or in a verifiable manner.

In embodiments, the cryptographic hash function that a miner 145 uses may be one-way only and thus may be, in effect, irreversible. In embodiments, hash values may be easy to generate from input data, such as valid recent network transaction(s), blockchain, and/or nonce, but neither a miner 145 nor other participant may be able to determine the original input data solely from the hash value. Other digital asset networks may use different proof of work algorithms, such as a sequential hard memory function, like script, which may be used for Litecoin. As a result, generating a new valid block with a header less than the target prescribed by the digital asset network may be initially difficult for a miner 145, yet other miners 145 can easily confirm a proposed block by running the hash function at least once with a proposed nonce and other identified input data. In embodiments, a miner's proposed block may be added to the blockchain once a defined percentage or number of nodes (e.g., a majority of the nodes) on the digital asset network confirms the miner's work. A miner 145 may have a verifier 160, which may confirm other miners' work. A verifier 160 may be one or more computers, software, or specialized device, to name a few. A miner 145 that solved such a block may receive the reward of a fixed number of digital assets and/or any transaction fees paid by transferors whose transactions are recorded in the block. "Hashing" may be viewed as a mathematical lottery where miners that have devices with greater processing power (and thus the ability to make more hash calculations per second) are more likely to be successful miners 145. In embodiments, as more miners 145 join a digital asset network and as processing power increases, the digital asset network may adjust the complexity of the block-solving equation to ensure that one newly-created block is added to the blockchain approximately every ten minutes. Digital asset networks may use different processing times, e.g., approximately 2.5 minutes for Litecoin, approximately 10 minutes for Bitcoin, to name a few.

In addition to archiving transactions, a new addition to a ledger can create or reflect creation of one or more newly minted digital assets, such as bitcoin. In embodiments, new digital math-based assets may be created through a mining process, as described herein. In embodiments, the number of new digital assets created can be limited. For example, in embodiments, the number of digital assets (e.g., bitcoin) minted each year is halved every four years until a specified year, e.g., 2140, when this number will round down to zero. At that time no more digital assets will be added into circulation. In the exemplary embodiment of bitcoin, the total number of digital assets will have reached a maximum of 21 million assets in denomination of bitcoin. Other algorithms for limiting the total number of units of a digital math-based asset can be used consistent with exemplary embodiments of the present invention. For example, the Litecoin network is anticipated to produce 84 million Litecoin. In embodiments, the number of digital assets may not be capped and thus may be unlimited. In embodiments, a specified number of coins may be added into circulation each year, e.g., so as to create a 1% inflation rate.

In embodiments, the mining of digital assets may entail solving one or more mathematical calculations. In embodiments, the complexity of the mathematical calculations may increase over time and/or may increase as computer processing power increases. In embodiments, result of solving the calculations may be the addition of a block to a blockchain, which may be a transaction ledger, as described further below. Solving the calculations may verify a set of transactions that has taken place. Solving the calculations may entail a reward, e.g., a number of digital math-based assets and/or transaction fees from one or more of the verified transactions.

Different approaches are possible for confirming transactions and/or creating new assets. In embodiments, a digital asset network may employ a proof of work system. A proof of work system may require some type of work, such as the solving of calculations, from one or more participants (e.g., miners 145) on the network to verify transactions and/or create new assets. In embodiments, a miner 145 can verify as many transactions as computationally possible. A proof of work system may be computationally and/or energy intensive. In embodiments, the network may limit the transactions that a miner 145 may verify.

In embodiments, a digital asset network may employ a proof of stake system. In a proof of stake system, asset ownership may be tied to transaction verification and/or asset creation. Asset ownership can include an amount of assets owned and/or a duration of ownership. The duration of ownership may be measured linearly as time passes while a user owns an asset. In an exemplary embodiment, a user holding 4% of all digital assets in a proof of stake system can generate 4% of all blocks for the transaction ledger. A proof of stake system may not require the solution of complex calculations. A proof of stake system may be less energy intensive than a proof of work system. In embodiments, a hybrid of proof of work and proof of stake systems may be employed. For example, a proof of work system may be employed initially, but as the system becomes too energy intensive, it may transition to a proof of stake system.

Proof or work and proof of stake are both examples of consensus algorithms. Such consensus algorithms have as their goal providing a method of reaching consensus to improve the system whether it be on ways of improving transactions, upgrading the network, etc.

In embodiments, asset creation and/or transaction confirmation can be governed by a proof of stake velocity system. Proof of stake velocity may rely upon asset ownership where the function for measuring duration of ownership is not linear. For example, an exponential decay time function may ensure that assets more newly held correspond to greater power in the system. Such a system can incentivize active participation in the digital math-based asset system, as opposed to storing assets passively.

In embodiments, a proof of burn system may be employed. Proof of burn may require destroying assets or rendering assets un-spendable, such as by sending them to an address from which they cannot be spent. Destroying or rendering assets unusable can be an expensive task within the digital math-based asset system, yet it may not have external costs such as the energy costs that can be associated with mining in a proof of work system.

Blockchains can include a consensus generating protocol through which the network determines whether a transaction is valid, included in the ledger and in what order each transaction should be included. Examples of such facilities can include mining, proof of work, proof of stake protocols, to name a few.

In embodiments, the fiat-backed digital asset may be tied to a distributed transaction ledger which may be maintained on a peer-to-peer network that includes a plurality of geographically distributed computer systems. In embodiments, the distributed transaction ledger may be public, private, semi-private, and/or semi-public, to name a few. For example, the distributed transaction ledger may be published publicly available to anyone who wants to see it. As another example, the distributed transaction ledger may not be published and, to be able to access the distributed transaction ledger, a user may send a query the peer-to-peer network.

The peer-to-peer network, in embodiments, may be: the Ethereum Network, the Libra Network, the Neo Network, the Bitcoin Network, and/or the Stellar Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g. memory of the digital asset security token issuer system). In embodiments, the digital asset security token database may be maintained and stored on the plurality of geographically distributed computer systems in the peer-to-peer network.

In embodiments, the distributed transaction ledger may include a fiat-backed digital asset database. In embodiments, the fiat-backed digital asset data base may be maintained on a sidechain. A sidechain, in embodiments, may refer to a portion of the distributed transaction ledger. For example, an administrator, user, and/or trusted entity may maintain a portion of the distributed transaction ledger and/or an electronic copy of a portion of the distributed transaction ledger. A trusted entity in embodiments, and as used herein, may refer to one or more of: a trusted entity, a digital asset exchange, a portal (e.g. MasterCard, Visa, to name a few), a digital asset exchange, an administrator, and/or a custodian, to name a few. In embodiments, a portion of the distributed transaction ledger, in the context of a Merkel Tree, may refer to one or more "leafs" of the Merkel Tree, one or more statuses of the Merkel Tree, and/or a complete Merkel Tree with one or more past transactions being "pruned." In the context of a blockchain, the portion of the distributed transaction ledger may be one or more blocks of the blockchain. The information on the sidechain may be updated periodically or aperiodically. For example, the information on the sidechain may be updated, published, and stored on the peer-to-peer network at predetermined times (e.g. twice a day, once a day, once a week, once a month, and/or once a quarter, to name a few). As another example, the information on the sidechain may be updated, published and stored on the peer-to-peer network after the execution of a transaction and/or the execution of a batch of transactions. As yet another example, the information on the sidechain may be updated, published and stored on the peer-to-peer network after the commitment of a transaction and/or the commitment of a batch of transactions. A transaction, for example, may be committed by a consensus of trusted entities of the peer-to-peer network.

In embodiments, the peer-to-peer network may utilize one or more protocols and/or programs for security purposes. For example, the peer-to-peer network may utilize a byzantine fault tolerance protocol as a consensus mechanism. As another example, the peer-to-peer network may utilize a whitelist for the execution of a transaction and/or the transfer of funds. As yet another example, the peer-to-peer network may also utilize one or more of the following: encryption, point-to-point encryption, two-factor authentication, and/or tokenization, to name a few.

Digital Asset Accounts and Transaction Security

Digital assets may be associated with a digital asset account, which may be identified by a digital asset address. A digital asset account can comprise at least one public key and at least one private key, e.g., based on a cryptographic protocol associated with the particular digital asset system, as discussed herein. One or more digital asset accounts may be accessed and/or stored using a digital wallet, and the accounts may be accessed through the wallet using the keys corresponding to the account.

Public Keys

A digital asset account identifier and/or a digital wallet identifier may comprise a public key and/or a public address. Such a digital asset account identifier may be used to identify an account in transactions, e.g., by listing the digital asset account identifier on a decentralized electronic ledger (e.g., in association with one or more digital asset transactions), by specifying the digital asset account identifier as an origin account identifier, and/or by specifying the digital asset account identifier as a destination account identifier, to name a few. The systems and methods described herein involving public keys and/or public addresses are not intended to exclude one or the other and are instead intended generally to refer to digital asset account identifiers, as may be used for other digital math-based asset(s). A public key may be a key (e.g., a sequence, such as a binary sequence or an alphanumeric sequence) that can be publicly revealed while maintaining security, as the public key alone cannot decrypt or access a corresponding account. A public address may be a version of a public key. In embodiments, a public key may be generated from a private key, e.g., using a cryptographic protocol, such as the Elliptic Curve Digital Signature Algorithm ("ECDSA").

In exemplary embodiments using bitcoin, a public key may be a 512-bit key, which may be converted to a 160-bit key using a hash, such as the SHA-256 and/or RIPEMD-160 hash algorithms. The 160-bit key may be encoded from binary to text, e.g., using Base58 encoding, to produce a public address comprising non-binary text (e.g., an alphanumeric sequence). Accordingly, in embodiments, a public address may comprise a version (e.g., a shortened yet not truncated version) of a public key, which may be derived from the public key via hashing or other encoding. In embodiments, a public address for a digital wallet may comprise human-readable strings of numbers and letters around 34 characters in length, beginning with the digit 1 or 3, as in the example of 175tWpb8K1S7Nm-H4Zx6rewF9WQrcZv245 W. The matching private key may be stored in a digital wallet or mobile device and protected by a password or other techniques and/or devices for providing authentication.

In embodiments, other cryptographic algorithms may be used such as: (1) The elliptic curve Diffie-Hellman (ECDH) key agreement scheme; (2) The Elliptic Curve Integrated Encryption Scheme (ECIES), also known as Elliptic Curve Augmented Encryption Scheme or simply the Elliptic Curve Encryption Scheme; (3) The Elliptic Curve Digital Signature Algorithm (ECDSA) which is based on the Digital Signature Algorithm; (4) The deformation scheme using Harrison's p-adic Manhattan metric; (5) The Edwards-curve Digital Signature Algorithm (EdDSA) which is based on Schnorr signature and uses twisted Edwards curves; (6) The ECMQV key agreement scheme which is based on the MQV key agreement scheme; and/or (7) The ECQV implicit certificate scheme, to name a few.

In other digital asset networks, other nomenclature mechanisms may be used, such as a human-readable string of numbers and letters around 34 characters in length, beginning with the letter L for Litecoin or M or N for Namecoin or around 44 characters in length, beginning with the letter P for PPCoin, to name a few.

Private Keys

A private key in the context of a digital math-based asset, such as bitcoin, may be a sequence such as a number that allows the digital math-based asset, e.g., bitcoin, to be transferred or spent. In embodiments, a private key may be kept secret to help protect against unauthorized transactions. In a digital asset system, a private key may correspond to a digital asset account, which may also have a public key or other digital asset account identifier. While the public key may be derived from the private key, the reverse may not be true.

In embodiments, related to the Bitcoin system, every Bitcoin public address has a matching private key, which can be saved in the digital wallet file of the account holder. The private key can be mathematically related to the Bitcoin public address and can be designed so that the Bitcoin public address can be calculated from the private key, but importantly, the same cannot be done in reverse.

A digital asset account, such as a multi-signature account, may require a plurality of private keys to access it. In embodiments, any number of private keys may be required. An account creator may specify the number of required keys (e.g., 2, 3, 5, to name a few) when generating a new account. More keys may be generated than are required to access and/or use an account. For example, 5 keys may be generated, and any combination of 3 of the 5 keys may be sufficient to access a digital asset account. Such an account setup can allow for additional storage and security options, such as backup keys and multi-signature transaction approval, as described herein.

Because a private key provides authorization to transfer or spend digital assets such as bitcoin, security of the private key can be important. Private keys can be stored via electronic computer files, but they may also be short enough that they can be printed or otherwise written on paper or other media. An example of a utility that allows extraction of private keys from an electronic wallet file for printing purposes is Pywallet. Other extraction utilities may also be used consistent with the present invention.

In embodiments, a private key can be made available to a program or service that allows entry or importing of private keys in order to process a transaction from an account associated with the corresponding public key. Some wallets can allow the private key to be imported without generating any transactions while other wallets or services may require that the private key be swept. When a private key is swept, a transaction is automatically broadcast so that the entire balance held by the private key is sent or transferred to another address in the wallet and/or securely controlled by the service in question.

In embodiments, using Bitcoin clients, such as BlockChain.info's My Wallet service and Bitcoin-QT, a private key may be imported without creating a sweep transaction.

In embodiments, a private key, such as for a Bitcoin account, may be a 256-bit number, which can be represented in one or more ways. For example, a private key in a hexadecimal format may be shorter than in a decimal format. For example, 256 bits in hexadecimal is 32 bytes, or 64 characters in the range 0-9 or A-F. The following is an example of a hexadecimal private key:

E9 87 3D 79 C6 D8 7D C0 FB 6A 57 78 63 33 89 F4 4532 13 30 3D A6 1F 20 BD 67 FC 23 3A A3 32 62

In embodiments, nearly every 256-bit number is a valid private key. Specifically, any 256-bit number between 0x1 and 0xFFFF FFFF FFFF FFFF FFFF FFFF FFFF FFFE BAAE DCE6 AF48 A03B BFD2 5E8C D036 4141 is a valid private key. In embodiments, the range of valid private keys can be governed by the secp256k1 ECDSA standard used by Bitcoin. Other standards may also be used.

In embodiments, a shorter form of a private key may be used, such as a base 58 Wallet Import format, which may be derived from the private key using Base58 and/or Base58Check encoding. The Wallet Import format may be shorter than the original private key and can include built-in error checking codes so that typographical errors can be automatically detected and/or corrected. For private keys associated with uncompressed public keys, the private key may be 51 characters and may start with the number 5. For example, such a private key may be in the following format:

5Kb8kLf9zgWQnogidDA76MzPL6TsZZY36hWXMssSzNydYXYB9KF

In embodiments, private keys associated with compressed public keys may be 52 characters and start with a capital L or K.

In embodiments, when a private key is imported, each private key may always correspond to exactly one Bitcoin public address. In embodiments, a utility that performs the conversion can display the matching Bitcoin public address.

The Bitcoin public address corresponding to the sample above is:

1CC3X2gu58d6wXUWMffpuzN9JAfTUWu4Kj

In embodiments, a mini private key format can be used. Not every private key or Bitcoin public address has a corresponding mini private key; they have to be generated a certain way in order to ensure a mini private key exists for an address. The mini private key is used for applications where space is critical, such as in QR codes and in physical bitcoin. The above example has a mini key, which is:

SzavMBLoXU6kDrgtUVmffv

In embodiments, any bitcoin sent to the designated address 1CC3X2gu58d6wXUWMffpuzN9JAfTUWu4Kj can be transferred or spent by anybody who knows the private key in any of the three formats (e.g., hexadecimal, base 58 wallet format, or mini private key). That includes bitcoin presently at the address, as well as any bitcoin that are ever sent to it in the future. The private key is only needed to transfer or spend the balance, not necessarily to see it. In embodiments, the bitcoin balance of the address can be determined by anybody with the public Block Explorer at http://www.blockexplorer.com/address/1CC3X2gu58d6wXUWMffpuzN9JAfTUWu4Kj—even if without access to the private key.

In embodiments, a private key may be divided into segments, encrypted, printed, and/or stored in other formats and/or other media, as discussed herein.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital crypto-currency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

In embodiments, a digital wallet may be a custodial digital wallet. Further, the custodial digital wallet may be a segregated custodial wallet or a commingled custodial wallet. Segregated custodial digital wallets hold digital assets for the benefit of a single customer or entity. Commingled custodial accounts hold digital assets for multiple users or customers of the custodian. Segregated custodial wallets are useful for institutional clients, mutual funds and hedge funds, for example.

While many digital asset holders may hold their digital assets in their own wallets, various custodial services, like Gemini custodial services exist. In embodiments, the present invention may be used with custodial wallets. In embodiments, custodial wallets may be commingled custodial wallets which commingle digital assets from more than one client. In embodiments, custodial wallets may be segregated custodial wallets, in which digital assets for a specific client is held using one or more unique digital asset addresses maintained by the custodial service. For segregated custodial wallets, the amount of digital assets held in such wallet(s) may be verified and audited on their respective blockchain. In embodiments, segregated custodial accounts may be used for digital asset holders such as hedge funds, mutual funds, exchange traded funds, to name a few. Proof of control as described herein may be implemented to verify the amount of assets held in custodial wallets, including both segregated custodial wallets and commingled custodial wallets.

Signatures

A transaction may require, as a precondition to execution, a digital asset signature generated using a private key and associated public key for the digital asset account making the transfer. In embodiments, each transaction can be signed by a digital wallet or other storage mechanism of a user sending a transaction by utilizing a private key associated with such a digital wallet. The signature may provide authorization for the transaction to proceed, e.g., authorization to broadcast the transaction to a digital asset network and/or authorization for other users in a digital asset network to accept the transaction. A signature can be a number that proves that a signing operation took place. A signature can be mathematically generated from a hash of something to be signed, plus a private key. The signature itself can be two numbers such as r and s. With the public key, a mathematical algorithm can be used on the signature to determine that it was originally produced from the hash and the private key, without needing to know the private key. Signatures can be either 73, 72, or 71 bytes long, to name a few.

In embodiments, the ECDSA cryptographic algorithm may be used to ensure that digital asset transactions (e.g., bitcoin transactions) can only be initiated from the digital wallet holding the digital assets (e.g., bitcoin). Alternatively, or in addition, other algorithms may be employed.

In embodiments, a transaction from a multi-signature account may require digital asset signatures from a plurality of private keys, which may correspond to the same public key and/or public address identifying the multi-signature digital asset account. As described herein, a greater number of private keys may be created than is necessary to sign a transaction (e.g., 5 private keys created and only 3 required to sign a transaction). In embodiments, private keys for a multi-signature account may be distributed to a plurality of users who are required to authorize a transaction together. In embodiments, private keys for a multi-signature account may be stored as backups, e.g., in secure storage, which may be difficult to access, and may be used in the event that more readily obtainable keys are lost. As noted above, there are a variety of cryptographic algorithms that may be used.

Market Places

A digital asset market place, such as a Bitcoin market place, can comprise various participants, including users, vendors, exchanges, exchange agents, and/or miners/mining pools. The market contains a number of digital asset exchanges, which facilitate trade of digital assets using other currencies, such as United States dollars. Exchanges may allow market participants to buy and sell digital assets, essentially converting between digital assets (e.g., bitcoin) and currency, legal tender, and/or traditional money (e.g., cash). In embodiments, a digital asset exchange market can include a global exchange market for the trading of digital assets, which may contain transactions on electronic exchange markets. In embodiments, a digital asset exchange market can also include regional exchange markets for the trading of digital assets, which may contain transactions on electronic exchange markets. In accordance with the present invention, exchanges and/or transmitters may also be used to facilitate other transactions involving digital assets, such as where digital assets are being transferred from differently denominated accounts or where the amount to transfer is specified in a different denomination than the digital asset being transferred, to name a few. Gemini Trust Company LLC ("Gemini") at (www.gemini.com) is an example of a digital asset exchange 130. By example, registered users of Gemini may buy and sell digital assets such as Bitcoin and Ether in exchange for fiat such as U.S. dollars or other digital assets, such as Ether and Bitcoin, respectively. A Bitcoin exchange agent 135 can be a service that acts as an agent for exchanges, accelerating the buying and selling of bitcoin as well as the transfer of funds to be used in the buying and/or selling of bitcoin. Coinbase is an example of a company that performs the role of a Bitcoin exchange agent 135. Coinbase engages in the retail sale of bitcoin, which it obtains, at least in part, from one or more exchanges.

In addition to the services that facilitate digital asset transactions and exchanges with cash, digital asset transactions can occur directly between two users. In exemplary uses, one user may provide payment of a certain number of digital assets to another user. Such a transfer may occur by using digital wallets and designating the public key of the wallet to which funds are being transferred. As a result of the capability, digital assets may form the basis of business and other transactions. Digital math-based asset transactions may occur on a global scale without the added costs, complexities, time and/or other limits associated with using one or more different currencies.

Vendors 140 may accept digital assets as payment. A vendor 140 may be a seller with a digital wallet that can hold the digital asset. In embodiments, a vendor may use a custodial wallet. In embodiments, a vendor 140 may be a larger institution with an infrastructure arranged to accept and/or transact in digital assets. Various vendors 140 can offer banknotes and coins denominated in bitcoin; what is sold is really a Bitcoin private key as part of the coin or banknote. Usually, a seal has to be broken to access the Bitcoin private key, while the receiving address remains visible on the outside so that the bitcoin balance can be verified. In embodiments, a debit card can be tied to a Bitcoin wallet to process transactions.

Digital Asset Exchange

In embodiments, one form of trusted entity that may be an issuer of tokens or an agent of the issuer is a digital asset exchange or bank. In embodiments, the trusted entity may maintain a token database on a blockchain. In embodiments, the trusted entity may maintain the token database off chain as a sidechain which may be periodically or aperiodically published to a blockchain as discussed elsewhere.

In some embodiments, the trusted entity may be a digital asset exchange. A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

In embodiments, the issuer of the token may be a digital asset exchange, a bank, a trust, or other trusted entity. In the context where a digital asset exchange may act as an issuer for token, or as an agent of the issuer, a digital asset exchange computer system may maintain a ledger as one or more databases associated with the token. Such a database may include an electronic log of all transactions, including the source wallet, the destination wallet, the timestamp of the transaction, the amount of the transaction (e.g., the number of tokens), and/or the balance in each wallet before and/or after the transaction. In embodiments, the database may include a list of wallet addresses and balances in each wallet of the token. In embodiments, the issuer may maintain the database by using a smart contract in association with a Contract Digital Address as part of a blockchain network, such as the Ethereum Network. In embodiments, the ledger may be maintained in a database as a sidechain which is periodically, or aperiodically, published to a blockchain such as the Ethereum blockchain. In embodiments, the ledger may be maintained directly on the blockchain.

Figure 3:
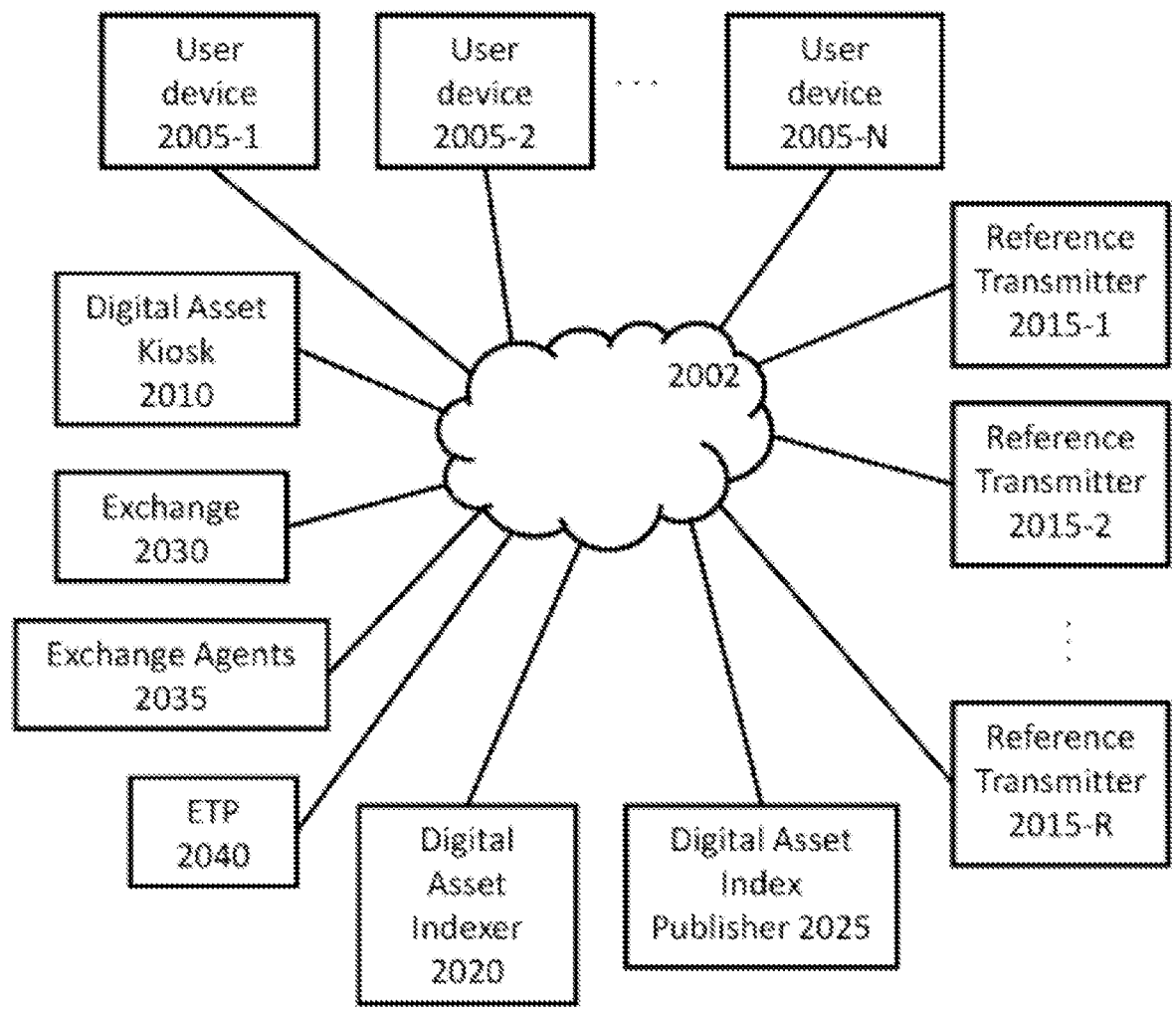
FIG. 3 is a schematic diagram of participants in a system for providing a digital asset index and a digital asset exchange in accordance with exemplary embodiments of the present invention.

FIG. 3 illustrates an exemplary system for providing a digital asset index in accordance with the present invention. A digital asset index system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025 (e.g., Winkdex, Bloomberg, Google, Yahoo, to name a few), one or more exchanges 2030, one or more exchange agents 2035, and/or an exchange traded product computer system 2040, to name a few. Any of the components involved in a digital asset index system may be connected directly (e.g., through wired or wireless connections) or indirectly, such as through a data network 2002. Any of the components of a digital asset index system can comprise or include a computer system comprising one or more computers. Accordingly, any of the components may have at least one or more processors, computer-readable memory, and communications portals for communicating with other components of the system and/or outside entities.

Still referring to FIG. 3, a user device 2005 may be a mobile phone, smart phone, PDA, computer, tablet computer, and/or other electronic device that can receive communications. A user device 2005 may run software, such as a digital wallet, for accessing a digital asset index or may access a digital asset index through a general Internet browser. A digital asset kiosk 2010 may also access a published digital asset index, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An application programming interface ("API") may be used to provide access to a digital asset index from one or more third-party devices or computer systems. An embeddable widget may be provided to enable display on a third-party website of digital asset index data and/or index visualizations (e.g., graphs, charts, and/or accompanying visualization options, such as time range).

Still referring to FIG. 3, data from one or more reference transmitters 2015 may be used to generate an index, as discussed herein. Transmitters may be money service businesses or money transmit businesses in the United States. Transmitters 2015 may be part of a digital asset exchange 2030. Exchanges 2030 outside the United States may function like transmitters, e.g., performing all or part of the roles ascribed herein to transmitters 2015, but without the same money transmit licenses as required in the United States.

Digital Asset Accounts and Transaction Security

Figure 4:
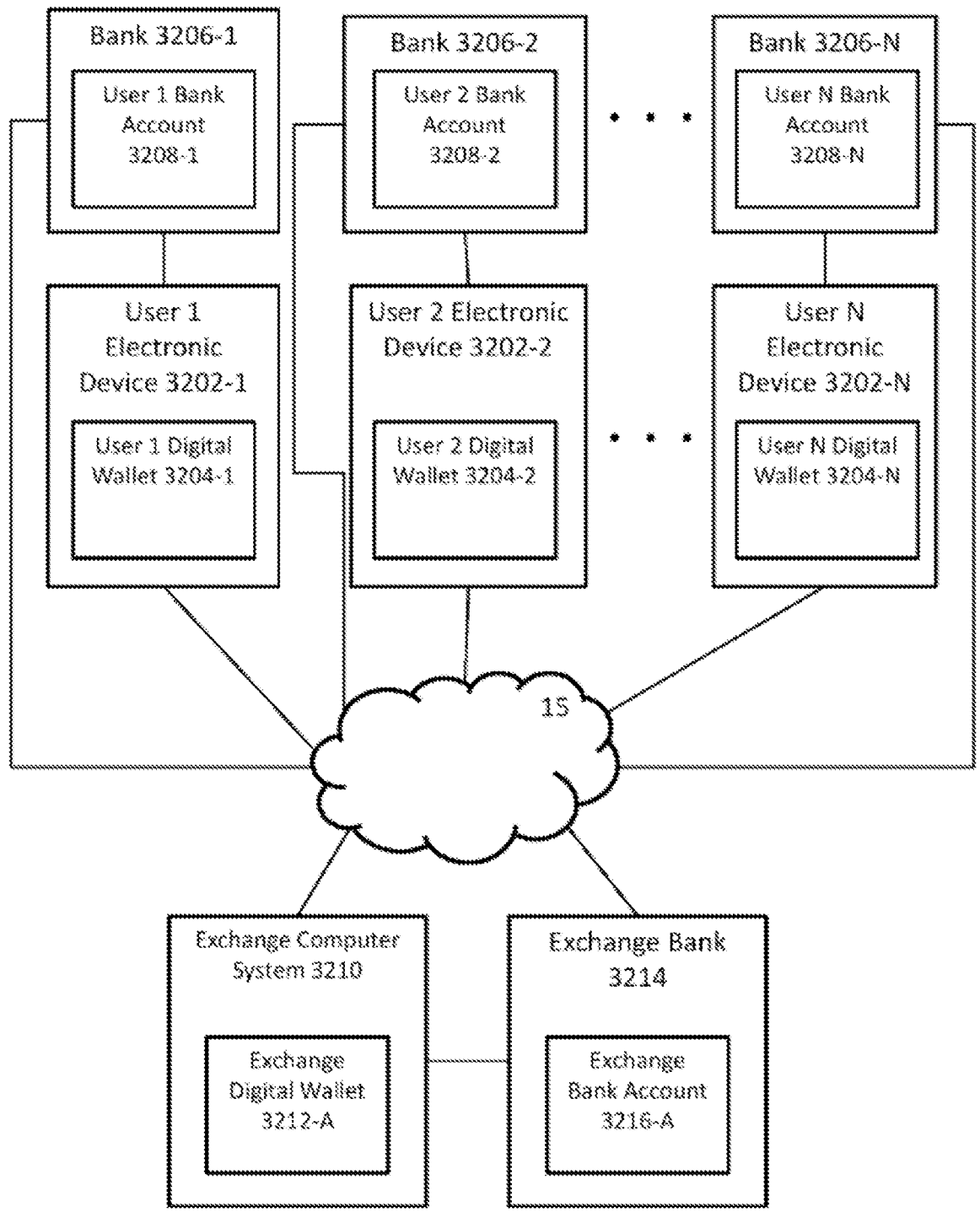
FIG. 4 is an exemplary exchange agent interface in accordance with exemplary embodiments of the present invention.

FIG. 4 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., U.S. Dollars, Euros, Yen, to name a few) in exchange for digital assets (e.g., bitcoin, ether, litecoin, dogecoin, to name a few). Digital asset sellers may exchange digital assets (e.g., bitcoin, ether, litecoin, dogecoin, to name a few) for fiat (e.g., U.S. Dollars, Euro, Yen, to name a few). In embodiments, instead of fiat, other forms of digital assets may also be used.

In embodiments, users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204. In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, or digital asset address associated with a digital wallet, or electronic account. In embodiments, a digital wallet may be stored on a user electronic device, such as a mobile electronic device, or other computing device.

Users may also have user bank accounts 3208 held at one or more banks 3206. In embodiments, users may be able to access their bank accounts from a user electronic device 3202 and/or from a digital wallet 3204 or digital address associated therewith.

A digital asset exchange computer system 3210 can include software running on one or more processors, as discussed herein, as well as computer-readable memory comprising one or more database. A digital asset exchange can include one or more exchange digital wallets 3212, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third party. Upon receipt by the appropriate recipient of the requisite amount of digital assets, the exchange may authorize the release of the fiat currency to the digital asset seller. In embodiments, an exchange may hold, e.g., as custodian, fiat in bank accounts and digital assets in digital wallets at associated digital asset addresses. In embodiments, instead of using bank accounts, other stable investment instruments such as money market mutual funds, treasury bills, certificates of deposits, low risk bonds, to name a few, may be used.

Figure 5A:
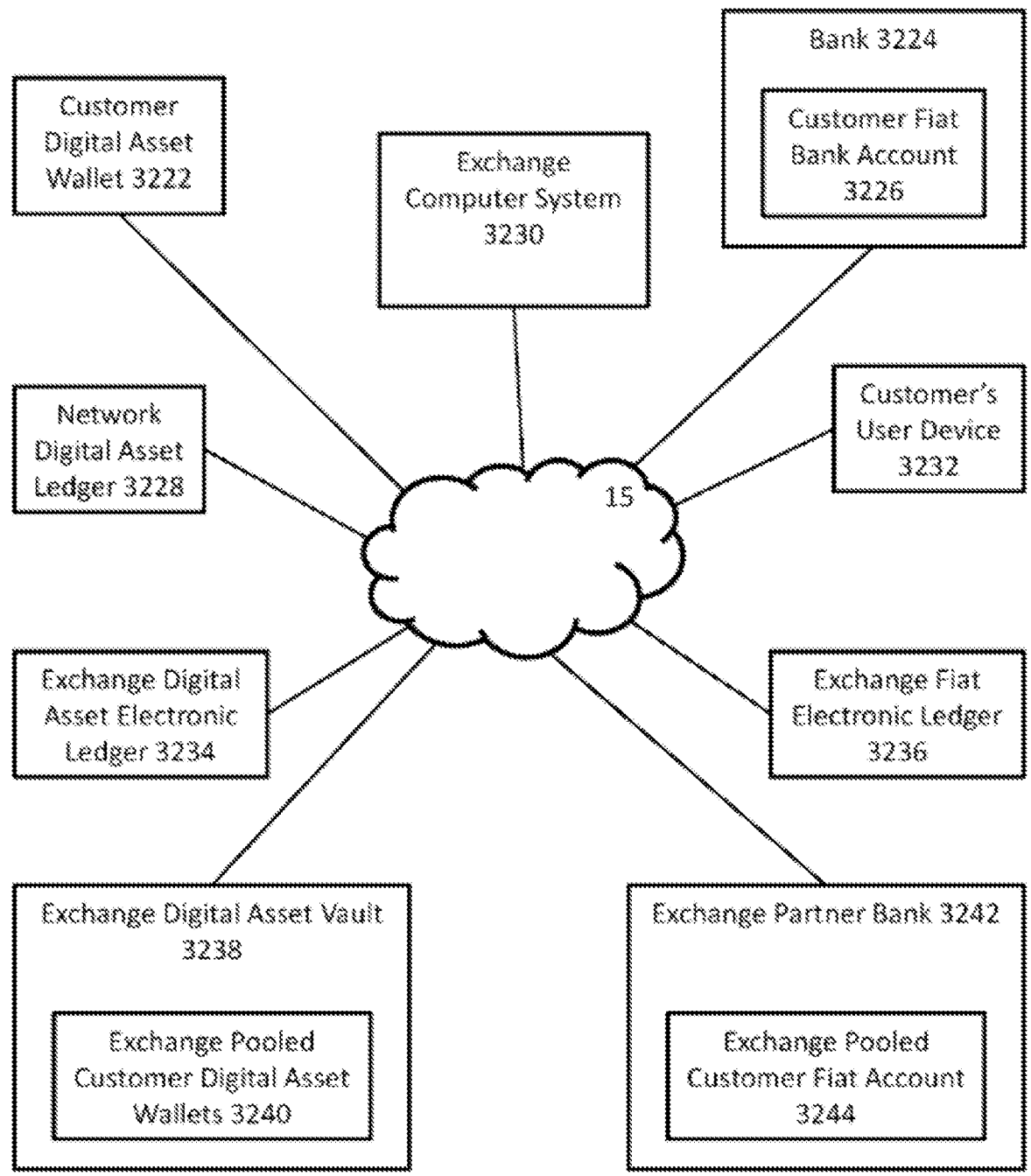
FIGS. 5A-B are schematic diagrams illustrating participants in a digital asset exchange in accordance with exemplary embodiments of the present invention.

FIG. 5A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets at associated digital asset addresses 3222 (e.g., bitcoin wallets), customer banks 3224 having customer fiat bank accounts 3226, a digital asset network ledger 3228 (e.g., the Bitcoin blockchain), a digital asset network (e.g., the Bitcoin network), one or more exchange customers using one or more customer user device 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240 with associated digital asset addresses. In embodiments, the exchange may have a single partner bank 3242 with a pooled exchange customer fiat account 3244. Such an account may be associated with insurance protection.

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin or ether) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known. Accordingly, the exchange may require new exchange customers to provide valid (e.g., complying with certain types, such as a driver's license or passport, or complying with certain characteristics) photo identification, a current address, a current bill, such as a utility bill, biometric information (e.g., a fingerprint or hand scan), and/or bank account information. A user on-boarding module can include back-end computer processes to verify and store user data as well as a front-end user interface by which a user can provide information to the exchange, select options, and/or receive information (e.g., through a display). The user on-boarding module can provide the front-end interface to one or more user devices and/or platforms, such as a computer, mobile phone (e.g., running an exchange-related mobile application), and/or digital asset kiosk, to name a few.

Figure 5B:
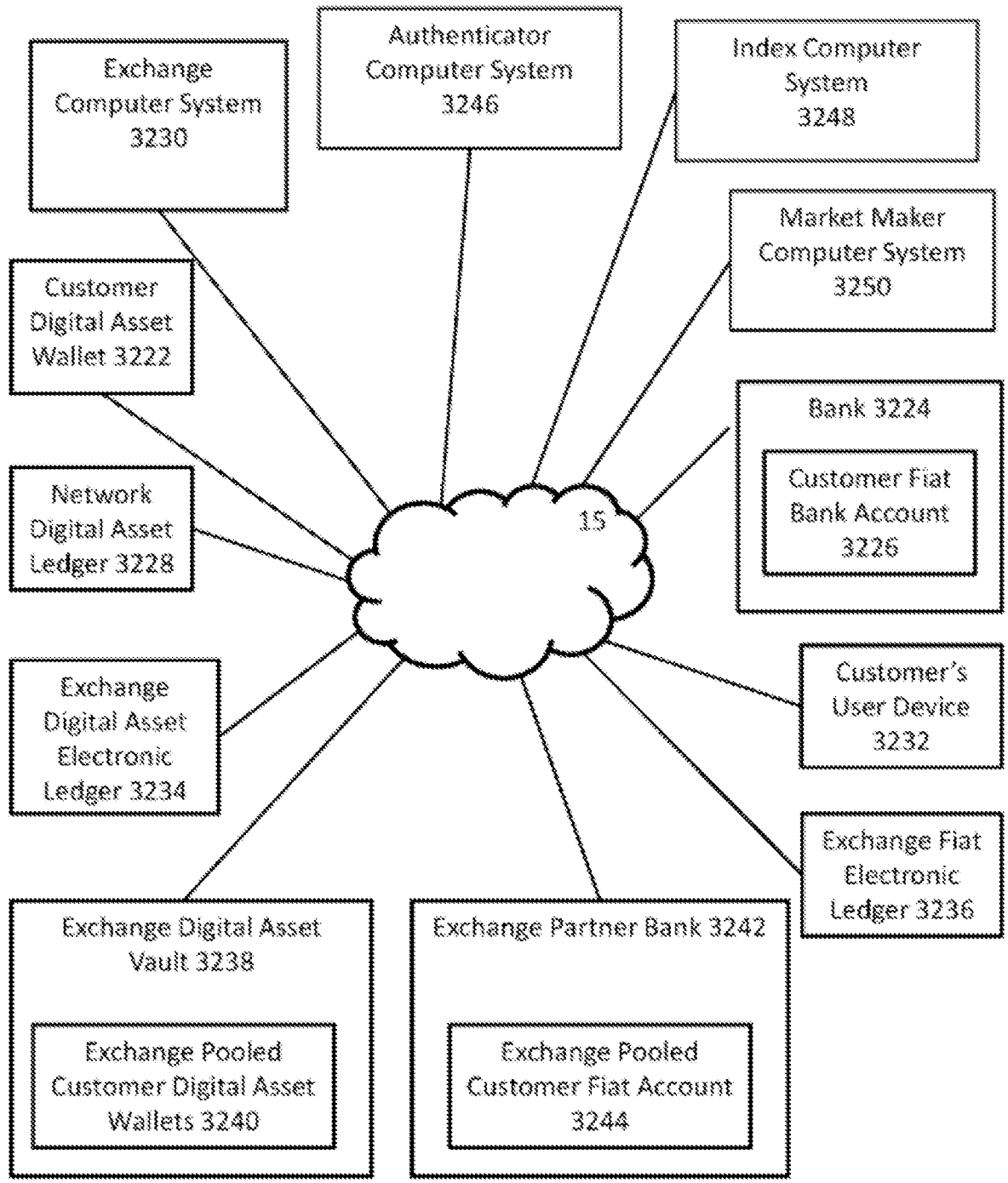

FIG. 5B shows another schematic diagram illustrating entities associated with a digital asset exchange in an exemplary embodiment of the present invention. In addition to the participants described with respect to FIG. 5A, a digital asset exchange may communicate with an authenticator computer system 3246 (to authenticate users, e.g., using multi-factor authentication and/or comparisons to databases of flagged users, to name a few), an index computer system 3248 (e.g., for generating and/or providing a digital asset index, which may be a price index), and/or a market maker computer system 3250. A market maker may be an exchange user that provides liquidity for the exchange, by purchasing or selling digital assets.

In embodiments, an exchange computer system may calculate different fees for a market maker. The fee calculation may vary with market conditions, such as price, digital asset supply (e.g., sell orders), and digital asset demand (e.g., buy orders). In embodiments, transaction fees charged by an exchange may be different for purchase and sale transactions. Fees may be based upon a user's identity, a user's transaction history, the quantity of digital assets and/or fiat currency associated with a user account, a rate schedule associated with a particular account or account type (e.g., there could be different rates for institutional or foreign users), time of day, and/or whether the user is operating as a market maker or a market taker for a given transaction, to name a few.

Figure 6A:
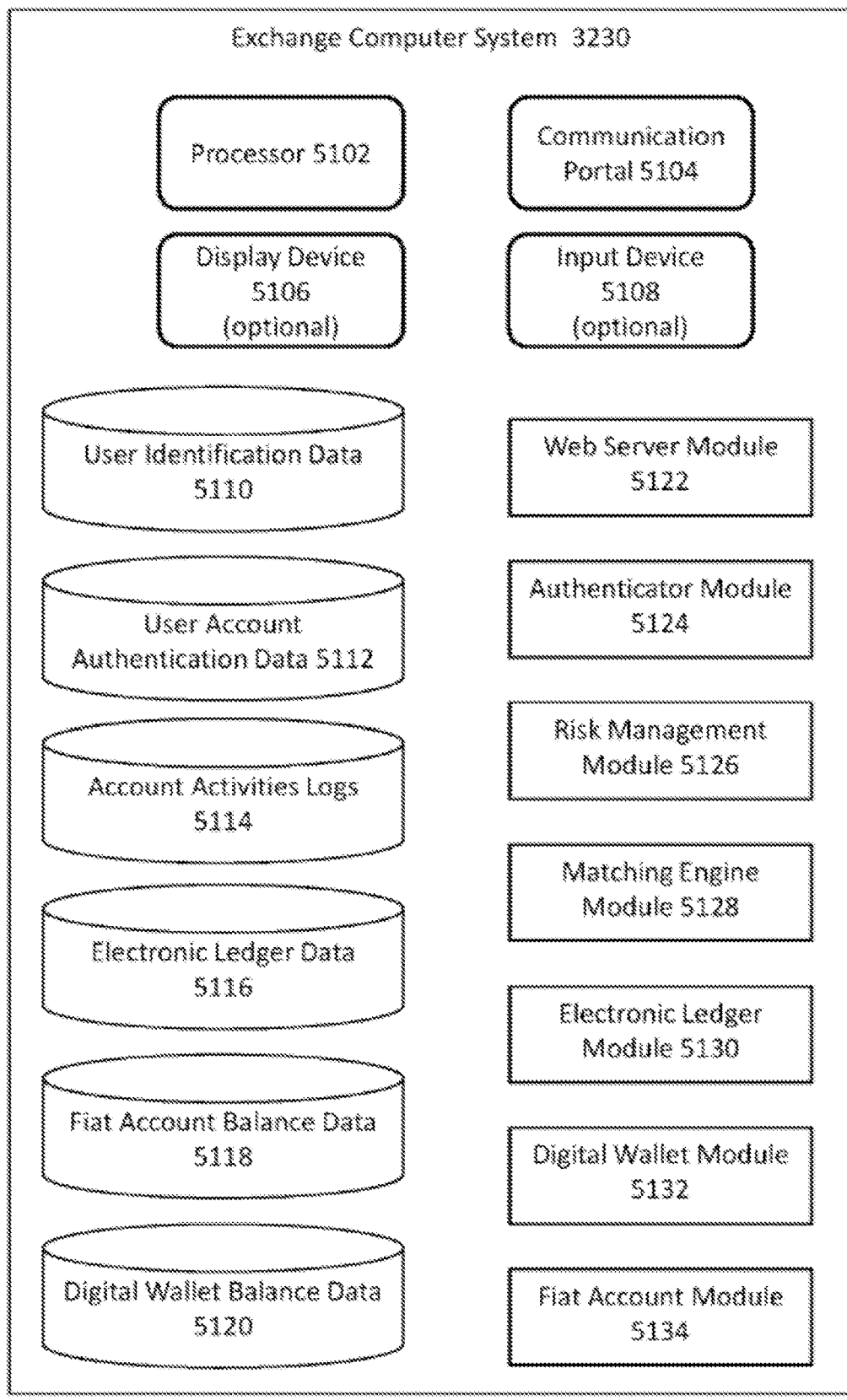
FIGS. 6A-B are schematic diagrams of exemplary exchange computer systems in accordance with exemplary embodiments of the present invention.
Figure 6B:
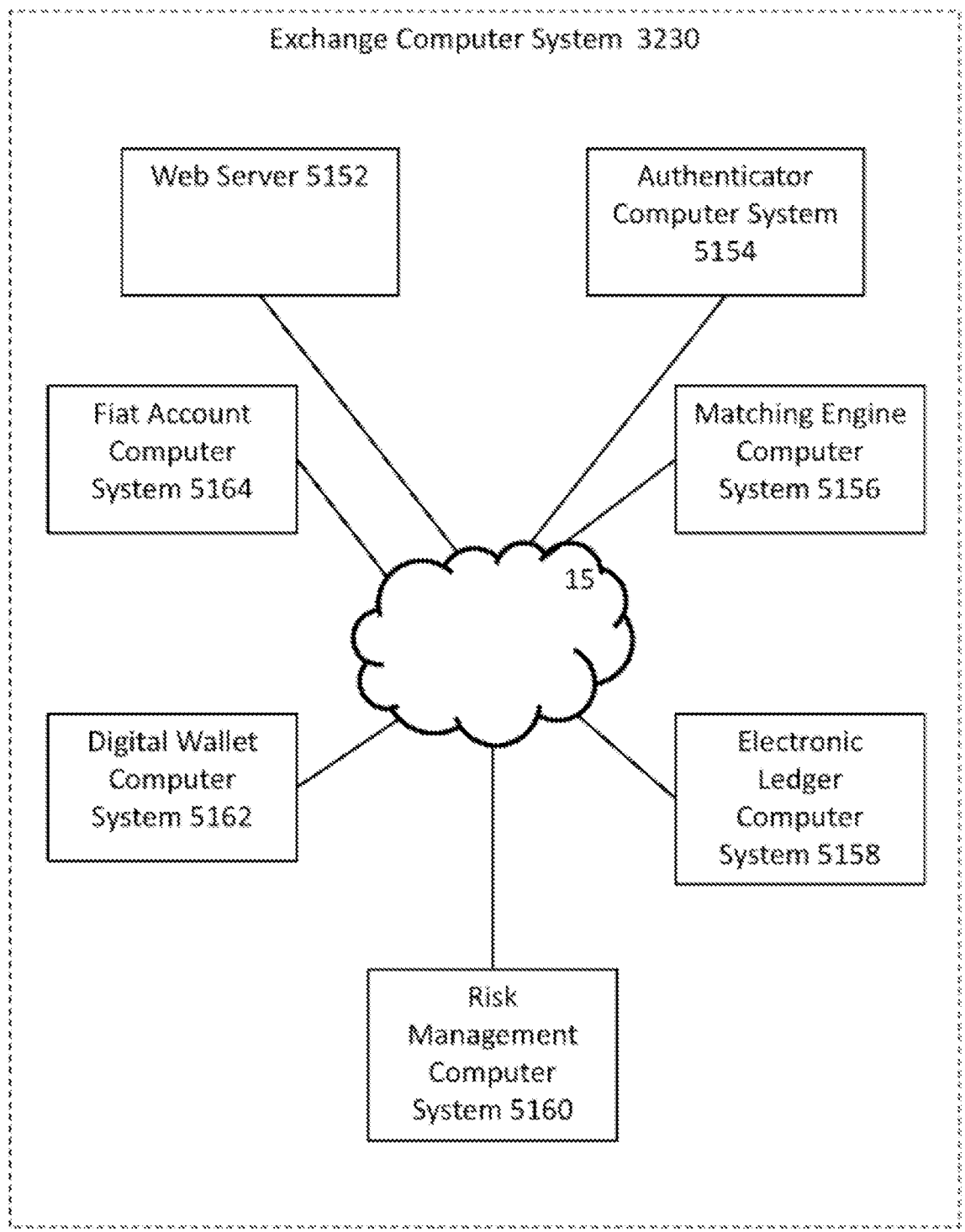

FIGS. 6A-B are schematic diagrams of exemplary exchange computer systems in accordance with exemplary embodiments of the present invention. FIG. 6A shows hardware, data, and software modules, which may run on one or more computers. FIG. 6B shows an exemplary distributed architecture for the exchange computer system.

As shown in FIG. 6A, an exchange computer system 3230 can include one or more processors 5102, a communication portal 5104 (e.g., for sending and/or receiving data), a display device 5106, and/or an input device 5108. The exchange computer system 3230 can also include non-transitory computer-readable memory with one or more database and data stored thereon. Data can include user identification data 5110 (e.g. know your customer data obtained during the user onboarding process), user account authentication data 5112 (e.g., login credentials, multi-factor authentication data, and/or anti-money laundering verifications), account activities logs 5114, electronic ledger data 5116, fiat account balance data 5118, and/or digital wallet balance data 5120. One or more software modules may be stored in the memory and running or configured to run on the one or more processors. Such modules can include a web server module 5122, authenticator module 5124, risk management module 5126, matching engine module 5128, electronic ledger module 5130, digital wallet module 5132, and/or fiat account module 5134. The processes performed by such modules, the data produced thereby and/or the data accessed thereby are described herein.

Account activities log 5114 may track all user requests received by the exchange computer system. The computer system may generate usage statistics and/or analyze user activity for patterns, e.g., to detect fraudulent behavior.

In embodiments, the risk management module 5126 may analyze user activity logs (e.g., access logs, transaction logs, user electronic requests, website navigation logs, mobile application usage logs, to name a few) to identify behavioral patterns, anomalies, and/or potentially fraudulent activity (such as fraudulent electronic requests).

In embodiments, an exchange may conduct user or account verification procedures. In embodiments, these user or account verification procedures may comprise participating with third-party vendors in connection with certain Know Your Customer services. In embodiments, an exchange may implement alternative anti-money laundering (AML) measures. In embodiments, AML measures may include monitoring each transaction on the digital asset exchange for particular factors (e.g., amounts of transaction, location of transaction, volume of activity, to name a few). In the United States, the exchange may provide a user on-boarding mechanism that receives a user registration request, receives a user domicile (e.g., a state of domicile), and/or directs the user to an anti-money laundering user interface based upon the domicile. In embodiments, this interface may be generated at a user device using display data transmitted from the exchange computer system.

A matching engine 5128 may apply a continuous order book price time priority matching algorithm. In embodiments, the matching engine may apply option points at low and/or high frequencies.

As shown in FIG. 6B an exchange computer system can include a web server 5152, an authenticator computer system 5154, a matching engine computer system 5156, an electronic ledger computer system 5158, a risk management computer system 5160, a digital wallet computer system 5162, and/or a fiat account computer system 5164. The exchange computer system 3230 may communicate with one or more external computer systems, such as bank computer systems, index computer systems, user computer system (e.g., institutional or individual users), and/or user electronic devices. Each computer system may comprise one or more computers and/or one or more processors, a communication portal, display devices, and/or input devices, to name a few.

A web server 5152 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination.

An authenticator computer system 5154 may perform authentication of user login credentials, multi-factor authentication, and/or compare users against databases, such as government databases, for compliance with anti-money laundering laws and/or regulations.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets with associated digital asset addresses, generate instructions for digital wallet key storage and/or retrieval, allocate digital assets among digital wallets, track digital assets, store digital asset, and/or transfer digital assets, to name a few.

The digital wallets may include both hot wallets and cold wallets. In embodiments, sufficient digital assets will be stored in one or more hot wallets to allow for liquidity. The amount of digital assets stored in the one or more hot wallets may be determined based on historical averages of trading on the exchange. In embodiments, remaining digital assets will preferably be held in cold wallets. A more detailed discussion of hot wallets and cold wallets is presented in U.S. Pat. No. 9,892,460, issued Feb. 13, 2018 and entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein by reference.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few.

Accordingly, the fiat account computer system may communicate with one or more external systems, such as a bank computer system. In embodiments, the fiat account computer system may process withdrawals. In embodiments, the omnibus or pooled accounts for holding fiat are maintained in a bank or other institution such that these accounts are eligible for insurance under the Federal Deposit Insurance Corporation (FDIC). In order to qualify for FDIC insurance, an account must typically be associated with specific user identification information, e.g., a user name, address and social security number, by way of example, to name a few. Accordingly, in embodiments, fiat accounts may be associated with individuals who are positively identified.

Figure 7A:
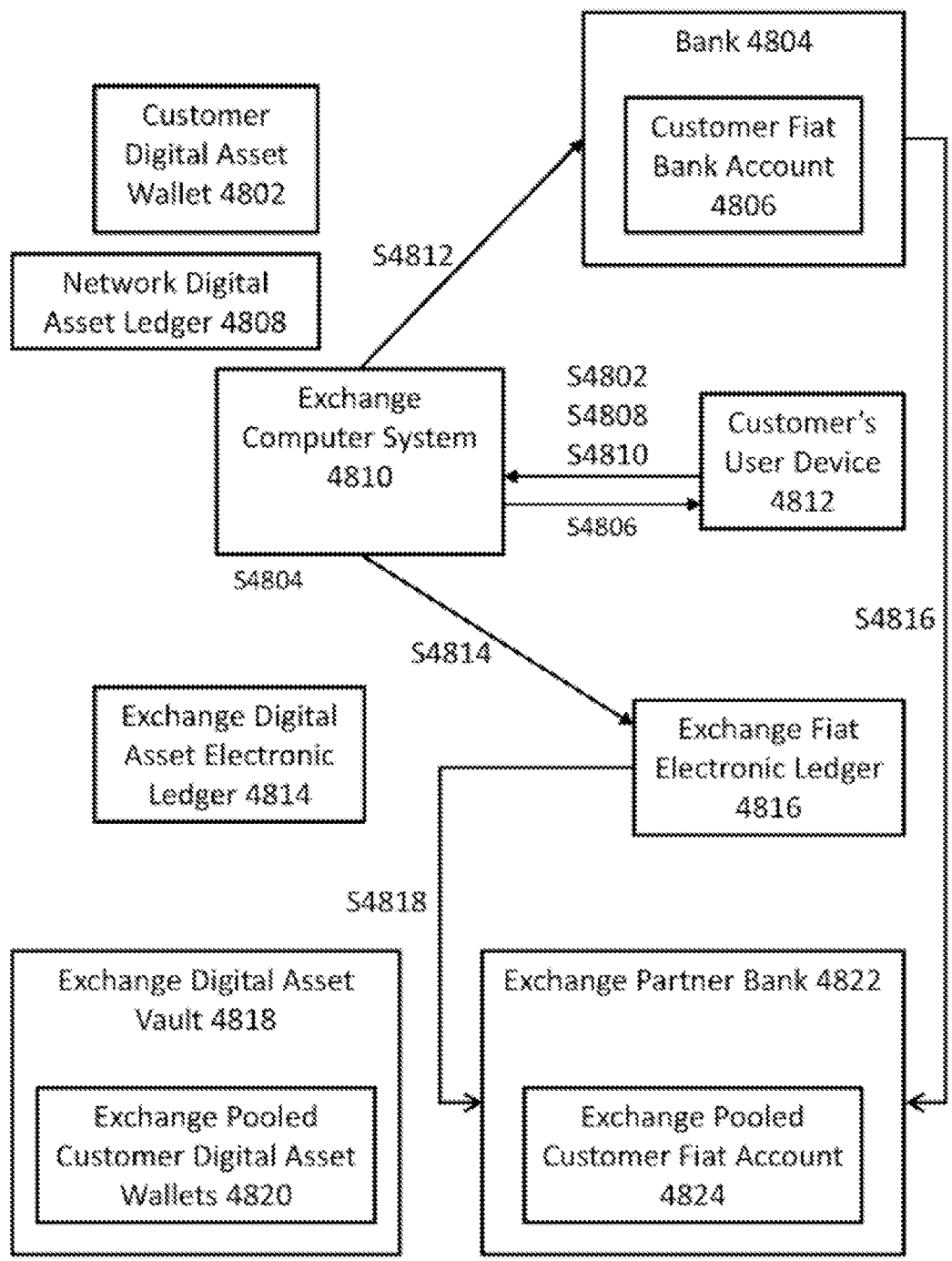

FIG. 7A is an exemplary schematic diagram of an exchange, and FIG. 7B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820 with associated digital asset addresses. Any of these entities or components may communicate directly and/or indirectly, e.g., through a data network, such as the Internet. In embodiments, encryption and/or other security protocols may be used. These entities and components are further described with respect to FIG. 5A.

Referring to FIG. 7B, in a step S4802 the exchange computer system can receive, e.g., from a user device, user access credentials. In a step S4804, the exchange computer system can authenticate the user, such as by verifying the received access credentials. In a step S4806, the exchange computer system may provide to a customer user device a fiat funding interface. In a step S4808, the exchange computer system may receive from the user device user selections for a funding source and/or funding method. The funding source may identify a bank account or other fiat account. The funding method may identify ACH transfer or wire transfer, to name a few. In a step S4810, the exchange computer system can receive from the user device a funding amount value to transfer to an exchange account associated with the user. In embodiments, S4808 and S4810 may be a single step. Accordingly, the exchange computer system may receive from a user electronic device a user electronic request comprising a funding amount and a funding method, wherein the funding method is an ACH transfer and the request further identifies a verified user bank account.

In a step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In a step S4814, the exchange computer system can update an exchange fiat electronic ledger with the funding transaction information. In a step S4816, the exchange computer system can receive an electronic indication that the funding amount was transferred from the customer's fiat bank account to an exchange fiat account, e.g., at a partner bank. In a step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain and/or loss reporting system and a transaction history system. A fraud analysis system can monitor transactions to detect fraudulent and/or unauthorized transactions.

Exchange Digital Asset Storage Structure

Deposited customer fiat may be held in a pooled fiat account maintained in a partner bank. Meanwhile, digital assets held by the exchange may be maintained in pooled digital addresses associated with pooled digital wallets, such as aggregated custodial wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated offline with transactions generated offline, e.g., on an isolated computer, and transferred to a networked computer via a temporary physical connection or manual transfer. Isolated computer systems are physically and operationally isolated from other computer systems. For example, an isolated computer system may be an air gapped computer system. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 bitcoin), and/or certain defined fiat amounts (e.g., $100 worth of bitcoin) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. These exchange operated wallets may be maintained in trust by the exchange for each customer as associated digital asset addresses. Transactions may be processed by the digital asset network, e.g., the Bitcoin network. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets with associated digital asset addresses. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key to each custodial wallet whether it be segregated or commingled. Transactions may be made between different custodial wallets or between custodial wallets and exchange customer wallets in the manner described above.

Centralized Digital Asset Exchange

In embodiments, the exchange may hold customer fiat currency and/or digital assets in centralized, pooled accounts or wallets. As discussed herein, the exchange may maintain an electronic ledger to record transactions among users of the exchange. Separate electronic fiat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counter-party to the transaction. Transaction amount limits may be place on such transactions and/or additional fees may be charged.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the fiat assets recorded in the fiat account may be U.S. Dollars held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and fiat account.

In embodiments, a digital asset exchange may accept payment methods (e.g., credit card transactions; Automated Clearing House (ACH) debits, wire transfers, digital asset transactions, to name a few) for purchases of digital assets.

In embodiments, users may utilize sub-accounts subordinate to the master account. In embodiments, sub-accounts can be used as entities for traders, or can be used by machines associated with an owner, as discussed in U.S. patent application Ser. No. 15/071,902, filed Mar. 16, 2016 and entitled AUTONOMOUS DEVICES, which is expressly incorporated herein by reference.

In embodiments, a digital asset exchange may hold digital math-based assets and/or fiat currency in trust for users before, during and after a trade. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, fiat currency may be transmitted to a digital asset exchange's omnibus account. In embodiments, the exchange may transmit fiat currency back to a user upon receiving a request from a user.

In embodiments, a digital asset exchange may comply with relevant laws and regulations whereby the exchange may operate in a highly regulated banking environment and permit necessary supervision by relevant legal authorities.

In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction.

In embodiments, the exchange may permit trading twenty-four hours a day, seven days a week. In embodiments, the exchange may shut down for scheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for fiat currency or buy digital math-based assets with fiat currency if the user holds sufficient fiat currency in its associated account prior to initiating the transaction.

In embodiments, as discussed herein, exchange customers looking to buy digital assets may be matched to customers looking to sell digital assets, which matching may be performed by an exchange trading engine. Transaction volumes and prices may be based at least in part upon bids and asks that are received by the trading engine from the customers.

Decentralized Digital Asset Exchange

Figure 8A:
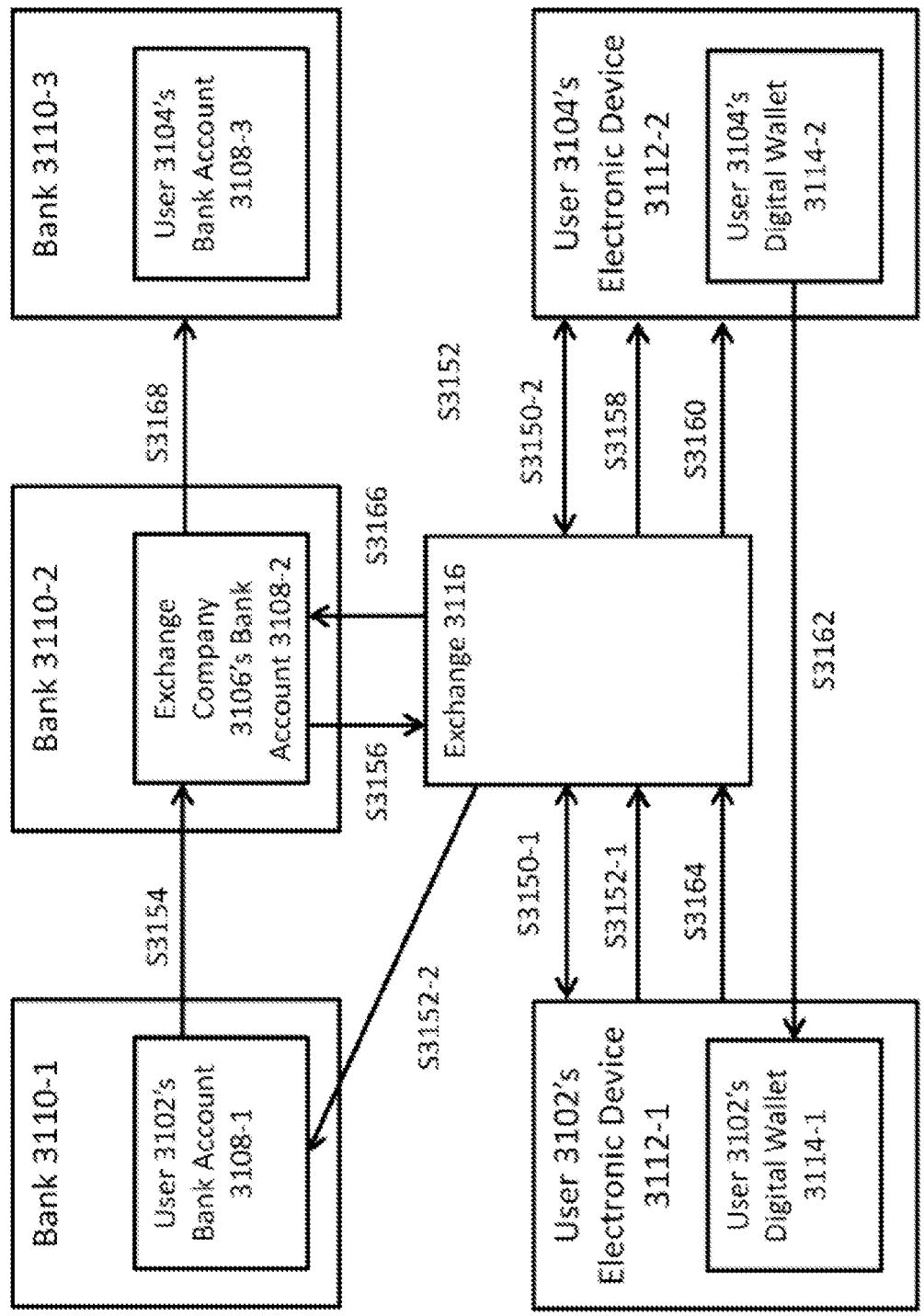
FIGS. 8A-B are a schematic diagram and corresponding flow chart showing participants in and processes for a digital asset exchange system in accordance with exemplary embodiments of the present invention.
Figure 8B:
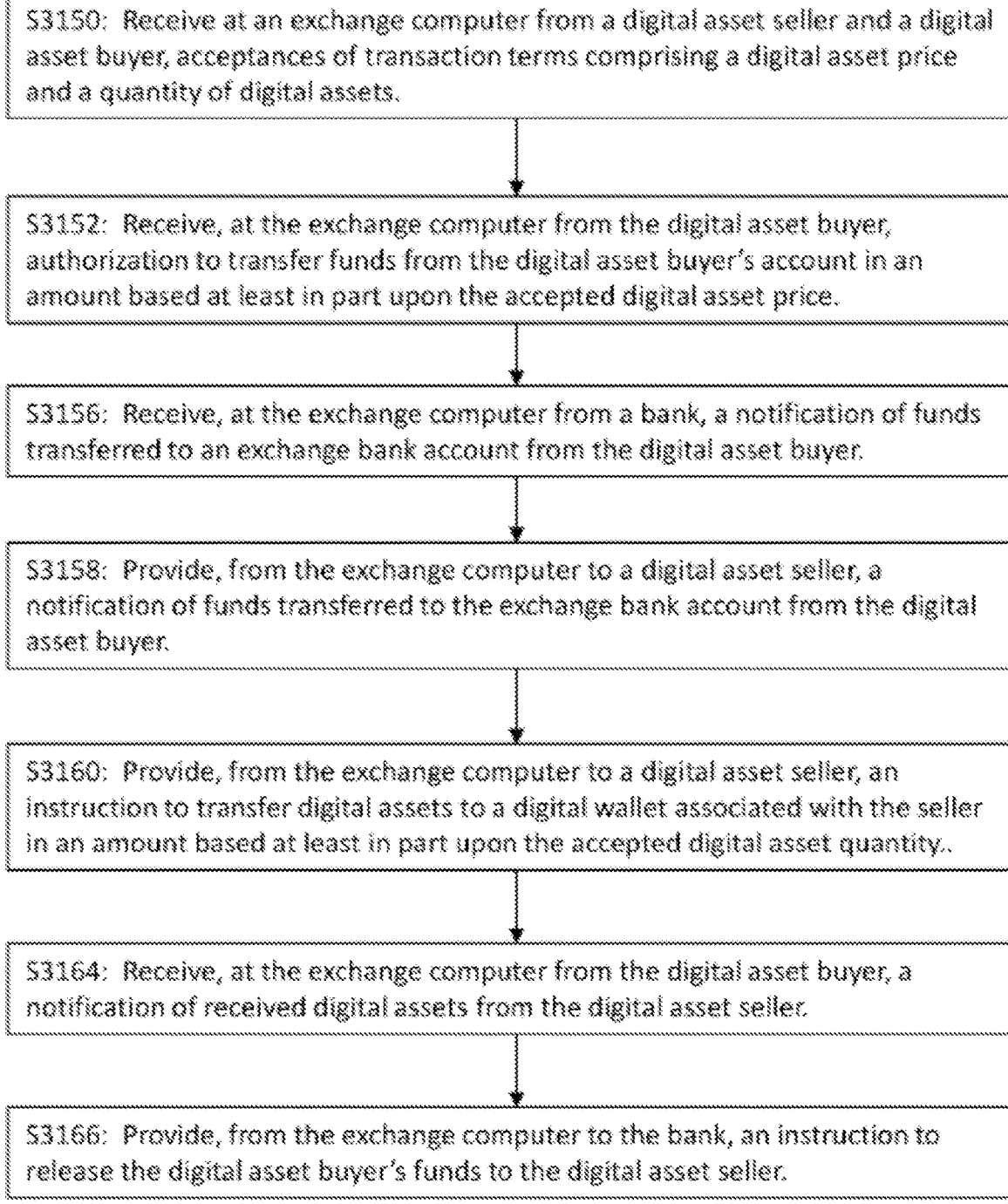

FIGS. 8A-B are a schematic diagram and corresponding flow chart showing participants in and processes for a digital asset exchange system in accordance with exemplary embodiments of the present invention. A digital asset exchange may provide conversions among digital math-based assets and fiat currencies. In embodiments, conversions may be performed between differently denominated digital math-based assets. In embodiments, a digital asset exchange may facilitate the buying and selling of digital assets in exchange for other digital assets, non-digital assets, fiat currencies, or other financial instruments. The parties to such a transaction may be individuals, organizations, and or institutions. In embodiments, the exchange itself or its operator or owner may be the counter-party to an exchange transaction.

FIG. 8B is a flow chart corresponding to the digital asset exchange system illustrated in FIG. 8A. In a step S3150, one or more exchange computers comprising an exchange computer system may receive from a digital asset buyer acceptances of transaction terms comprising a digital asset price and a quantity of digital assets.

In a step S3152, the exchange computer system may receive from the digital asset buyer authorization to transfer funds from the digital asset buyer's account in an amount based at least in part upon the accepted digital asset price.

In a step S3156, the exchange computer system may receive from a bank, a notification of funds transferred to an exchange bank account from the digital asset buyer.

In a step S3158, the exchange computer system may provide to a digital asset seller a notification of funds transferred to the exchange bank account from the digital asset buyer.

In a step S3160, the exchange computer system may provide to a digital asset seller, an instruction to transfer digital assets to a digital wallet associated with the seller in an amount based at least in part upon the accepted digital asset quantity. In embodiments, the digital asset seller may transfer digital assets to a digital wallet associated with (e.g., owned by and/or operated by) the exchange. The exchange may hold such funds in escrow until the buyer's payment is received, e.g. into a bank account (for fiat currencies) or into a digital wallet (for other digital assets).

In a step S3164, the exchange computer system may receive from the digital asset buyer a notification of received digital assets from the digital asset seller.

In a step S3166, the exchange computer system may provide to the bank, an instruction to release the digital asset buyer's funds to the digital asset seller.

In another embodiment, the exchange can act as a counter-party to transactions where digital assets are bought and/or sold for a differently denominated digital asset or a fiat currency. In embodiments, the system illustrated in FIG. 8A can be used to perform exchange transactions with multiple counter-parties. An exchange computer system may identify a digital asset seller and a plurality of buyers. The exchange computer system may determine, obtain, or receive (e.g., from computers, digital asset kiosks, or user electronic devices associated with the buyers) public addresses of digital asset wallets associated with the buyers. The exchange computer system may also determine, obtain, or receive digital wallet information (e.g., public address, public key, and/or private key) associated with the seller. In embodiments, wallet information of any exchange participant may be stored by the exchange computer system in one or more databases, which may be accessed as part of a transaction. A participant in an exchange transaction may also input (e.g., via downloadable software or a website associated with the exchange) and/or otherwise transmit to the exchange required digital wallet information from which to send or in which to receive digital assets. The exchange computer system may use the digital wallet information of the exchange transaction participants to generate transaction instructions. For example, the exchange computer system may pre-program instructions to transfer a certain amount of digital assets from the seller wallet to each buyer wallet. The exchange computer system may also input the digital wallet access credentials (e.g., a public and private key) so that the transaction may proceed.

In embodiments, a digital asset exchange may enable a plurality of users to obtain interest on one or more digital assets (e.g., one or more amounts of one or more types of digital assets) over a period of time. For example, one or more users may transfer an amount of the one or more digital assets to one or more interest-bearing accounts associated with the one or more users. In embodiments, a interest-bearing account may include one or more of the following: DDAs, MMDAs, NOW accounts, stable value funds, one or more digital asset wallets, credit interest programs, and/or a combination thereof, to name a few. In embodiments, the digital asset exchange 3116 may be associated with one or more third party institutions.

For example, the digital asset exchange 3116 may, to earn interest, transfer one or more digital assets from one or more interest-bearing accounts associated with the one or more users (e.g. customers of the digital asset exchange) to one or more accounts associated with a third party institution (an intermediary). The third party institution, continuing the example, may make one or more interest payments or otherwise provide for a return after one or more periods of time (e.g., an investment of 100 BITCOIN™ may return 10 BITCOIN™ after 3 months) to the digital asset exchange 3116 and/or the one or more interest bearing accounts, which may return a portion or all of the interest payments to the one or more users (e.g., the 10 BITCOIN™ minus one or more fees). Continuing the example, in embodiments, the third party institution may continue to make payments to the digital asset exchange 3116 until a predetermined amount of time elapses (e.g., one payment over the predetermined amount of time, two payments over the predetermined amount of time . . . n payments over the predetermined time, to name a few). In embodiments, the third party institution may return the original investment (alternatively, the original investment minus one or more fees) to the digital asset exchange 3116 or the one or more interest-bearing accounts, which may return a portion or all of the original investment to the one or more users (e.g., the 10 BITCOIN™ minus one or more fees).

In embodiments, the third party institution may only provide one payment to the digital asset exchange 3116 or the one or more interest-bearing accounts (i.e., for the purposes of this example, only one payment from the third party to the digital asset exchange 3116). The one payment, in embodiments, may include the interest payment and/or the original investment (or minus the one or more fees), to name a few. In embodiments, as described in the above example, the third party institution may provide one or more payments to the digital asset exchange 3116, the one or more payments may include one or more of the following: one or more interest payments, a portion of the original investment, the original investment, and/or a combination thereof, to name a few. Third party institutions, in embodiments, may include one or more of the following: banks, credit unions, registered investment advisors, broker-dealers, brokerage institutions, asset managers, trust companies, retirement programs, additional institutions providing interest-bearing accounts (insured or not insured) or other investment accounts (e.g., money fund, exchange traded fund, etc.), other financial institutions or intermediaries, and/or a combination thereof, to name a few. Additional institutions may include, by way of example, institutions holding, managing, and/or providing cash management vehicles and/or cash management accounts, such as DDAs, MMDAs, NOW accounts, CDs, stable value funds, credit interest programs, to name a few. In embodiments, third party institutions may hold omnibus accounts and/or individual customer accounts. In embodiments, one or more third party institutions associated with the digital asset exchange 3116 may hold one or more of the following account types: single accounts, certain retirement accounts, joint accounts, revocable trust accounts, irrevocable trust accounts, employee benefit plan accounts, municipalities, corporations, non-profits, individuals, partnerships, retirement accounts, pension accounts, and/or a combination thereof, to name a few.

Figure 9:
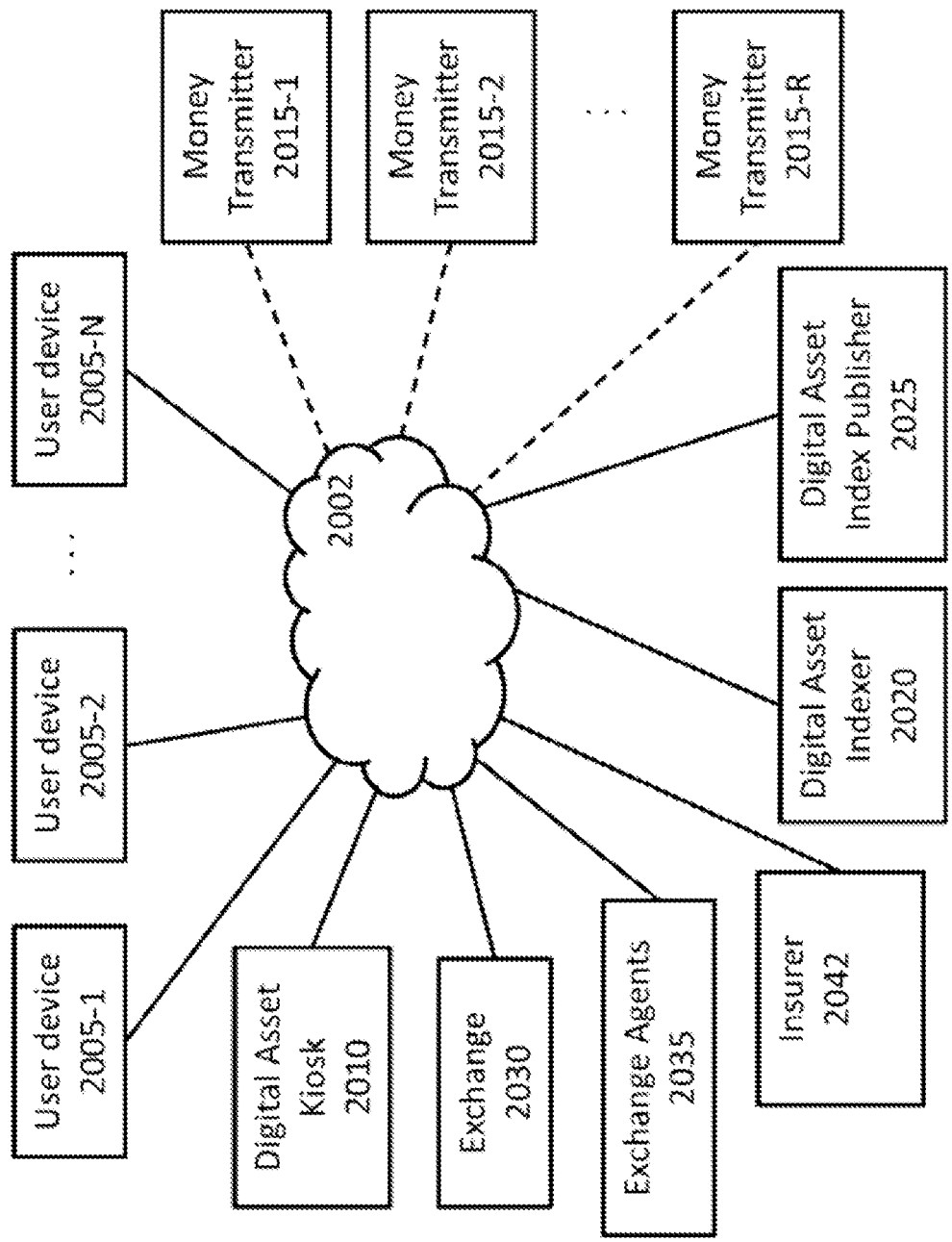
FIG. 9 is a schematic diagram of participants in a system including a digital asset kiosk and a digital asset exchange in accordance with exemplary embodiments of the present invention.

FIG. 9 illustrates an exemplary system including a digital asset kiosk for accessing a digital asset exchange in accordance with embodiments of the present invention. A digital asset kiosk system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025, one or more exchanges 2030, one or more exchange agents 2035, and/or one or more insurers 2042, to name a few. Any of the components involved in a digital asset kiosk system may be connected directly (e.g., through wired or wireless connections) or indirectly, such as through a data network 2002. Any of the components of a digital asset kiosk system can comprise or include a computer system comprising one or more computers. Accordingly, any of the components may have at least one or more processors, computer-readable memory, and communications portals for communicating with other components of the system and/or outside entities.

Still referring to FIG. 9, a user device 2005 may be a mobile phone, smart phone, PDA, computer, tablet computer, and/or other electronic device that can receive communications. A user device 2005 may run software, such as a digital wallet, for accessing a digital asset exchange or may access a digital asset exchange through a general Internet browser. A digital asset kiosk 2010 may also access a digital asset exchange, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An API may be used to provide access to a digital asset exchange from one or more third-party devices or computer systems. An embeddable widget may be provided to enable display on a third-party website of digital asset exchange data and/or exchange data visualizations (e.g., graphs, charts, and/or accompanying visualization options, such as time range).

One or more insurers 2042 may provide insurance for fiat accounts, such as fiat exchange accounts. In embodiments, fiat exchange accounts may be held at an exchange partner bank. Such accounts may be insured by the Federal Deposit Insurance Corporation (FDIC). In embodiments, insurers 2042 may be private insurance companies. Insurers 2042 may also provide digital asset insurance, which may cover private key loss and/or theft and/or digital asset losses or thefts.

Still referring to FIG. 9, data from one or more money transmitters 2015 may be used to authorize users for access to an exchange, such as by performing anti-money laundering compliance processes, as described herein. Transmitters may be money service businesses or money transmit businesses in the United States. Money transmitters 2015 may be part of a digital asset exchange 2030. In embodiments, exchanges 2030 that are located outside the United States may function like transmitters, e.g., performing all or part of the roles ascribed herein to transmitters 2015, but without the same money transmit licenses as required in the United States.

Figure 10A:
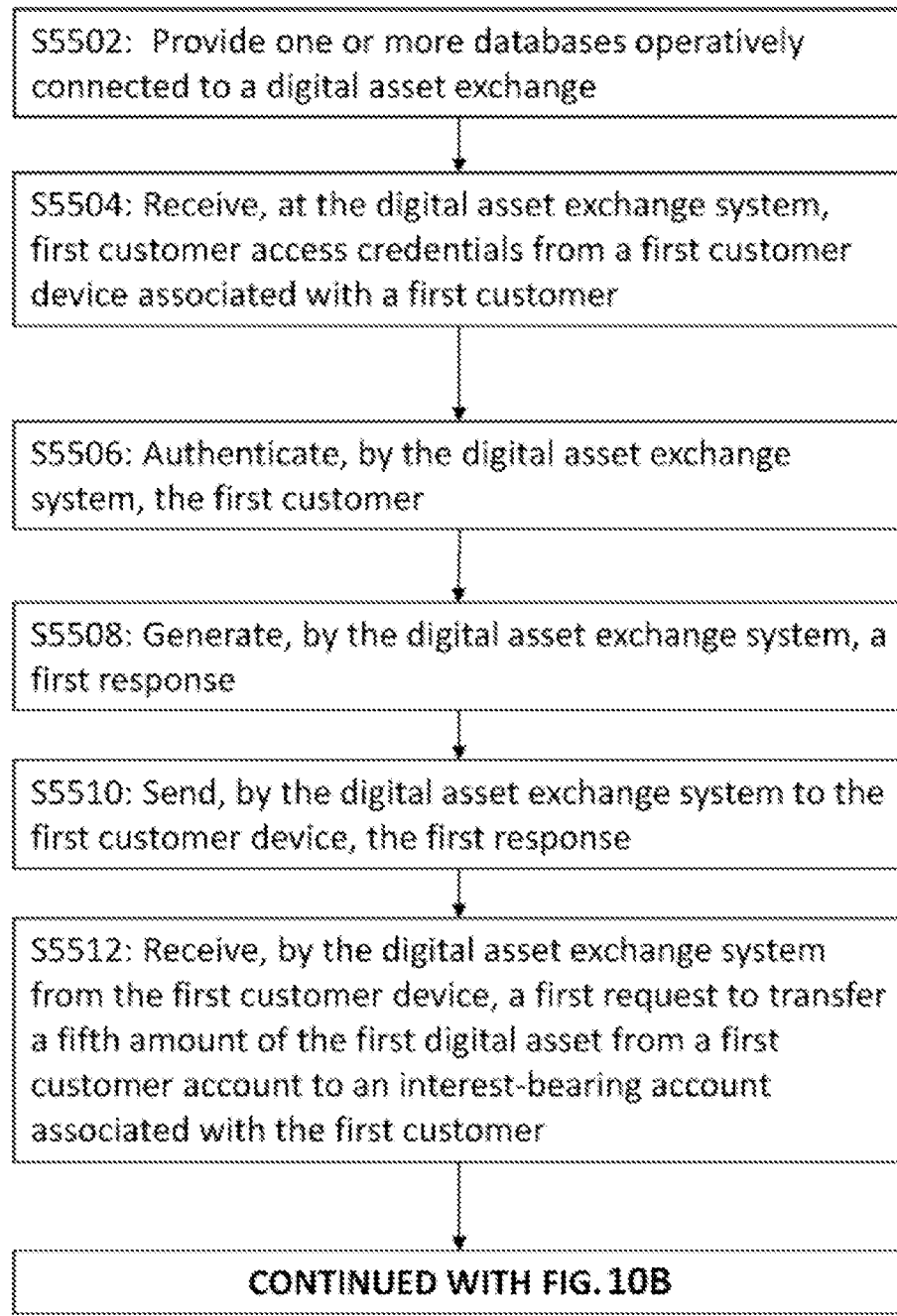
FIGS. 10A-C, are flow charts of exemplary processes for providing interest on an amount of a digital asset in accordance with exemplary embodiments of the present invention.

An exemplary process for providing interest on an amount of digital asset is illustrated in connection with FIG. 10A through FIG. 10C. Referring to FIG. 10A, in embodiments, an exemplary process for providing interest on one or more digital assets may begin with step S5502. At step S5502, in embodiments, the one or more databases operatively connected to a digital asset exchange system (e.g., digital asset exchange 3116 via digital asset exchange computer system 5302) are provided. The one or more databases, in embodiments, may include (as illustrated in connection with FIG. 11A-1) First Electronic Exchange Ledger Database 5502, Second Electronic Interest Ledger Database 5504, Third Electronic Ledger Database 5506. In embodiments, a Fourth Electronic Reserve Ledger Database 5508 may be provided as well. The one or more databases may include an electronic log of all transactions associated with exchange accounts, interest-bearing accounts, intermediary accounts, and/or reserve accounts associated with the plurality of users, including, for example, the source account, the destination account, the timestamp of the transaction, the amount of the transaction (e.g., the amount of the first digital asset), and/or the balance in each account before and/or after the transaction. In embodiments, the one or more databases may include a list of account addresses and balances in each account transactions associated with exchange accounts, interest-bearing accounts, intermediary accounts, and/or reserve accounts associated with the plurality of users. In embodiments, the one or more ledgers stored in the one or more databases may be maintained as a sidechain which is periodically, or aperiodically, published to a blockchain such as the Ethereum blockchain. In embodiments, the one or more ledgers may be published directly to the blockchain.

Figure 11A:
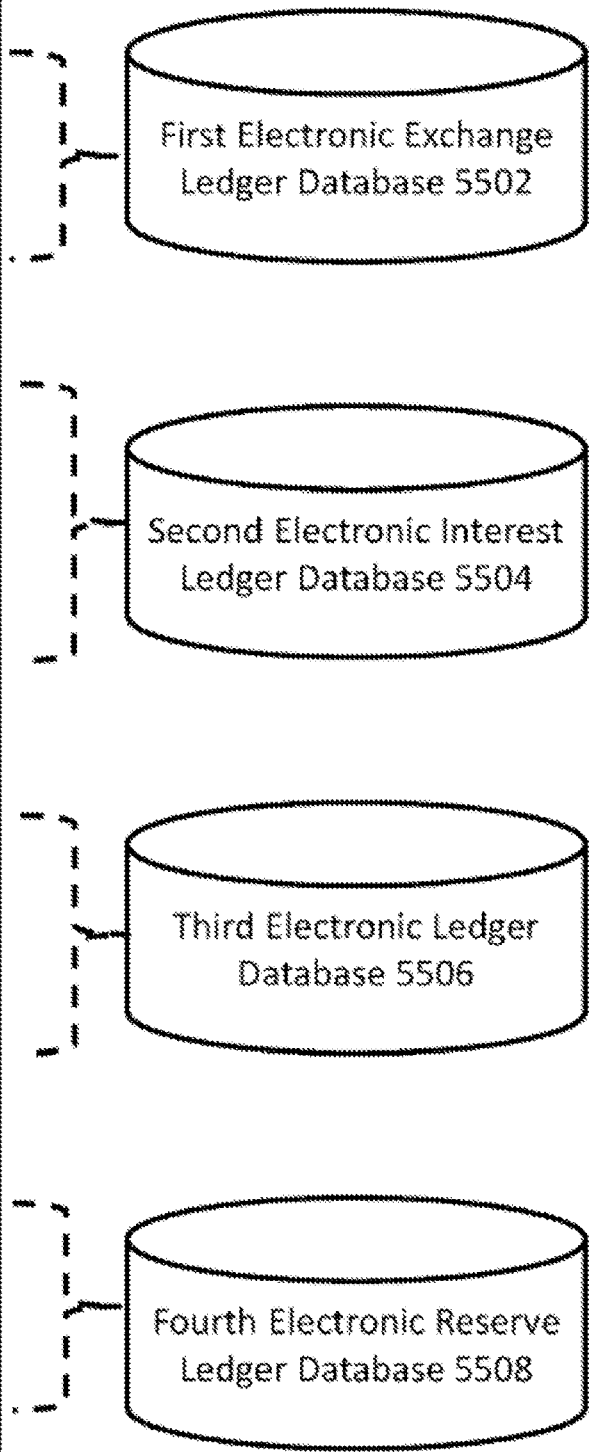
FIG. 11A is an exemplary flow chart illustrating the one or more databases operatively connected to a digital asset exchange system.

In embodiments, the one or more databases may be stored remotely and/or be accessible by the digital asset exchange system. In embodiments, the one or more databases may be accessible via memory. A more detailed description of an exemplary embodiment of step S5502, is illustrated in connection with FIG. 11A. Referring to FIG. 11A, in embodiments, the provided one or more databases may include one or more of the following: (1) a first electronic exchange ledger associated with a first digital asset including, for each customer, exchange account information including a first digital asset account balance indicating a first amount of the first digital asset (e.g., First Electronic Exchange Ledger Database 5502); (2) a second electronic interest ledger associated with the first digital asset including, for each customer, interest-bearing account information including a second digital asset account balance indicating a second amount of the first digital asset and respective interest information (e.g., Second Electronic Interest Ledger Database 5504); (3) a the third electronic ledger associated with an intermediary, including, for each customer, intermediary account information including a third digital asset balance indicating a third amount of the first digital asset and respective return information (e.g., Third Electronic Ledger Database 5506); and/or (4) a fourth electronic reserve ledger associated with the first digital asset, including, for each customer, reserve account information including a fourth digital asset balance indicating a fourth amount of the first digital asset (e.g., Fourth Electronic Reserve Ledger Database 5508), to name a few. In embodiments, the First Electronic Exchange Ledger Database 5502, the Second Electronic Interest Ledger Database 5504, the Third Electronic Ledger Database 5506, and/or the Fourth Electronic Reserve Ledger Database 5508 may be combined and/or dispersed between one or more databases. For example, at least two databases may include one or more of the following: the First Electronic Exchange Ledger Database 5502, the Second Electronic Interest Ledger Database 5504, the Third Electronic Ledger Database 5506, and/or the Fourth Electronic Reserve Ledger Database 5508. As another example, the First Electronic Exchange Ledger Database 5502, the Second Electronic Interest Ledger Database 5504, and/or Reserve Ledger Database 5508 may be stored in a first database and/or the Third Electronic Ledger Database 5506 may be stored in a second database.

The First Electronic Exchange Ledger Database 5502, in embodiments, may include the first electronic exchange ledger associated with the digital asset exchange and one or more first digital assets. In embodiments, the First Electronic Exchange Ledger Database 5502 may be associated with the digital asset exchange and a first digital asset. The first electronic exchange ledger, which may be included in the First Electronic Exchange Ledger Database 5502 may include, for each user (customer) of a plurality of users (e.g., customers of the digital asset exchange), account information associated with each respective customer. The one or more exchange accounts in embodiments, may each be an account with the digital asset exchange. In embodiments, one or more exchange accounts may be maintained in an omnibus account or an aggregated account including deposits of the first digital asset associated with multiple customers or users. Each respective customer exchange account may include, in embodiments, an account balance (e.g., a first account balance) associated with an amount (e.g., a first amount) of the one or more first digital assets (e.g., a first digital asset) held in the respective one or more exchange accounts (e.g., a respective customer exchange account). In embodiments, the first amount may represent an amount of the first digital asset available for transfer via the digital asset exchange. The first digital asset, in embodiments, may be maintained on a distributed public transaction ledger in the form of a blockchain that is maintained by a blockchain network including a plurality of geographically distributed computer systems in a peer-to-peer network.

The Second Electronic Interest Ledger Database 5504, in embodiments, may include the second electronic interest ledger associated with the digital asset exchange and one or more first digital assets. In embodiments, the Second Electronic Interest Ledger Database 5504 may be associated with the digital asset exchange and one or more first digital assets. The second electronic interest ledger which may include the Second Electronic Interest Ledger Database 5504 may include, for each user of the plurality of users, interest-bearing account information associated with each of one or more interest-bearing accounts associated with a respective one or more users of the plurality of users. The one or more interest-bearing accounts, in embodiments, may each be an account with the digital asset exchange. In embodiments, one or more interest-bearing accounts may be an omnibus account including deposits of the first digital asset associated with the respective one or more users. The one or more interest-bearing accounts may include, in embodiments, an account balance (e.g., a second account balance) associated with an amount (e.g., a second amount) of the one or more first digital assets (e.g., the first digital asset) held in a respective interest-bearing account (e.g., a respective customer interest-bearing account). In embodiments, the second amount may represent an amount of the first digital asset earning interest in the respective customer interest-bearing account. The one or more interest-bearing accounts may include, in embodiments, interest information (e.g., respective interest information). The interest information, in embodiments, may include one or more amounts of interests (e.g., a first amount of interest, a second amount of interest . . . an Nth amount of interest). In embodiments, the interest information may include one or more of the following: an amount of interest denominated in the first digital asset, an amount of interest denominated in fiat, an amount of interest denominated in a second digital asset, as amount if interest denominated in both the first digital asset and the second digital asset, a first interest rate, a second interest rate, and/or a combination thereof, to name a few. The second digital asset, in embodiments, may be a stable value token. The first interest rate, in embodiments, may be applicable for a first period of time. In embodiments, the second interest rate may be applicable for a second period of time. The first period of time and the second period of time, in embodiments, may be the same or different from one another. In embodiments, the interest information may include one or more interest amounts associated with the respective customer interest-bearing account. For example, the interest information may include one or more interest payments (e.g., the first interest amount and/or the second interest amount described below in connection with step S5522) associated with the respective customer interest-bearing account.

The Third Electronic Ledger Database 5506, in embodiments, may include the third electronic ledger associated with an intermediary, for example, a third party institution. The third electronic ledger which may be included in the Third Electronic Ledger Database 5506, in embodiments, may include, for each user of the plurality of users, intermediary account information associated with each a respective customer intermediary account associated with a respective customer. In embodiments, each respective customer intermediary account may be an account with the intermediary, third party institution, and/or the digital asset exchange. In embodiments, one or more intermediary accounts may be an omnibus account including deposits of the first digital asset associated with multiple users. Each respective customer intermediary account may include, in embodiments, an account balance (e.g., a third account balance) associated with an amount (e.g., a third amount) of the one or more first digital assets (e.g., the first digital asset) held in the respective intermediary customer account (e.g., a respective customer intermediary account). In embodiments, the third amount may represent an amount of the first digital asset which is loaned to one or more third parties (e.g., the third party institution). In embodiments, a portion of the third amount of the first digital asset may be loaned to one or more third parties. The third amount, in embodiments, may represent an amount of the first digital asset traded on the digital asset exchange or another digital asset exchange by one or more third parties (e.g., the third party institution) associated with the respective one or more intermediary accounts. The one or more intermediary accounts may include, in embodiments, return information (e.g., respective return information). The return information, in embodiments, may indicate a return to be provided to the respective one or more users for allowing the loan of at least a portion of the third amount of the first digital asset. The return information, in embodiments, may indicate a return (e.g., one or more payments based on the third amount of digital assets) to be provided to the respective one or more users for allowing the trade of at least a portion of the third amount of the first digital asset. In embodiments, the return information may include one or more of the following: a first return amount, a first return rate, a return payment schedule, and/or a combination thereof, to name a few. The first return amount, in embodiments, may be: denominated in the first digital asset, denominated in fiat, denominated in a second digital asset, a return rate, and/or a combination thereof. In embodiments, the second digital asset may be a stable value token. The first return rate, in embodiments, may include one or more of the following: a first return rate for a first period of time, a second return rate for a second period of time, and/or a combination thereof. The return payment schedule, in embodiments, may indicate when (e.g., a calendar date, day, month, year, and/or time, to name a few) all or a portion of a return amount (e.g., a payment, the first return amount) is scheduled to be made to the respective one or more users. The payment schedule may indicate when and how much of the return amount is to be dispersed to the respective one or more users. In embodiments, the return payment schedule may indicate that disbursements (all or a portion of the return amount) are to be made periodically or aperiodically. In embodiments, one or more interest bearing accounts, in embodiments, may be associated with one or more intermediary systems. The one or more intermediary systems, in embodiments, may include one or more brokers, one or more lenders, one or more agents of one or more brokers, one or more agents of one or more lenders, and/or a combination thereof, to name a few.

The Fourth Electronic Reserve Ledger Database 5508 may include the fourth electronic reserve ledger associated with the digital asset exchange and one or more first digital assets. In embodiments, the Fourth Electronic Reserve Ledger Database 5508 may be associated with the digital asset exchange and one or more first digital assets. In embodiments, the fourth electronic ledger which may be included in the Fourth Electronic Reserve Ledger Database 5508 may include, for each user of the plurality of users, reserve account information associated with a respective reserve account associated with each respective customer. The one or more reserve accounts, in embodiments, may each be an account with the digital asset exchange. In embodiments, one or more reserve accounts may be an omnibus account including deposits of the first digital asset associated with multiple users or customers. The reserve account information may include, in embodiments, an account balance (e.g., a fourth account balance) associated with an amount (e.g., a fourth amount) of the one or more first digital assets (e.g., the first digital asset) held in a respective reserve account (e.g., a respective customer reserve account) for each customer. In embodiments, the account balance may be associated with an amount of fiat, an amount of a first digital asset, an amount of a second digital asset and/or a combination of the above. In embodiments, the one or more reserve accounts adhere to one or more reserve rules accessible by the digital asset exchange. The one or more reserve rules, in embodiments, may be designed to maintain a ratio between the third amount of the first digital asset and the fourth amount of the first digital asset. The one or more reserve rules, in embodiments, may be designed to maintain a ratio between the third amount of the first digital asset and an amount of fiat.

In embodiments, the one or more databases may include a fifth electronic ledger stored in a fifth electronic exchange ledger database. The fifth electronic ledger, in embodiments, may be associated with a second digital asset. In embodiments, the fifth electronic ledger may include, for each user of the plurality of users: second exchange account information associated with each respective customer exchange account. In embodiments, the second exchange account information, for each user of the plurality of users, may include a fifth digital asset account balance with associated with a first amount of the second digital asset held in the respective customer exchange account. In embodiments, the first amount of the second digital asset may represent an amount of the second digital asset that is available for transfer via the digital asset exchange into the respective customer interest-bearing account. The fifth electronic ledger database may include the fifth electronic ledger and may be similar to the First Electronic Ledger Database 5502 described herein connection with FIG. 11A, the description of which applying herein. For example, in embodiments where the second digital asset is transferred from and/or into the respective customer exchange account associated with the second digital asset, the digital asset exchange computer system may update the fifth electronic ledger to reflect transfer of the amount of second digital asset transferred in and/or out of the respective customer exchange account.

In embodiments, the one or more databases may include a sixth electronic fiat ledger stored in a sixth electronic exchange ledger database. The sixth electronic fiat ledger, in embodiments, may be associated with a first fiat. In embodiments, the sixth electronic ledger may include, for each user of the plurality of users: first fiat account information associated with each respective customer exchange fiat account. In embodiments, the first fiat account information, for each user of the plurality of users, may include a sixth account balance with associated with a first amount of the first fiat in the respective customer exchange fiat account. In embodiments, the first amount of fiat may represent an amount of the fiat that is available for transfer via the digital asset exchange into the respective customer interest-bearing account. The sixth electronic ledger database may be similar to the First Electronic Ledger Database 5502 described herein connection with FIG. 11A, the description of which applying herein. For example, in embodiments where fiat is transferred from and/or into the respective customer exchange fiat account associated with fiat, the digital asset exchange computer system may update the sixth electronic ledger to reflect transfer of the amount of first fiat transferred in and/or out of the respective customer exchange account. The first fiat, for example, may be one or more of the following: USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few.

In embodiments, the one or more databases may include a seventh electronic ledger stored in a seventh electronic ledger database. In embodiments, the seventh electronic ledger may be a second intermediary electronic ledger associated with a second intermediary and may provide second return. The second intermediary electronic ledger, in embodiments, may include, for each user of the plurality of users, a fifth digital asset account balance indicating a sixth amount of the first digital asset associated with a second respective customer intermediary account. The second respective customer interest-bearing account, in embodiments, may be associated with the first respective customer interest-bearing account. In embodiments, the one or more databases may include one or more additional intermediary electronic ledgers which may be associated with additional intermediaries.

In embodiments, the First Electronic Exchange Ledger Database 5502, the Second Electronic Interest Ledger Database 5504, the Third Electronic Ledger Database 5506, the Fourth Electronic Reserve Ledger Database 5508, the fifth electronic exchange ledger database, the sixth electronic exchange ledger database, and/or the seventh electronic exchange ledger database may each be stored on one or more computer-readable media operatively connected to a digital asset exchange computer system associated with the digital asset exchange. For example the First Electronic Exchange Ledger Database 5502, the Second Electronic Interest Ledger Database 5504, and/or Reserve Ledger Database 5508 may be stored on memory. Continuing the example, the digital asset exchange 3116 would access the First Electronic Exchange Ledger Database 5502 via the digital asset exchange computer system 5302. In embodiments, the First Electronic Exchange Ledger Database 5502, the Second Electronic Interest Ledger Database 5504, the Third Electronic Ledger Database 5506, and/or the Fourth Electronic Reserve Ledger Database 5508 may be maintained and/or stored on a plurality of geographically distributed computer systems in the peer-to-peer network. The First Electronic Exchange Ledger Database 5502, the Second Electronic Interest Ledger Database 5504, the Third Electronic Ledger Database 5506, and/or the Fourth Electronic Reserve Ledger Database 5508, in embodiments, may be maintained and/or stored on a blockchain (e.g., the blockchain 1807) and/or off a blockchain as a sidechain which may later be published, periodically or aperiodically, to the blockchain.

Referring back to FIG. 10A, in embodiments, the process may continue with step S5504. At step S5504, in embodiments, the digital asset exchange system may receive first customer access credentials from a first customer device (e.g., first user device 105*a*) associated with a first user (first customer) of the plurality of users (customers of the digital asset exchange). First customer (e.g., first user) access credentials may include one or more of a username, password, biometric data access card scan (e.g., swipe of a card associated with the exchange and having a magnetic strip), and/or a pin (e.g., a number provided via SMS, other text message service, or email for multi-factor authentication), to name a few. For example, the first customer access credentials may include a user name and password associated with the first user. In embodiments, multi-factor authentication may be used for the first user to access the first user's accounts with the digital asset exchange. In embodiments, the multi-factor authentication may include the use of an authorization code that is sent to a predetermined user device, e-mail address, or mobile phone number, to name a few, associated with the first user, for example, as used in AUTHY® (AUTHY® is a registered trademark of Twilio, Inc.). In embodiments, other multi-factor verifications may be used, such as identification of a user device associated with the first user based on phone number or mobile network, location information and shared secret verification, to name a few.

Once the first customer access credentials are received by the digital asset exchange system, the digital asset exchange system may authenticate the received access credentials (at step S5506), and, if verified, grant the first user access. In embodiments, the digital asset exchange may authenticate the first customer access credentials by associating the first user access credentials with at least one of a respective customer digital asset exchange account, a respective customer interest-bearing account, a respective customer reserve account, and/or a combination thereof. In embodiments, if the first user access credentials are not or cannot be authenticated, the digital asset exchange system may prevent access and notify the first user of the denied access (e.g., via a notification). In embodiments, the first customer access credentials may be similar to user identification data 5110 and/or user authentication data 5112 described above in connection with FIG. 5A, the description of which applying herein.

Figure 10B:
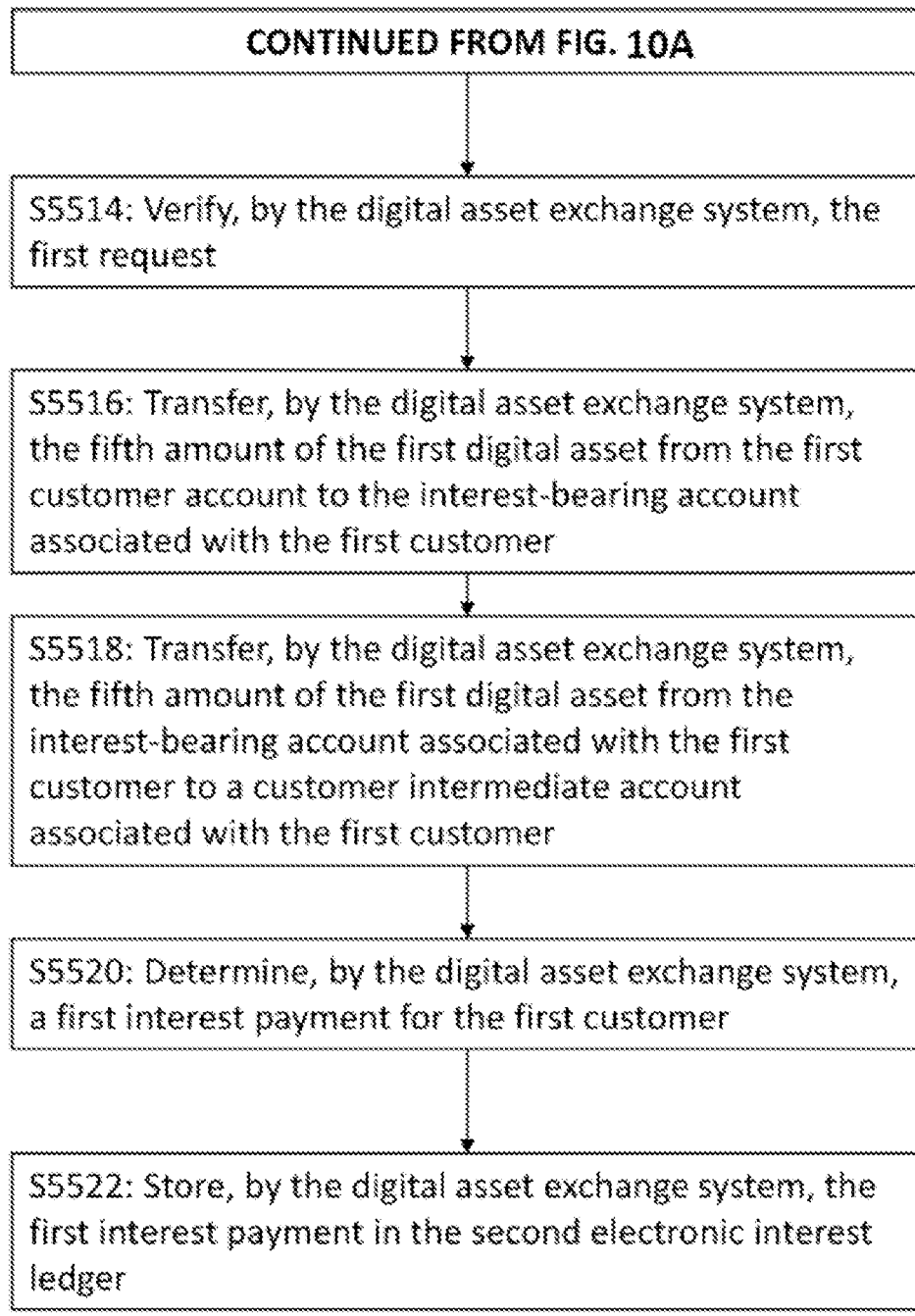
Figure 10C:
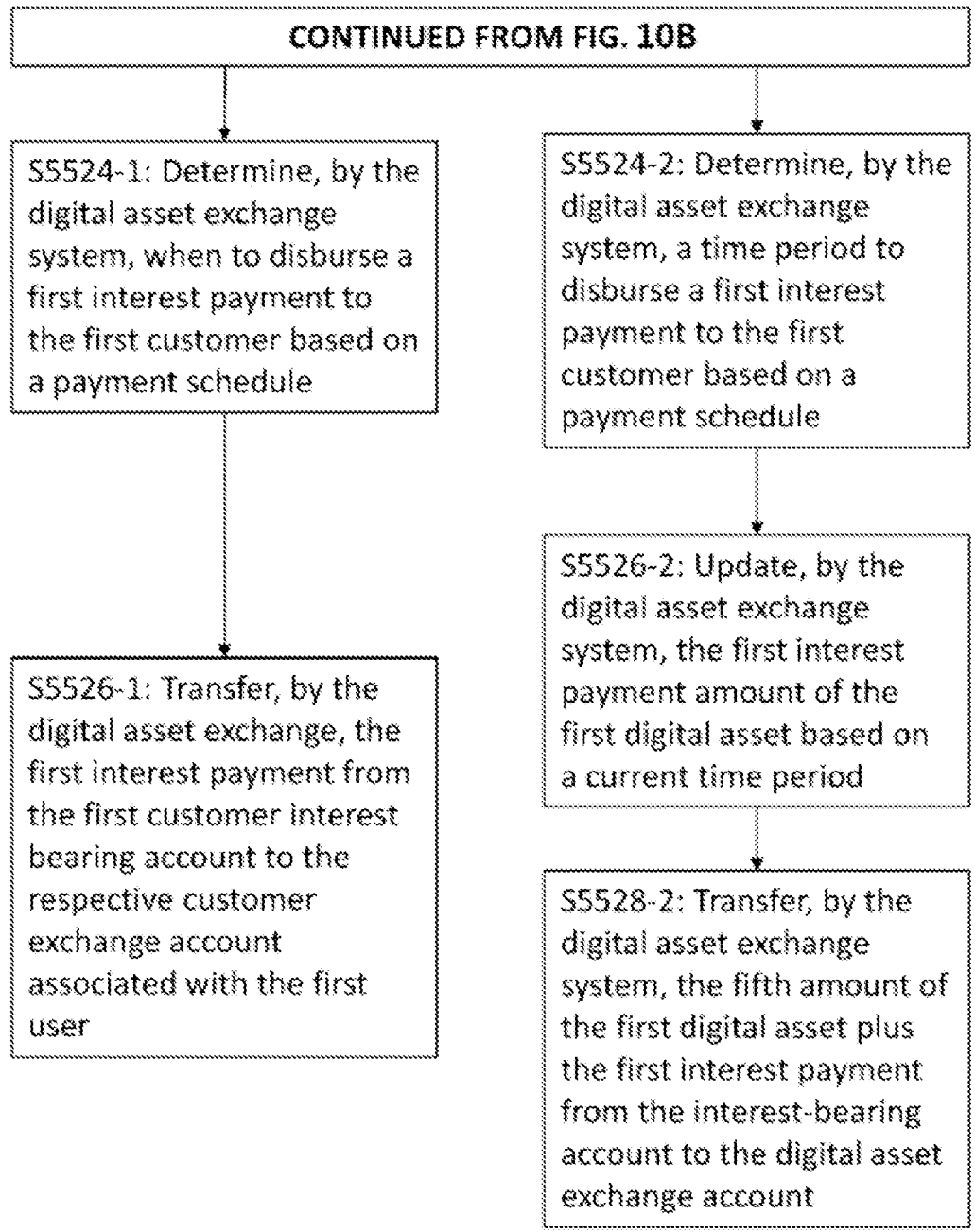

The process of FIG. 10A through FIG. 10C, in embodiments, may continue with step S5508. At step S5508, in embodiments, the digital asset exchange computer system may generate a first response. The first response, in embodiments, may include computer-readable instructions, that, when executed by the first user device, cause the first user device to display a first graphical user interface on a display associated with the first user device. The first graphical user interface, in embodiments, may include information associated with the first user and/or the accounts associated with the first user and the digital asset exchange. For example, referring to FIG. 11B the first graphical user interface (of the first request) displayed may include: customer identification information associated with the first user (e.g., one or more of an identification including letters, numbers and/or symbols; a public address associated with the respective user; a username; the respective user's name; the respective user's address; intermediary selection information (described below in more detail in connection with FIG. 10C, the description of which applying herein) and/or all or part of the respective user's social security number, by way of example, to name a few), a first digital asset account balance associated with the first user; a second digital asset account balance associated with the first user; a transfer option to transfer one or more digital assets into an interest-bearing account associated with the first user (e.g., the account associated with the second digital asset account balance); interest information associated with the account associated with the second digital asset account balance; and/or a combination thereof.

An exemplary request is illustrated in connection with FIG. 11C. Referring to FIG. 11C in embodiments, an Exemplary First Request 5510 includes the following: a customer identification (Customer Identification No. 1234), a first digital asset account balance (10 Digital assets), a first digital asset interest (Interest 1), a second digital asset account balance (100 Digital assets); a second digital asset interest (Interest 2), and a transfer option. As shown in FIG. 11A-3, Exemplary First Request 5510's transfer option may enable the respective user to choose an account to transfer from (e.g., Account 1 or Account 2) and an account to transfer to (e.g., Account 1 or Account 2).

Referring back to FIG. 10A, the process may continue with step S5510. At step S5510, in embodiments, the first request is sent by the digital asset exchange system to the first customer device (e.g., via network 125). The first customer device, in embodiments, may receive the first request. Upon receiving the first request, the first customer device, in embodiments, may execute the computer-readable instructions and display the first graphical user interface.

In embodiments, the process may continue with the first customer device generating and sending a request to transfer an amount (e.g., a fifth amount) of the one or more first digital assets (e.g., the first digital asset) from an exchange account associated with the first customer (e.g., the respective customer exchange account) to an interest bearing account (e.g., the respective customer interest bearing account). The request, in embodiments, may be generated via the transfer option of the first request. In embodiments, the request may be sent by the first customer device to the digital asset exchange system via network 125.

At step S5512, in embodiments, the digital asset exchange system may receive, from the first customer device, the first request. The first request, in embodiments, may be to transfer a fifth amount of the first digital asset from a first customer account associated with the first customer to an interest-bearing account associated with the first customer.

The first request, for example, may include one or more of the following: identification information associated with the first digital asset (e.g., information indicating the type of digital asset), the fifth amount of the first digital asset, first source information associated with the first customer exchange account, first destination information associated with the customer interest-bearing account, first customer access credentials, a first public address (e.g., a first digital address) on the blockchain associated with the first customer, a second public address (e.g., a second digital address) on the blockchain associated with the first customer and/or the digital asset exchange, and/or a combination thereof, to name a few. In embodiments, the first source information may include a first digital address (e.g., the first public address) associated with the underlying blockchain of the first digital asset and/or the respective customer exchange account associated with the first customer. The first digital address, in embodiments, may be associated with one or more of the following: an omnibus account associated with the plurality of users, and/or a segregated account associated with the first customer, to name a few. The first destination information, in embodiments, may include a second digital address (e.g., the second public address) associated with the underlying blockchain and/or the respective customer interest bearing account associated with the first customer. The second digital address, in embodiments, may be associated with one or more of the following: an omnibus account associated with the plurality of users, and/or a segregated account associated with the first customer, to name a few.

In embodiments, the process of FIG. 10A through FIG. 10C may continue with FIG. 10B. Referring to FIG. 10B, in embodiments, the process may continue with step S5514. At step S5514, in embodiments, the digital asset exchange system may verify the first request. The request, in embodiments, may be verified by determining whether the first customer has sufficient funds to cover the first request. For example, the digital asset exchange system may confirm that the fifth amount of the first digital asset is less than or equal to the first digital asset account balance associated with the first customer. In embodiments, the digital asset exchange may verify access credentials associated with the first user to verify the first request. If, for example, the first request cannot be verified, the digital asset exchange system may deny the first request and/or notify the first customer of the reason(s) why the first request was denied.

In embodiments, the process illustrated in connection with FIG. 10A through FIG. 10C may continue with step S5516. At step S5516, in embodiments, the digital asset exchange computer system may execute the verified first request by transferring the amount of the one or more first digital assets. For example, the digital asset exchange computer system may transfer the fifth amount of the first digital asset from the first customer account to the interest-bearing account associated with the first customer. In embodiments, the transfer of the fifth amount of the first digital asset may be executed via a ledger (e.g., the first electronic exchange ledger stored in the First Electronic Exchange Ledger Database 5502).

For example, transferring the fifth amount of the first digital asset may begin with the digital asset exchange system updating the first electronic exchange ledger which may be included in the First Electronic Exchange Ledger Database 5502 to reflect the transfer of the fifth amount of the first digital asset out of the respective customer exchange account (and/or the fifth amount plus the reserve amount) and/or updating the second electronic interest ledger to update the the respective customer interest-bearing account. Continuing the example, the digital asset exchange system may update the second electronic interest ledger which may be included in the Second Electronic Interest Ledger Database 5504 to reflect the transfer of the fifth amount of the first digital asset into the respective customer interest bearing account; and/or the respective interest information associated with the fifth amount of the first digital asset (and/or the fifth amount less the reserve amount). In embodiments, the example may continue with the digital asset exchange system calculating a reserve amount associated with the fifth amount of the first digital asset. The reserve amount, in embodiments, may be calculated based on at least one reserve requirement (e.g., the one or more reserve rules described above) and the fifth amount of the first digital asset. Continuing the example, the calculated reserve amount may be transferred by updating the fourth electronic reserve ledger which may be included in the Fourth Electronic Reserve Ledger Database 5508 to reflect transfer of the reserve amount to the respective customer reserve account. In embodiments, the digital asset exchange system may update the second electronic interest ledger which may be included in the Second Electronic Interest Ledger Database 5504 to reflect the transfer of the fifth amount of the first digital asset less the reserve amount into the respective customer interest bearing account. In embodiments, the fourth electronic reserve ledger may not be used at all and there may be no respective customer reserve account for each customer of the digital asset exchange.

In embodiments, the digital asset exchange may transfer the fifth amount of digital assets by generating a first transfer message. The first transfer message, in embodiments, may include instructions to transfer: the fifth amount of the first digital asset from the first digital address to the second digital address; the fifth amount of the first digital asset less the reserve amount from the first digital address to the second digital address; the reserve amount of first digital asset from the first digital address to a third digital address associated with the respective customer reserve account; and/or a combination thereof. Continuing the example, the first transfer message, in embodiments, may be published by the digital asset exchange system to a plurality of geographically distributed computer systems in a peer-to-peer network. In embodiments, the published instructions may be verified and/or executed by the plurality of geographically distributed computer systems in the peer-to-peer network. The executed transactions associated with the first transfer message, in embodiments, may be published by the plurality of geographically distributed computer systems in the peer-to-peer network.

In embodiments, the process illustrated in connection with FIG. 10A through FIG. 10C may continue with step S5518. At step S5518, in embodiments, the digital asset exchange system may transfer the fifth amount of the first digital asset from the interest-bearing account associated with the first customer to a customer intermediate account associated with the first customer and an intermediary between the digital asset exchange and one or more third party institutions. The digital asset exchange system, for example, may transfer the fifth amount of the first digital asset by first updating the second electronic interest ledger which may be included in the Second Electronic Interest Ledger Database 5504 to reflect the transfer of the fifth amount of the first digital asset out of the respective customer interest bearing account. Continuing the example, the digital asset exchange system may update the second electronic ledger which may be included in the Third Electronic Ledger Database 5506 to reflect the transfer of the fifth amount of the first digital asset into the respective customer intermediate account. As another example, in embodiments, the digital asset exchange system may transfer the fifth amount of the first digital asset by updating the second electronic interest ledger which may be included in the Second Electronic Interest Ledger Database 5504 to reflect the transfer of the fifth amount of the first digital asset less a reserve amount out of the respective customer interest bearing account. Continuing the example, the digital asset exchange system may update the third electronic ledger which may be included in the Third Electronic Ledger Database 5506 to reflect the transfer of the fifth amount of the first digital asset less the reserve amount into the respective customer intermediary account. The digital asset exchange system, continuing the example, may update the Fourth Electronic Reserve Ledger Database 5508 to reflect the transfer of the reserve amount into the respective customer reserve account.

In embodiments, the digital asset exchange may transfer at least a portion of the fifth amount of digital assets by generating a second transfer message. The second transfer message, in embodiments, may include instructions to transfer: at least a portion of the fifth amount of the first digital asset from the second digital address associated with the respective customer interest bearing account to a fourth digital address associated with the respective customer intermediary account; the fifth amount of the first digital asset less the reserve amount from the second digital address to the fourth digital address; the reserve amount of first digital asset from the first digital address to the third digital address. Continuing the example, the second transfer message, in embodiments, may be published by the digital asset exchange system to a plurality of geographically distributed computer systems in a peer-to-peer network. In embodiments, the published instructions may be verified and/or executed by the plurality of geographically distributed computer systems in the peer-to-peer network. The executed transactions associated with the second transfer message, in embodiments, may be published by the plurality of geographically distributed computer systems in the peer-to-peer network.

In embodiments the second digital address is associated with a smart contract. For example, the second digital address (e.g., decentralized lending smart contract address 5512A) may be associated with the decentralized lending smart contract 5512. The second digital address (and the exemplary smart contracted associated therewith), in embodiments, may be similar to the decentralized lending smart contract address 5512A (and the decentralized lending smart contract 5512), described above in connection with FIG. 11D, the entire description of the decentralized lending smart contract 5512 applying herein.

In embodiments, the digital asset exchange or intermediary may be associated with a smart contract including smart contract instructions on the blockchain enabled to provide decentralized lending to one or more users. The digital asset exchange system, in such embodiments, may generate a second message including instructions to transfer at least a portion of the fifth amount of the first digital asset to a fourth digital address associated with the smart contract and a respective customer intermediate account. The second message, in embodiments, may be published to the distributed public transaction ledger in the form of the blockchain. The published message, in embodiments, may be verified and/or executed by the plurality of geographically distributed computer systems in the peer-to-peer network. In embodiments, the fourth digital address (e.g., decentralized lending smart contract address 5512A) may include first smart contract instructions(e.g., decentralized lending smart contract instructions 5512B). A more detailed example of the first smart contract instructions is described in connection with FIG. 11D For example, referring to FIG. 11D, a decentralized lending smart contract 5512 may have public address 5512A on a blockchain and smart contract instructions 5512B saved as part of a blockchain. In embodiments, the decentralized lending smart contract address 5512A may be associated with one or more proxy smart contracts which may then issue calls to one or more other smart contracts having their own smart contract addresses on a blockchain.

As illustrated in FIG. 11AD, a decentralized lending smart contract 5512 may be provided on the an underlying blockchain associated with decentralized lending smart contract public address 5512A. The decentralized lending smart contract 5512 may also include a plurality of instruction modules, saved as part of the blockchain that collectively make up the smart contract associated with decentralized lending. By way of illustration, in embodiments, such modules may include modules of instructions such as: (1) Create tokens module 5514; (2) Transfer tokens module 5516; (3) Destroy tokens module 5518; (4) Redeem tokens module 5520; (5) Deposit module 5522; (6) Calculate interest module 5524; (7 Return module 5526; (8) Third party module 5528; (9) Withdrawal module 5530 and/or a combination thereof, to name a few.

In embodiments, the Create tokens module 5514 may include one or more instructions related to creating lending tokens associated with decentralized lending. For example, in exchange for a first amount of a first digital asset, the decentralized lending smart contract 5512 may create one or more lending tokens that represent the first amount of the first digital asset lent to the decentralized lending smart contract 5512 for third party lending or trading. Such instructions may specify one or more authorized key pairs or contract addresses that may be authorized to create lending tokens under specified conditions. In embodiments, the Create tokens module 5514 may include instructions on increasing the lending token supply. In embodiments, the Create tokens module 5514 may include instructions on how to create new lending tokens within pre-approved lending token supply limits, how to create new lending tokens within a pre-approved amount of the lending token supply limits and a predetermined amount of the first digital asset held, and/or how to assign newly created or "minted" lending tokens to specific designated public addresses or contract addresses on the underlying blockchain associated with the respective customer and/or the digital asset exchange.

In embodiments, the Transfer tokens module 5516, may include instructions related to transferring the lending tokens. In embodiments, such transfer instructions may include rules by which certain transfer are allowed or blocked and may specify one or more key pair or contract addresses that may be authorized to perform one or more types of transfer operations. In embodiments, the Transfer tokens module 5516 may include authorization instructions related to transferring lending tokens and/or digital assets associated with the lending tokens (e.g., the first digital asset) to specific designated public addresses or contract addresses on the underlying blockchain.

In embodiments, the Destroy tokens module 5518 may include instructions related to destroying (e.g., burning) lending tokens. In embodiments, the Destroy tokens module 5518 may include instructions relates to when, and with what authority, lending tokens associated with one or more specified addresses shall be destroyed or "burned", and thus removed from the lending token supply. In embodiments, lending tokens may be burned or destroyed when they are redeemed by the respective customer and/or the digital asset exchange in exchange for the fifth amount of the digital asset. In embodiments, lending tokens may be destroyed upon return of the fifth amount of the digital asset and a return amount provided by the intermediary in exchange for lending of the fifth amount of digital asset.

In embodiments, the Redeem tokens module 5520, in embodiments, may include instructions related to redeeming one or more lending tokens (e.g., the second digital asset) for an amount of digital asset (e.g., the first digital asset). In embodiments, the Redeem tokens module 5520 may include instructions to determine a first amount of digital asset to transfer in exchange for redeeming one or more lending tokens. For example, a lending tokens may be redeemed for the fifth amount of the first digital asset. In embodiments, the amount of digital asset to return in exchange for the redemption of one or more lending tokens may be made based on one or more of the following: interest/return information associated with the lending tokens; an amount of digital asset transferred to the decentralized lending smart contract 5512; an amount of time elapsed since the transfer of the amount of digital asset to the decentralized lending smart contract 5512; the types of digital asset transferred to the decentralized lending smart contract 5512; one or more third party institutions associated with the lending of the amount of the digital asset; one or more reserve rules (e.g., rules stored by the digital asset exchange and/or rules stored on a blockchain as part of the decentralized lending smart contract instructions 5512B); and/or a combination thereof, to name a few. In embodiments, the Redeem tokens module 5520 may include instructions on when, and with whose authority, lending tokens associated with one or more specified addresses shall be redeemed and, in embodiments, whether the redeemed lending tokens will be destroyed or "burned" as discussed above, and thus removed from the lending token supply. In embodiments, the Redeem tokens module 5520 may include authorization instructions related to accessing data supplied by a first authorized third party database (i.e. administrator system 6801), as discussed in further detail elsewhere.

The Deposit module 5522 may further include instructions to track and monitor one or more transfers of digital assets to the decentralized lending smart contract 5512. The Deposit module 5522, in embodiments, for example, may track one or more of the following: the public address(es) associated with each transfer of digital assets to the decentralized lending smart contract 5512, the date of each transfer, the time of each transfer, the amount of each transfer, and/or a combination thereof, to name a few. In embodiments, the Deposit module 5522 may include deposit instructions associated with the receipt of digital assets by the decentralized lending smart contract 5512. In embodiments, the Deposit module may include instructions or a call to issue one or more lending tokens based on the deposit of the digital assets.

The Calculate interest module 5524, in embodiments, may include instructions to calculate interest or a return accrued by the digital assets lent via the decentralized lending smart contract 5512. In embodiments, the Calculate interest module 5524 may include instructions to calculate the interest of each deposit of digital assets based on one or more of the following: interest information or return information associated with the lending tokens; an amount of digital asset transferred to the decentralized lending smart contract 5512; an amount of time elapsed since the transfer of the amount of digital asset to the decentralized lending smart contract 5512; the types of digital asset transferred to the decentralized lending smart contract 5512; one or more third party institutions associated with the lending of the amount of the digital asset; one or more reserve rules (e.g., rules stored by the digital asset exchange and/or rules stored on a blockchain as part of the decentralized lending smart contract instructions 5512B); and/or a combination thereof, to name a few.

In embodiments, the Return module 5526 may include instructions to calculate and/or authorize payments in exchange for the amount of digital asset transferred and held at the decentralized lending smart contract 5512. For example, the Return module 5526 may include authority to access information indicating the type of payment (e.g., one time return and redemption, an interest payment without redemption, payments in accordance with a payment schedule, to name a few). In embodiments, the Return module 5526 may communicate with Calculate interest module 5524, Deposit module 5522, and/or Redeem tokens module 5520 to determine the return payment and/or redemption payment. For example, the Return module 5526 may confirm the balance of the digital asset and the calculated interest from the Deposit module 5522 and the Calculate interest module 5524 respectively. In embodiments, the Return module 5526 may include return instructions associated with determining a return amount of digital assets to be provided to the first user in exchange for lending the amount of digital assets to the decentralized lending smart contract 5512. In embodiments, the Return module 5526 may include return payment instructions associated with transferring a payment amount of the first digital asset to the respective customer interest bearing account.

In embodiments, the Third party module 5528 may include authorization instructions related to loaning and trading at least a portion of the amount of digital assets held at the fourth contract address by third parties. For example, the third parties may, in embodiments, include third-party institutions associated with an intermediate account associated with the decentralized lending smart contract 5512. In embodiments, the Third party module 5528 may include third party instructions associated with at least one of: loaning of the at least a portion of the fifth amount of digital assets by third party institutions associated with the intermediary account and/or trading of the at least a portion of the fifth amount of digital assets by third party institutions associated with the intermediary account;

In embodiments, the Withdrawal module 5530 may include authorization instructions related to withdrawing an amount of digital asset lent to the decentralized lending smart contract 5512. For example, the Withdrawal module 5530 may track ownership and custody of digital assets lent to the decentralized lending smart contract 5512. In embodiments, the Withdrawal module 5530 may include instructions on when, and with whose authority, digital assets associated with one or more specified addresses shall be withdrawn. In embodiments, the Withdrawal module 5530 may include withdrawal instructions associated with returning the portion of the fifth amount of the first digital asset to the respective customer. The withdrawal instructions, in embodiments, may include first return payment instructions associated with returning a return payment amount of the first digital asset to the respective customer interest bearing account. In embodiments, the amount of digital assets paid under the withdraw module may be determined in conjunction with the Return module and the Calculate interest module.

In embodiments, decentralized lending smart contract instructions 5512B may include authorization instructions. The authorization instructions, in embodiments, may include authorization instructions related to functions associated with decentralized lending. In embodiments, decentralized lending smart contract instructions 5512B may also include instructions to authorize requests received, the requests, in embodiments, being transaction requests from administrators, user public addresses, and/or other smart contracts, to name a few. The decentralized lending smart contract 5512, in embodiments, may include tokens which may reflect other types of tokens, such as tokens associated with a security, a bond, a financial instrument, a contract, stock, gas tokens, and/or some other kind of token which the parties to the transaction reflect as an appropriate collateral.

In embodiments, the process illustrated in connection with FIG. 10A through FIG. 10C may continue with step S5520. At step S5520, in embodiments, the digital asset exchange system may determine a first interest payment for one or more of the plurality of users/customers—e.g., the first user of the plurality of users. In embodiments, the digital asset exchange may determine the first interest payment based on one or more of the following: respective interest information; an amount of digital asset held in an interest bearing account; an amount of time the amount of digital asset is held in the interest bearing account; the types of digital asset held in the interest bearing account; the one or more third party institutions; an interest amount associated with the interest-bearing account balance of the first digital asset; an interest rate and a period of time that the fifth amount of the first digital asset is held in the respective customer interest bearing account; one or more reserve rules; and/or a combination thereof, to name a few. For example, the first interest payment may be an agreed upon percentage of the balance of digital assets in an interest-bearing account over a period of time (e.g., 2% of 10 BTC over 6 months). In embodiments, the first interest payment may be an agreed upon amount to be paid after an agreed period of time or multiple periods of time.

In embodiments, more than one interest rate may be utilized by the digital asset exchange system. For example, the first interest rate may be used when period of time that the fifth amount of the first digital asset respective second digital asset account balance has been held in the respective customer interest bearing account falls within the first period of time. Continuing the example, a second interest rate is used when the period of time that the respective second digital asset account balance has been held in the respective customer interest bearing account falls within the second period of time.

In embodiments, the digital asset exchange system may determine the interest payment by calculating a net interest payment. The net interest payment, in embodiments, may be calculated by subtracting a reserve amount based on the fourth digital asset balance from a gross interest payment. The net interest payment, in embodiments, may represent the interest payment. In embodiments, the net interest payment minus fees may be the interest payment.

In embodiments, the interest payment may be a first payment of two or more payments associated with the initial transfer of the second amount of the first digital asset to an interest-bearing account. For example, an interest payment may be made to the first user at the end of each month for a year. As another example, an interest payment may be made annually each year the first user has an account balance over 0 in the respective customer interest-bearing account. In embodiments, an interest payment may be made aperiodically. For example, the interest payment may be determined after an account balance of an interest-bearing account reaches a predetermined amount. As another example, the interest payment may be determined and monitored by the digital asset exchange system. Continuing the example, when the interest payment reaches a predetermined amount, the digital asset exchange system may distribute the interest payment to the first user.

The one or more users, in embodiments, may have an account balance from a different transfer (e.g., not included with the fifth amount of the first digital asset) of the first digital asset (e.g., a sixth amount of the first digital asset) and/or may have an account balance including a second digital asset (e.g., a sixth amount of the second digital asset). In embodiments, the digital asset exchange computer system may determine a second interest payment for the first user based in the account balance of the different transfer. The determination of a second interest payment, in embodiments, may be made based on one or more of the following: interest information associated with the sixth amount of the first digital asset held in the respective customer interest bearing account; interest information associated with the sixth amount of the second digital asset; respective interest information; an amount of digital asset held in an interest bearing account; an amount of time the amount of digital asset is held in the interest bearing account; the types of digital asset held in the interest bearing account; the one or more third party institutions; an interest rate and a period of time that the sixth amount of the first digital asset is held in the respective customer interest bearing account; one or more reserve rules; and/or a combination thereof, to name a few. In embodiments, the second interest payment may be further based on a second interest amount. The second interest amount, in embodiments, may be the same as the first interest amount (e.g., as part of a payment schedule) and/or different than the first interest amount. In embodiments, the second interest payment may be further based on a second interest rate and a second period of time that the sixth amount of the first digital asset (or the second digital asset) is held in the respective customer interest bearing account. In embodiments, the second interest payment and the first interest payment may be combined by the digital asset exchange to form one total interest payment.

In embodiments, prior to step S5520, the digital asset exchange system determine the interest-bearing account received a first return from the intermediary account. In such embodiments, for example, the digital asset exchange system may determine the one or more interest payments based on one or more of the following: the first return, respective interest information associated with the fifth (and/or sixth) amount of the first (and/or second) digital asset, the types of digital asset held in the interest bearing account; the one or more third party institutions; an interest rate and a period of time that the fifth amount of the first digital asset is held in the respective customer interest bearing account; one or more reserve rules; and/or a combination thereof, to name a few. In embodiments, the first (and/or second) interest payment is at least a portion of the first return. In embodiments, one or more interest payments may be determined at one or more predetermined times by the digital asset exchange system. One or more interest payments, in embodiments, may be determined aperiodically by the digital asset exchange system.

In embodiments, the one or more returns (e.g., the first return, the second return) may be in the following denomination: fiat, the first digital asset, a second digital asset, and/or a combination thereof, to name a few. The type of fiat, in embodiments, may include one or more of the following: USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few. The first digital asset and/or second digital asset may be a digital math-based asset, such as Bitcoins, Namecoins, Litecoins, PPCoins, Tonal bitcoins, bitcoin cash, zcash, IxCoins, Devcoins, Freicoins, IOcoins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; 0x; Aion; Algorand; AMP; Arca; Arweave; Audius; Avalanche; BCB; BCC; Bitcoin SV; Blockstacks; cBAT; cDAI; Cela; Celo; cETH; Chia; Coda; Cosmos; cWBTC; cZRK; Decred; Dfinity; EOS; Eth 2.0; Filecoin; Hedgetrade; ION; Kadena; Kyber Network; Mobilecion; Near; Nervos; Oasis; OmiseGO; PaxG; Polkadot; SKALE; Solana; Stellar; Tezos; Theta; XRP; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), digital finance tokens associated with decentralized lending (such as AMP, Compound, Protocol, Kyber, Uma, Uniswap, Yearn, Aave, to name a few), tokens, and/or non-fungible token (such as Cryptokitties), to name a few. In embodiments, the first digital asset and/or second digital asset may be a digital asset that is supported by its own digital asset network (like ether supported by the Ethereum Network). The first digital asset and/or second digital asset, in embodiments, may be a stable value or fiat-backed token (such as Gemini Dollar), security tokens, and/or non-fungible token (such as Cryptokitties), to name a few. The first digital asset and/or second digital asset, in embodiments, may be a fiat-backed digital asset, for example, a Libra, Diem, or Gemini Dollar.

In embodiments, the process illustrated in connection with FIG. 10A through FIG. 10C may continue with S5522. At step S5522, in embodiments, the digital asset exchange system may store, the first interest payment in the second electronic interest ledger (e.g., in the Second Electronic Interest Ledger Database 5504). In embodiments where more than one interest payment is determined by the digital asset exchange system, each of the two or more interest payments may be stored by the digital asset exchange system in the second electronic interest ledger (e.g., in the Second Electronic Interest Ledger Database 5504). The digital asset exchange system, in embodiments, may store the one or more interest payments such that the one or more interest payments are associated with the first user. The one or more interest payments, in embodiments may be stored in one or more of the following the Second Electronic Interest Ledger Database 5504, a memory, the memory operatively connected to the digital asset exchange system, and/or a combination thereof, to name a few. In embodiments, the first interest amount of the first digital asset may be reinvested in the respective customer intermediate account such that the first user may collect an additional return based on the increased deposit.

In embodiments, step S5502 through S5522 may be rearranged or omitted.

In embodiments, the process described in connection with FIG. 10A through FIG. 10C may continue with one or more payments being sent by the digital asset exchange system to the one or more users associated with the first interest payment. The one or more payments, in embodiments, may include one or more of the following: an interest payment (e.g., all or a portion of the first interest payment) in the first digital asset; an interest payment (e.g., all or a portion of the first interest payment) in the second digital asset; a redemption payment of the amount of digital asset transferred to the interest-bearing account (e.g., the second amount of the first digital asset), and/or a combination thereof, to name a few. For example, referring to FIG. 10C, the process may optionally continue with step S5524-1. In embodiments, at step S5524-1, the digital asset exchange system may determine when to disburse a first interest payment (e.g., a first time) to the first customer. For example, the return information associated with the first interest payment may include a payment schedule. The payment schedule, continuing the example, may include information which indicates (e.g., a date and/or time) when to distribute the first interest payment to the first customer. In embodiments, the determination of the first time may be based on one or more of the following: a payment schedule, the first interest payment (e.g., the amount of the first interest payment), an amount of time elapsing, user settings, the third party institution(s), the intermediary(ies), the type of digital asset, the amount of digital asset, the amount of interest bearing accounts associated with the one or more users, and/or a combination thereof, to name a few. In embodiments, the first time may include one or more of the following: one or more calendar dates, one or more times, one or more ranges of calendar date, one or more ranges of time, and/or a combination thereof, to name a few. In embodiments, the return information may indicate that interest payments are to be made periodically or aperiodically. In embodiments, the payment schedule may indicate that interest payments are to be made periodically or aperiodically. In embodiments, the return information may indicate that interest, payments are to be made based on receipt by the respective customer interest bearing account and/or a return from the respective customer intermediary account. In embodiments, the payment schedule indicates that interest payments are made based on receipt by the respective customer interest bearing account and/or a return from the respective customer intermediary account.

In embodiments, the return information may indicate that the interest payment(s) are to be made upon a request that is received by the one or more users (and/or someone acting on the one or more user's behalf). For example, to receive the first interest payment, the first customer device may generate and send a second request to the digital asset exchange system. The second request, in embodiments, may include a request for an interest payment associated with the respective customer interest-bearing account. The digital asset exchange system may receive the request (e.g., which may be similar to the description of step S5512, the description of which applying herein) and verify the request (e.g., which may be similar to step S5514, the description of which applying herein). The second request, in embodiments, may be similar to the first request discussed herein in connection with FIG. 10A through FIG. 10B and the Exemplary First Request 5510, the descriptions of each applying herein.

In embodiments step S5524-1 may include a second time determined by the digital asset exchange. The second time, in embodiments, may be associated with a second interest payment or a second interest rate. In embodiments, the second time may be determined in a manner similar to the determination of the first time, the description of which applying herein. In embodiments, the timing of second interest payment may be determined by the digital asset exchange system when the digital asset exchange system is determining the timing of the first interest payment (e.g., completed in the same step). In embodiments, the timing of the second interest payment may be determined after the first interest payment is transferred to one or more accounts associated with the one or more users.

In embodiments, the process of FIG. 10A through FIG. 10C, may continue with step S5526-1. In embodiments at step S5526-1, the digital asset exchange may transfer the first interest payment from the first customer interest-bearing account to the respective customer exchange account associated with the first user (i.e., executing payment of the first interest payment). In embodiments, the first customer may be associated with one or more accounts, including two or more customer exchange accounts. For example, the first customer may be associated with a first exchange account and a second exchange account. In embodiments, the first customer may transfer digital assets from the first exchange account to the respective customer interest-bearing account. At step S5526-1, continuing the example, in embodiments the digital asset exchange system may transfer the first interest payment from the first customer interest-bearing account to one or more of the first exchange account and/or the second exchange account.

In embodiments, the digital asset exchange system may execute the transfer by updating the second electronic interest ledger (e.g., of the Second Electronic Interest Ledger Database 5504) to reflect the transfer of the first interest payment out of the respective customer interest account exchange account. In embodiments, the digital ass exchange system may update the Second Electronic Interest Ledger Database 5504, the fifth electronic ledger database, the sixth electronic database, the seventh electronic exchange ledger database, and/or a combination thereof, where applicable, to execute the transfer. For example, if the transfer includes fiat, the first digital asset, and the second digital asset, the digital asset exchange system may update the First Electronic Exchange Ledger Database 5502, the fifth electronic exchange ledger, and the sixth electronic exchange ledger to execute the transfer in this example. The transfer may be executed, in embodiments, by the digital asset exchange system updating the first electronic ledger to reflect receipt of the first interest payment of the first digital asset into the respective customer digital asset exchange account. In embodiments, step S5526-1 may include updating the second electronic ledger and the fifth electronic ledger to reflect transfer of the first interest amount of the second digital asset from the respective customer interest bearing account to the respective customer exchange account.

In embodiments, the digital asset exchange may transfer the first payment by generating a third transfer message. The third transfer message, in embodiments, may include instructions to transfer: the first interest payment of the first digital asset from the second digital address to the first digital address; the first interest payment less an amount (e.g., reserve, and/or fees) of the first digital asset from the second digital address to the first digital address; the amount of the first digital asset from the second digital address to the third digital address; the amount of the first digital asset from the second digital address to a fifth digital address associated with the digital asset exchange, intermediary(ies) and/or third party institutions, to name a few; and/or a combination thereof. Continuing the example, the third transfer message, in embodiments, may be published by the digital asset exchange system to a plurality of geographically distributed computer systems in a peer-to-peer network. In embodiments, the published instructions may be verified and/or executed by the plurality of geographically distributed computer systems in the peer-to-peer network. The executed transactions associated with the third transfer message, in embodiments, may be published by the plurality of geographically distributed computer systems in the peer-to-peer network.

In embodiments, the first interest payment may be in the following denomination: fiat, the first digital asset, a second digital asset, and/or a combination thereof, to name a few. The type of fiat, in embodiments, may include one or more of the following: USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few. The first digital asset and/or second digital asset may be a digital math-based asset, such as Bitcoins, Namecoins, Litecoins, PPCoins, Tonal bitcoins, bitcoin cash, zcash, IxCoins, Devcoins, Freicoins, IOcoins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDUCare; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; 0x; Aion; Algorand; AMP; Arca; Arweave; Audius; Avalanche; BCB; BCC; Bitcoin SV; Blockstacks; cBAT; cDAI; Cela; Celo; cETH; Chia; Coda; Cosmos; cWBTC; cZRK; Decred; Dfinity; EOS; Eth 2.0; Filecoin; Hedgetrade; ION; Kadena; Kyber Network; Mobilecion; Near; Nervos; Oasis; OmiseGO; PaxG; Polkadot; SKALE; Solana; Stellar; Tezos; Theta; XRP; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), digital finance tokens associated with decentralized lending (such as AMP, Compound, Protocol, Kyber, Uma, Uniswap, Yearn, Aave, to name a few), tokens, and/or non-fungible token (such as Cryptokitties), to name a few. In embodiments, the first digital asset and/or second digital asset may be a digital asset that is supported by its own digital asset network (like ether supported by the Ethereum Network). The first digital asset and/or second digital asset, in embodiments, may be a stable value or fiat-backed token (such as Gemini Dollar), security tokens, and/or non-fungible token (such as Cryptokitties), to name a few. The first digital asset and/or second digital asset, in embodiments, may be a fiat-backed digital asset, for example, a Libra, Diem, or Gemini Dollar. In embodiments, the second digital asset may be maintained on a second distributed ledger in the form of a second blockchain a blockchain network including a second plurality of geographically distributed computer systems in a second peer-to-peer network. The second distributed ledger, in embodiments, may be the same as the first distributed ledger. In embodiments, the second distributed ledger is different than the first distributed ledger.

In embodiments, as described herein, the digital asset exchange may be associated with the decentralized lending smart contract 5512. In such embodiments, the first interest payment (and/or subsequent interest payments) may be made to the decentralized lending smart contract public address 5512A. In embodiments, to transfer the first interest payment from the first customer interest-bearing account to the respective customer exchange account associated with the first user, the digital asset exchange system may generate a fourth transfer message including instructions to transfer the first interest payment of the second digital asset from the second digital address to the fourth digital address. The fourth transfer message, in embodiments, may be published by the digital asset exchange to the second distributed ledger in the form of the second blockchain wherein the instructions are executed by the second plurality of geographically distributed computer systems in the second peer-to-peer network. In embodiments, the published message may be verified and/or executed by the second plurality of geographically distributed computer systems in the peer-to-peer network. In embodiments, the digital asset exchange may generate a fourth transfer message including instructions to transfer the fifth amount of the first digital asset from the first address to the second digital address, and, when the fifth amount of digital assets are transferred to the first interest bearing account, transfer to a sixth digital address associated with the second interest bearing account when the fifth amount of the first digital asset is to be transferred to the second interest bearing account. The fourth transfer message, in embodiments, may be published by the digital asset exchange system to the first distributed network. The instructions associated with the fourth transfer request, in embodiments, may be verified and/or executed by the plurality of geographically distributed computer systems in the first peer-to-peer network.

In embodiments, as described in connection with FIG. 10A through FIG. 10C, one or more intermediary systems may act as an intermediary between the third party institutions or otherwise be associated with the third party institutions and the digital asset exchange. In embodiments, prior to and/or as part of each transfer digital assets to and/or from each respective interest bearing account, the digital asset exchange system may select one or more intermediary accounts from a plurality of intermediary accounts to act as an intermediary between the digital asset exchange and one or more third-party institutions. The digital asset exchange system may select one or more intermediary systems based on one or more of the following factors (e.g., selection information): (i) whether the respective intermediary systems are affiliated with one another; (ii) client preference information; (iii) client exclusion information; and/or (iv) an amount of digital asset (first digital asset, second digital asset, and/or combined, to name a few) and/or fiat associated with the respective intermediary (e.g., as compared to a predetermined limit, as compared to other intermediary systems of the plurality of intermediary systems, to name a few), to name a few. Following the selection (and/or during the selection process) of the intermediary or one or more intermediary systems, the digital asset exchange system may transfer the fifth amount of the digital asset from the respective exchange customer account to the first interest bearing account. In embodiments, a second intermediary system may be selected by the digital asset exchange (e.g., when a first and a second digital asset are part of the return). Following the selection (and/or during the selection process) of the second intermediary system, the digital asset exchange system may transfer the first interest payment and/or the fifth amount of the digital asset from the respective exchange customer account to the second interest bearing account.

In embodiments, the respective destination account for interest payments may be selected by the digital asset exchange. In embodiments, the selection, for example, may be based on one or more of the following: a minimum account balance requirement, a maximum account balance requirement, a minimum amount of transaction requirement, a maximum amount of transaction requirement, user preferences, and/or a combination thereof, to name a few. For example, the digital asset exchange system may monitor one or more of the customer exchange interest-bearing accounts to determine whether one or more account balances (e.g., the account balances associated with the first and second respective customer interest-bearing accounts) are in compliance with a minimum account balance requirement by comparing the respective account balance with a predetermined minimum account balance. In embodiments, the digital asset exchange system may transfer the first interest payment and/or the fifth amount of the first digital asset to the first interest-bearing account when the first interest-bearing account balance is below the predetermined minimum balance (and/or the second interest-bearing account when the second interest-bearing account balance is below the predetermined minimum balance). Continuing the example, if neither the first or the second respective customer interest-bearing accounts are below the predetermined minimum balance, the digital asset exchange may select either and/or move onto other factors (e.g., maximum account balance, min/max transactions) to select the account. As another example, the digital asset exchange system may monitor one or more of the customer exchange interest-bearing accounts to determine whether one or more account balances (e.g., the account balances associated with the first and second respective customer interest-bearing accounts) are in compliance with a maximum account balance requirement by comparing the respective account balance with a predetermined maximum account balance. In embodiments, the digital asset exchange system may transfer the first interest payment and/or the fifth amount of the first digital asset to the second interest-bearing account when the first interest-bearing account balance is above the predetermined maximum balance (and/or the first interest-bearing account when the second interest-bearing account balance is above the predetermined maximum balance). Continuing the example, if neither the first or the second respective customer interest-bearing accounts are above the predetermined maximum balance, the digital asset exchange may select either and/or move onto other factors (e.g., min/max transactions) to select the account. In embodiments, the digital asset exchange system may select by default either the first or second respective customer interest-bearing account and, if that default account complies with account requirements, the fifth amount of the first digital asset may be transferred to the default account.

In embodiments, one or more of the interest-bearing accounts may be associated with a minimum account balance requirement, a maximum account balance requirement, a minimum amount of transaction requirement, a maximum amount of transaction requirement, and/or a combination thereof, to name a few. For example, the digital asset exchange system may monitor one or more of the customer exchange interest-bearing accounts to determine whether one or more account balances is in compliance with a minimum account balance requirement by comparing the respective account balance with a predetermined minimum account balance. In embodiments, the second interest-bearing account may drop below a predetermined minimum account balance. Continuing the example, the balance of the second interest-bearing account may be transferred to the first interest-bearing account. In embodiments, the digital asset exchange system may transfer a penalty fee from the first and/or second interest-bearing account when the first and/or second interest-bearing account balance is below the predetermined minimum balance. As another example, the digital asset exchange system may monitor one or more of the customer exchange interest-bearing accounts to determine whether one or more account balances is in compliance with a maximum account balance requirement by comparing the respective account balance with a predetermined maximum account balance. In embodiments, the first interest-bearing account may exceed a predetermined maximum account balance. Continuing the example, the difference between the first interest-bearing account balance and the predetermined maximum may be transferred into the second interest-bearing account (and/or a third interest-bearing account may be created to accommodate the difference).

Referring back to FIG. 10C, in embodiments, as mentioned above, the one or more payments, may include one or more of the following: an interest payment (e.g., all or a portion of the first interest payment) in the first digital asset; an interest payment (e.g., all or a portion of the first interest payment) in the second digital asset; a redemption payment of the amount of digital asset transferred to the interest-bearing account (e.g., the second amount of the first digital asset), and/or a combination thereof, to name a few. As another example, referring to FIG. 10C, the process may optionally continue with step S5524-2. In embodiments, at step S5524-2, the digital asset exchange system may determine a time period (e.g., a calendar date and/or associated time) to disburse a first interest payment (e.g., the first time) to the first customer. The time period, in embodiments, may be determined based on an associated payment schedule. For example, the return information associated with the first interest payment may include a payment schedule which indicates the first time. The payment schedule, continuing the example, may include information which indicates (e.g., a date and/or time) when to distribute the first interest payment to the first customer. In embodiments, the determination of the first time may be based on one or more of the following: a payment schedule, the first interest payment (e.g., the amount of the first interest payment), an amount of time elapsing, a first redemption payment, user settings, the third party institution(s), the intermediary(ies), the type of digital asset, the amount of digital asset, the amount of interest bearing accounts associated with the one or more users, and/or a combination thereof, to name a few. In embodiments, the return information may indicate that redemption and/or interest payments are to be made periodically or aperiodically. In embodiments, the payment schedule may indicate that interest payments and/or redemption payments are to be made periodically or aperiodically. In embodiments, the return information may indicate that interest, payments are to be made based on receipt by the respective customer interest bearing account and/or a return from the respective customer intermediary account. In embodiments, the payment schedule indicates that interest payments and/or redemption payments are made based on receipt by the respective customer interest bearing account and/or a return from the respective customer intermediary account.

In embodiments, the return information may indicate that the interest payment(s) and/or redemption payment(s) are to be made upon a request that is received by the one or more users (and/or someone acting on the one or more user's behalf). For example, to receive the first interest payment (including the first redemption payment), the first customer device may generate and send a second request to the digital asset exchange system. The second request, in embodiments, may include a request for an interest payment and redemption payment associated with the respective customer interest-bearing account (e.g., a request for the balance of the respective customer interest-bearing account and the first interest payment). The digital asset exchange system may receive the request (e.g., which may be similar to the description of step S5512, the description of which applying herein) and verify the request (e.g., which may be similar to step S5514, the description of which applying herein). The second request, in embodiments, may be similar to the first request discussed herein in connection with FIG. 10A through FIG. 10B and the Exemplary First Request 5510, the descriptions of each applying herein. In embodiments, requests for return of the first interest payment and/or redemption payment (in total or in part) may only be accepted when a predetermined amount of time has elapsed. For example, the generated and sent second request may be verified by the digital asset exchange system by first determining whether a predetermined amount of time associated with the first interest payment (and/or redemption payment) has elapsed. If the predetermined amount of time has elapsed, the digital asset exchange may verify the request similar to the verification process in step S5514, the description of which applying herein. In embodiments, if the predetermined amount of time has not elapsed, the digital asset exchange system may refuse the request and/or notify the one or more users associated with the second request of the refusal (and/or reasons for said refusal).

In embodiments, the process of FIG. 10A through FIG. 10C may continue with step S5526-2. At step S5526-2, in embodiments, the by the digital asset exchange system may update the first interest payment amount of the first digital asset based on a current time period. For example, the first interest payment amount may be based on the amount of time that has elapsed since the one or more users transferred the second amount of the first digital asset into the respective customer interest-bearing account. Continuing the example, the digital asset exchange system may update the calculated first interest payment to include the interest accrued to the time of the first interest payment and/or redemption payment.

In embodiments, the process of FIG. 10A through FIG. 10C may continue with step S5528-2. In embodiments at step S5528-2, the digital asset exchange may transfer the first interest payment and the first redemption payment (first interest payment plus the fifth amount of the first digital asset) from the first customer interest-bearing account to the respective customer exchange account associated with the first user (i.e., executing payment of the first interest payment and the redemption payment). In embodiments, the first customer may be associated with one or more accounts, including two or more customer exchange accounts. For example, the first customer may be associated with a first exchange account and a second exchange account. In embodiments, the first customer may transfer digital assets from the first exchange account to the respective customer interest-bearing account. At step S5528-2, continuing the example, in embodiments the digital asset exchange system may transfer the first interest payment and the first redemption payment from the first customer interest-bearing account to one or more of the first exchange account and/or the second exchange account.

In embodiments, the digital asset exchange system may execute the transfer, by updating the second electronic interest ledger (e.g., of the Second Electronic Interest Ledger Database 5504) to reflect the transfer of the first interest payment and the fifth amount of digital asset (e.g., the first redemption payment) out of the respective customer interest account exchange account. In embodiments, the digital ass exchange system may update the Second Electronic Interest Ledger Database 5504, the fifth electronic ledger database, the sixth electronic database, the seventh electronic exchange ledger database, and/or a combination thereof, where applicable, to execute the transfer. For example, if the transfer includes fiat, the first digital asset, and the second digital asset, the digital asset exchange system may update the First Electronic Exchange Ledger Database 5502, the fifth electronic exchange ledger, and the sixth electronic exchange ledger to execute the transfer in this example. As another example, the first account ledger (e.g., the First Electronic Exchange Ledger Database 5502) may be updated to reflect receipt of the fifth amount of the first digital asset and the first interest payment amount in the respective customer digital asset exchange account associated with the first customer. The transfer may be executed, in embodiments, by the digital asset exchange system updating the first electronic ledger to reflect receipt of the first interest payment of the first digital asset and the fifth amount of the first digital asset into the respective customer digital asset exchange account. In embodiments, step S5528-2 may include updating the second electronic ledger and the fifth electronic ledger to reflect transfer of the first interest payment and/or equivalent value to the fifth amount of the first digital asset in the form of the second digital asset from the respective customer interest bearing account to the respective customer exchange account. In embodiments, the digital asset exchange system may calculate the exchange rate between the first digital asset and the second digital asset.

In embodiments, the digital asset exchange may transfer the first interest payment and/or the first redemption payment by generating a second transfer message. The second transfer message, in embodiments, may include instructions to transfer: the first interest payment of the first digital asset from the second digital address to the first digital address; the first interest payment less an amount (e.g., reserve, and/or fees) of the first digital asset from the second digital address to the first digital address; the first redemption payment (e.g., the fifth amount of the first digital asset) from the second digital address to the first digital address; the first redemption payment less an amount (e.g., reserve, and/or fees) from the second digital address to the first digital address; the reserve amount of the first digital asset from the third digital address to the first digital address; the fifth amount of the first digital asset and/or the first interest payment from the second digital address to a fifth digital address associated with the digital asset exchange, intermediary(ies) and/or third party institutions, to name a few; and/or a combination thereof. Continuing the example, the second transfer message, in embodiments, may be published by the digital asset exchange system to a plurality of geographically distributed computer systems in a peer-to-peer network. In embodiments, the published instructions may be verified and/or executed by the plurality of geographically distributed computer systems in the peer-to-peer network. The executed transactions associated with the second transfer message, in embodiments, may be published by the plurality of geographically distributed computer systems in the peer-to-peer network.

In embodiments, the first interest payment and/or the first redemption payment may be in the following denomination: fiat, the first digital asset, a second digital asset, and/or a combination thereof, to name a few. The type of fiat, in embodiments, may include one or more of the following: USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few. The first digital asset and/or second digital asset may be a digital math-based asset, such as Bitcoins, Namecoins, Litecoins, PPCoins, Tonal bitcoins, bitcoin cash, zcash, IxCoins, Devcoins, Freicoins, IOcoins, Terracoins, Liquidcoins, BBQcoins, BitBars, PhenixCoins, Ripple, Dogecoins, Mastercoins, BlackCoins, Ether, Nxt, BitShares-PTS, Quark, Primecoin, Feathercoin, Peercoin, Facebook Global Coin, Stellar, Top 100 Tokens, Tether; Maker; Crypto.com Chain; Basic Attention Token; USD Coin; Chainlink; BitTorrent; OmiseGO; Holo; TrueUSD; Pundi X; Zilliga; Augur; 0x; Aurora; Paxos Standard Token; Huobi Token; IOST; Dent; Qubitica; Enjin Coin; Maximine Coin; ThoreCoin; MaidSafeCoin; KuCoin Shares; Crypto.com; SOLVE; Status; Mixin; Waltonchain; Golem; Insight Chain; Dai; VestChain; aelf, WAX; DigixDAO; Loom Network; Nash Exchange; LATOKEN; HedgeTrade; Loopring; Revain; Decentraland; Orbs; NEXT; Santiment Network Token; Populous; Nexo; Celer Network; Power Ledger; ODEM; Kyber Network; QASH; Bancor; Clipper Coin; Matic Network; Polymath; FunFair; Bread; IoTeX; Ecoreal Estate; REPO; UTRUST; Arcblock; Buggyra Coin Zero; Lambda; iExec RLC; STASIS EURS; Enigma; QuarkChain; Storj; UGAS; RIF Token; Japan Content Token; Fantom; EDU-Care; Fusion; Gas; Mainframe; Bibox Token; CRYPTO20; Egretia; Ren; Synthetix Network Token; Veritaseum; Cortex; Cindicator; Civic; RChain; TenX; Kin; DAPS Token; SingularityNET; Quant; Gnosis; INO COIN; Iconomi; MediBloc [ERC20]; 0x; Aion; Algorand; AMP; Arca; Arweave; Audius; Avalanche; BCB; BCC; Bitcoin SV; Blockstacks; cBAT; cDAI; Cela; Celo; cETH; Chia; Coda; Cosmos; cWBTC; cZRK; Decred; Dfinity; EOS; Eth 2.0; Filecoin; Hedgetrade; ION; Kadena; Kyber Network; Mobilecion; Near; Nervos; Oasis; OmiseGO; PaxG; Polkadot; SKALE; Solana; Stellar; Tezos; Theta; XRP; and/or DEW, to name a few. In embodiments, the underlying digital asset may be a digital asset that is supported by its own digital asset network (like ether supported by the Ethereum Network). A digital asset token, in embodiments, may be a stable value token (such as Gemini Dollar), digital finance tokens associated with decentralized lending (such as AMP, Compound, Protocol, Kyber, Uma, Uniswap, Yearn, Aave, to name a few), tokens, and/or non-fungible token (such as Cryptokitties), to name a few. In embodiments, the first digital asset and/or second digital asset may be a digital asset that is supported by its own digital asset network (like ether supported by the Ethereum Network). The first digital asset and/or second digital asset, in embodiments, may be a stable value or fiat-backed token (such as Gemini Dollar), security tokens, and/or non-fungible token (such as Cryptokitties), to name a few. The first digital asset and/or second digital asset, in embodiments, may be a fiat-backed digital asset, for example, a Libra, Diem, or Gemini Dollar. In embodiments, the second digital asset may be maintained on a second distributed ledger in the form of a second blockchain a blockchain network including a second plurality of geographically distributed computer systems in a second peer-to-peer network. The second distributed ledger, in embodiments, may be the same as the first distributed ledger. In embodiments, the second distributed ledger is different than the first distributed ledger.

In embodiments, as described herein, the digital asset exchange may be associated with the decentralized lending smart contract 5512. In embodiments, the first interest payment and/or redemption payment may be made to the decentralized lending smart contract public address 5512A. In embodiments, to transfer the first interest payment from the first customer interest-bearing account to the respective customer exchange account associated with the first user, the digital asset exchange system may generate a fourth transfer message including instructions to transfer the first interest payment and/or the redemption payment of the second digital asset from the second digital address to the fourth digital address. The fourth transfer message, in embodiments, may be published by the digital asset exchange to the second distributed ledger in the form of the second blockchain wherein the instructions are executed by the second plurality of geographically distributed computer systems in the second peer-to-peer network. In embodiments, the published message may be verified and/or executed by the second plurality of geographically distributed computer systems in the peer-to-peer network. In embodiments, the digital asset exchange may generate a fourth transfer message including instructions to transfer the first interest payment and/or the fifth amount of the first digital asset from the first address to the second digital address, and, when the first interest payment and/or the fifth amount of digital assets are transferred to the first interest-bearing account, transfer to a sixth digital address associated with the second interest bearing account where the fifth amount of the first digital asset is to be transferred to the second interest bearing account. The fourth transfer message, in embodiments, may be published by the digital asset exchange system to the first distributed network. The instructions associated with the fourth transfer request, in embodiments, may be verified and/or executed by the plurality of geographically distributed computer systems in the first peer-to-peer network.

In embodiments, as described in connection with FIG. 10A through FIG. 10C, one or more intermediary systems may act as an intermediary between the third party institutions and the digital asset exchange. In embodiments, prior to and/or as part of each transfer digital assets to and/or from each respective interest bearing account, the digital asset exchange system may select one or more intermediary systems from a plurality of intermediary systems to act as an intermediary between the digital asset exchange and one or more third-party institutions. The selection of intermediary systems, in embodiments, may be similar to the selection of intermediary systems described in connection with step S5526-1, the description of which applying herein.

In embodiments, the respective destination account for interest payments and/or redemption payments or the first amount of the first digital asset may be selected by the digital asset exchange. In embodiments, the selection, for example, may be based on one or more of the following: a minimum account balance requirement, a maximum account balance requirement, a minimum amount of transaction requirement, a maximum amount of transaction requirement, user preferences, and/or a combination thereof, to name a few. For example, the digital asset exchange system may monitor one or more of the customer exchange interest-bearing accounts to determine whether one or more account balances (e.g., the account balances associated with the first and second respective customer interest-bearing accounts) are in compliance with a minimum account balance requirement by comparing the respective account balance with a predetermined minimum account balance. In embodiments, the digital asset exchange system may transfer the first interest payment and/or the fifth amount of the first digital asset to the first interest-bearing account when the first interest-bearing account balance is below the predetermined minimum balance (and/or the second interest-bearing account when the second interest-bearing account balance is below the predetermined minimum balance). Continuing the example, if neither the first or the second respective customer interest-bearing accounts are below the predetermined minimum balance, the digital asset exchange may select either and/or move onto other factors (e.g., maximum account balance, min/max transactions) to select the account. As another example, the digital asset exchange system may monitor one or more of the customer exchange interest-bearing accounts to determine whether one or more account balances (e.g., the account balances associated with the first and second respective customer interest-bearing accounts) are in compliance with a maximum account balance requirement by comparing the respective account balance with a predetermined maximum account balance. In embodiments, the digital asset exchange system may transfer the first interest payment and/or the fifth amount of the first digital asset to the second interest-bearing account when the first interest-bearing account balance is above the predetermined maximum balance (and/or the first interest-bearing account when the second interest-bearing account balance is above the predetermined maximum balance). Continuing the example, if neither the first or the second respective customer interest-bearing accounts are above the predetermined maximum balance, the digital asset exchange may select either and/or move onto other factors (e.g., min/max transactions) to select the account. In embodiments, the digital asset exchange system may select by default either the first or second respective customer interest-bearing account and, if that default account complies with account requirements, the first interest payment and/or the fifth amount of the first digital asset may be transferred to the default account.

In embodiments, the steps of the processes described in connection with FIG. 10A through FIG. 10C may be rearranged or omitted.

Secondary Market Activities

Figure 2:
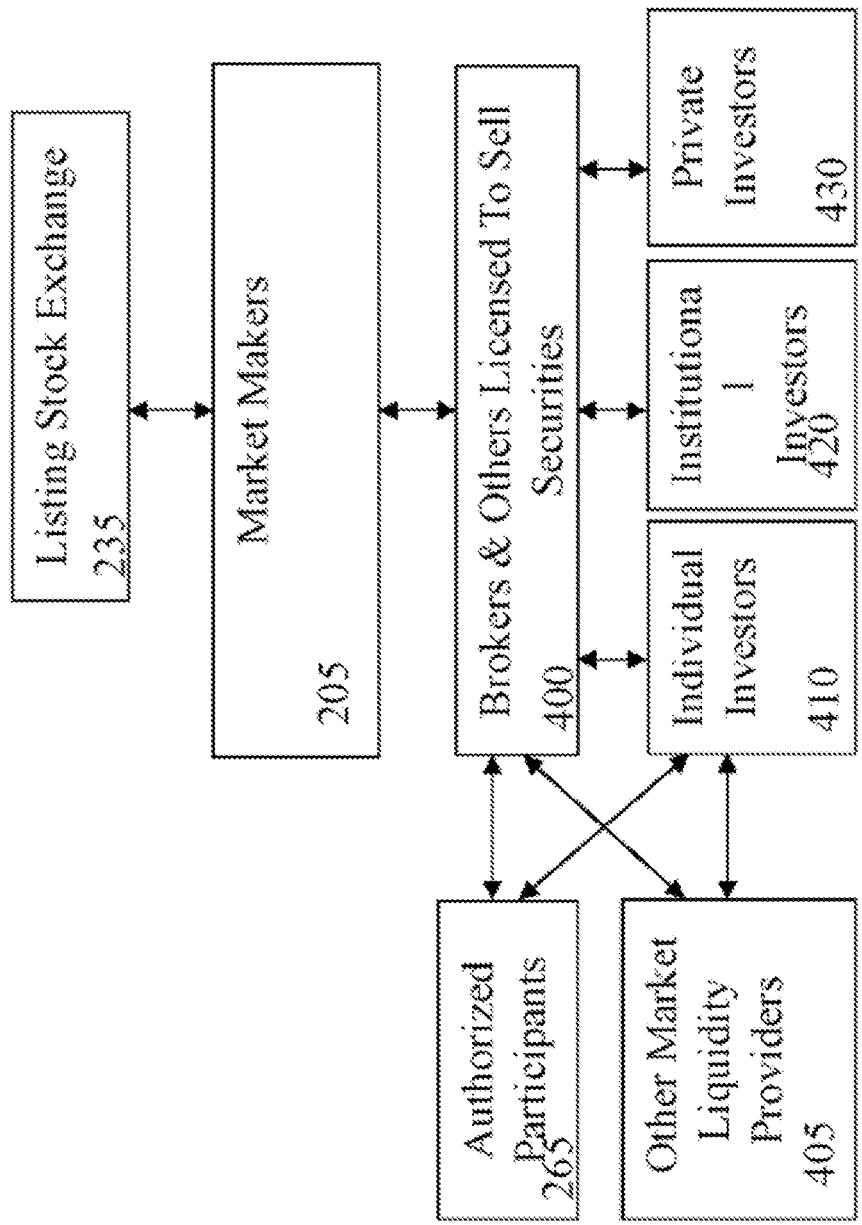
FIG. 2 is a schematic diagram of an exemplary secondary market for shares in the trust in accordance with exemplary embodiments of the present invention.

FIG. 2 is a schematic diagram of an exemplary secondary market for shares in the trust in accordance with exemplary embodiments of the present invention. In embodiments, the secondary market can include one or more listing stock exchanges 235 (e.g., NYSE, NASDAQ, AMEX, LSE, to name a few), one or more market makers 205, one or more brokers and/or other licensed to sell securities 400, authorized participants 265, other market liquidity providers 405, individual investors 410, institutional investors 420 and private investors 430, to name a few.

As described earlier, in the primary market APs 265 may obtain and/or redeem shares in the trust through the creation and redemption redeem processes. APs 265 may then sell shares in a secondary market. APs 265 may also buy shares in the secondary market. In an exemplary secondary market for shares in the trust for a digital math-based asset ETP, e.g., a Bitcoin ETP, a listing stock exchange 235 may be the primary listing venue for individual ETP shares. In embodiments, the listing stock exchange 235 may be required to file listing rules with the SEC if no applicable listing rules already exist. The listing exchange 235 may enter into a listing agreement with the sponsor 230. In embodiments, the listing exchange 235 may appoint the lead market maker and/or other market makers 205. The market makers 205 may facilitate the secondary market trading of shares in the trust underlying the ETP. Market makers 205 may facilitate creations and/or redemptions of creation units through one or more APs. In embodiments, such creations and/or redemptions may be related to market demand, e.g., to satisfy market demand.

Still referring to FIG. 2, individual investors 410, institutional investors 420, and/or private investors 430 may buy and/or sell one or more shares in the trust. In embodiments, these investors may buy and/or sell shares through brokers 400 or others licensed to sell securities. Brokers 400 and/or others licensed to sell securities may receive cash and/or other assets from investors in order to buy one or more shares in the trust. Brokers 400 and/or others licensed to sell securities may receive one or more shares from investors to sell for cash and/or other assets.

Other market liquidity providers 405 may also participate in the secondary market. In embodiments, other market liquidity providers 405 may buy and/or sell one or more shares on a list stock exchange 235. In embodiments, other market liquidity providers 405 may buy and/or sell one or more creation units through one or more APs 265. Other market liquidity providers 405 may include, by way of example, arbitragers, prop traders, "upstairs", private investors, dark pools, to name a few.

In embodiments, the assets can include additional assets besides digital math-based assets, such as, other commodities, currencies, futures, derivatives, and/or securities, to name a few.

In embodiments, a system for determining and/or providing a blended digital math-based asset price can comprise one or more processors and one or more computer-readable media operatively connected to the one or more processors and having stored thereon instructions for carrying out the steps of: (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

Deposit Distribution Waterfalls Among Wallets.

The creation process involves the deposit of digital assets into the trust's accounts. During a creation, assets or other funds may be deposited into one or more trust accounts. In embodiments, a trust may limit the number of assets or amount of funds stored in each of its wallets, e.g., for security reasons to reduce exposure if any one wallet is compromised. In multi-wallet structures, various asset distributions among the wallets are possible, and various distribution methods or waterfalls may be employed.

In embodiments, wallets may be filled in a pre-determined order. In embodiments, wallets may be filled according to one or more desired capacities or account balances, e.g., deposit 10,000 bitcoin in each wallet before proceeding to deposit in the next wallet.

While the present application primarily discusses digital currency, the proof of custody method discussed herein may be used in conjunction with other products as well. Proof of custody systems and methods discussed herein, may be implemented for any type of financial product or service in which custodial wallets are used. Other embodiments of the present invention may also be used in conjunction with other financial products, such as using pricing discussions involving indices created with blended digital asset prices and/or auctions as benchmarks for financial products, such as exchange traded notes, futures products (such as options), derivative products (such a puts and calls), other indices (such as volatility indices), swaps, currencies, fixed income products, bonds, securities, equities to name a few.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method for securing a non-custodial trading session in a computer-centric environment, implemented at least in part by a digital asset exchange, comprising:

receiving, from a first user device, a digital asset;

storing, in a non-custodial digital wallet, the digital asset;

generating data representing a smart contract associated with the digital asset exchange, wherein the smart contract comprises an agreement between the digital asset exchange and a user of the first user device regarding a first loan of at least a part of the digital asset from the user to at least one of the digital asset exchange or a third party, wherein generating the data representing the smart contract includes generating a computer program having computer-executable instructions configured to be executed automatically upon determination that a condition indicated by the smart contract has been satisfied;

associating the smart contract with the non-custodial digital wallet;

receiving a notification that the condition of the smart contract has been met;

automatically generating, by executing the computer-executable instructions of the computer program and based at least in part on the condition of the smart contract being met, transfer instructions that, when received at one or more nodes of a distributed network associated with a blockchain, cause the one or more nodes to execute the transfer instructions to initiate transfer of a first interest payment from the digital asset exchange to a bank account of the user;

generating, based at least in part on automatically generating the transfer instructions, lending tokens indicating authorized key pairs for transferring the first interest payment to the bank account, wherein generating the lending tokens includes minting new lending tokens that previously did not exist and that indicate specific contract addresses on the blockchain associated with the user and the digital asset exchange;

automatically publishing the transfer instructions to the one or more nodes of the distributed network without human interaction, the publishing causing transferring, utilizing the computer program and the lending tokens and based at least in part on the condition of the smart contract being met, the first interest payment from the digital asset exchange to the bank account of the user; and automatically destroying the lending tokens in response to the first interest payment being transferred from the digital asset exchange to the bank account of the user.

2. The method of claim 1, wherein the first interest payment is determined based at least in part on (i) the digital asset meeting a reserve balance amount in the digital asset exchange and (ii) the amount of fees the digital asset exchange charged the user at a time of the first interest payment.

3. The method of claim 1, wherein the first interest payment is determined based at least in part on (i) a transfer of a part of the digital asset from the user to a second user and (ii) user preferences of the user in the digital asset exchange.

4. The method of claim 1, further comprising identifying a digital wallet associated with the user and wherein transferring the first interest payment includes transferring the first interest payment to the digital wallet.

5. The method of claim 1, further comprising calculating, utilizing the smart contract, a number of lending tokens to be created based at least in part on the first interest payment being issued.

6. The method of claim 1, further comprising calculating, utilizing the smart contract, a number of existing lending tokens to be deleted based at least in part on the first interest payment being issued.

7. The method of claim 1, further comprising redeeming, utilizing the smart contract, at least one lending token based at least in part on the first interest payment.

8. A system associated with a digital asset exchange for securing a non-custodial trading session in a computer-centric environment, the system comprising:
  one or more processors; and
  one or more non-transitory computer-readable media storing instructions that, when executed by the one or more processors, causes the system to perform operations comprising:
    receiving, from a first user device, a digital asset;
    storing, in a non-custodial digital wallet, the digital asset;
    generating data representing a smart contract associated with the digital asset exchange, wherein the smart contract comprises an agreement between the digital asset exchange and a user of the first user device regarding a first loan of at least a part of the digital asset from the user to at least one of the digital asset exchange or a third party, wherein generating the data representing the smart contract includes generating a computer program having computer-executable instructions configured to be executed automatically upon determination that a condition indicated by the smart contract has been satisfied;
    associating the smart contract with the non-custodial digital wallet;
    receiving a notification that the condition of the smart contract has been met;
    automatically generating, by executing the computer-executable instructions of the computer program and based at least in part on the condition of the smart contract being met, transfer instructions that, when received at one or more nodes of a distributed network associated with a blockchain, cause the one or more nodes to execute the transfer instructions to initiate transfer of a first interest payment from the digital asset exchange to a bank account of the user;
    generating, based at least in part on automatically generating the transfer instructions, lending tokens indicating authorized key pairs for transferring the first interest payment to the bank account, wherein generating the lending tokens includes minting new lending tokens that previously did not exist and that indicate specific contract addresses on the blockchain associated with the user and the digital asset exchange;
    automatically publishing the transfer instructions to the one or more nodes of the distributed network without human intervention, the publishing causing transferring, utilizing the computer program and the lending tokens and based at least in part on the condition of the smart contract being met, the first interest payment from the digital asset exchange to the bank account of the user; and
    automatically destroying the lending tokens in response to the first interest payment being transferred from the digital asset exchange to the bank account of the user.

9. The system of claim 8, wherein the first interest payment is determined based at least in part on (i) the digital asset meeting a reserve balance amount in the digital asset exchange and (ii) the amount of fees the digital asset exchange charged the user at a time of the first interest payment.

10. The system of claim 8, wherein the first interest payment is determined based at least in part on (i) a transfer of a part of the digital asset from the user to a second user and (ii) user preferences of the user in the digital asset exchange.

11. The system of claim 8, further comprising, identifying a digital wallet associated with the user and wherein transferring the first interest payment includes transferring the first interest payment to the digital wallet.

12. The system of claim 8, further comprising, calculating, utilizing the smart contract, a number of lending tokens to be created based at least in part on the first interest payment being issued.

13. The system of claim 8, further comprising, calculating, utilizing the smart contract, a number of existing lending tokens to be deleted based at least in part on the first interest payment being issued.

14. The system of claim 8, further comprising, redeeming, utilizing the smart contract, at least one lending token based at least in part on the first interest payment.

15. One or more non-transitory computer-readable media for securing a non-custodial trading session in a computer-centric environment storing instructions, that when executed by one or more processors, cause the one or more processors to perform operations comprising:
  receiving, from a first user device, a digital asset at a digital asset exchange;
  storing, in a non-custodial digital wallet, the digital asset;
  generating data representing a smart contract associated with the digital asset exchange, wherein the smart contract comprises an agreement between the digital asset exchange and a user of the first user device regarding a first loan of at least a part of the digital asset from the user to at least one of the digital asset exchange or a third party, wherein generating the data representing the smart contract includes generating a computer program having computer-executable instructions configured to be executed automatically upon determination that a condition indicated by the smart contract has been satisfied;
  associating the smart contract with the non-custodial digital wallet;
  receiving a notification that the condition of the smart contract has been met;
  automatically generating, by executing the computer-executable instructions of the computer program and based at least in part on the condition of the smart contract being met, transfer instructions that, when received at one or more nodes of a distributed network associated with a blockchain, cause the one or more nodes to execute the transfer instructions to initiate transfer of a first interest payment from the digital asset exchange to a bank account of the user;
  generating, based at least in part on automatically generating the transfer instructions, lending tokens indicating authorized key pairs for transferring the first interest payment to the bank account, wherein generating the lending tokens includes minting new lending tokens that previously did not exist and that indicate specific contract addresses on the blockchain associated with the user and the digital asset exchange;

automatically publishing the transfer instructions to the one or more nodes of the distributed network without human interference, the publishing causing transferring, utilizing the computer program and the lending tokens and based at least in part on the condition of the smart contract being met, the first interest payment from the digital asset exchange to the bank account of the user; and automatically destroying the lending tokens in response to the first interest payment being transferred from the digital asset exchange to the bank account of the user.

16. The one or more non-transitory computer-readable media as claim 15 recites, wherein the first interest payment is determined based at least in part on (i) the digital asset meeting a reserve balance amount in the digital asset exchange and (ii) the amount of fees the digital asset exchange charged the user at a time of the first interest payment.

17. The one or more non-transitory computer-readable media as claim 15 recites, wherein the first interest payment is determined based at least in part on (i) a transfer of a part of the digital asset from the user to a second user and (ii) user preferences of the user in the digital asset exchange.

18. The one or more non-transitory computer-readable media as claim 15 recites, further comprising, identifying a digital wallet associated with the user and wherein transferring the first interest payment includes transferring the first interest payment to the digital wallet.

19. The one or more non-transitory computer-readable media as claim 15 recites, further comprising, calculating, utilizing the smart contract, a number of lending tokens to be created based at least in part on the first interest payment being issued.

20. The one or more non-transitory computer-readable media as claim 15 recites, further comprising, calculating, utilizing the smart contract, a number of existing lending tokens to be deleted based at least in part on the first interest payment being issued.

\* \* \* \* \*